Sept. 13, 1955 H. P. LUHN ET AL 2,717,733

TYPEWRITER CONTROLLED CALCULATOR

Original Filed May 13, 1949 48 Sheets-Sheet 1

INVENTORS
HANS P LUHN
RICHARD L. JOHNSON

BY William Lang
ATTORNEY

TYPEWRITER CONTROLLED CALCULATOR

Original Filed May 13, 1949

INVENTORS
HANS P. LUHN
RICHARD L. JOHNSON
BY
William Lang
ATTORNEY

INVENTORS
HANS P. LUHN
RICHARD L. JOHNSON
BY William Lang
ATTORNEY

TYPEWRITER CONTROLLED CALCULATOR

Original Filed May 13, 1949

INVENTORS
HANS P. LUHN
RICHARD L. JOHNSON
BY William Lang
ATTORNEY

TYPEWRITER CONTROLLED CALCULATOR

Original Filed May 13, 1949

48 Sheets-Sheet 5

INVENTORS
HANS P LUHN
RICHARD L. JOHNSON
BY
William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 6

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949

48 Sheets-Sheet 8

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets--Sheet 9

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

TYPEWRITER CONTROLLED CALCULATOR

Original Filed May 13, 1949 48 Sheets-Sheet 12

INVENTORS
HANS P LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 13

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 14

INVENTORS
HANS P. LUHN
RICHARD L. JOHNSON
BY
William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 16

TABLE LOOKUP SINE

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 17

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY
William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 20

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 22

INVENTORS
HANS P. LUHN
RICHARD L. JOHNSON
BY William Lang
ATTORNEY

Sept. 13, 1955  H. P. LUHN ET AL  2,717,733

TYPEWRITER CONTROLLED CALCULATOR

Original Filed May 13, 1949  48 Sheets-Sheet 23

INVENTORS
HANS P LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 25

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

TYPEWRITER CONTROLLED CALCULATOR

Original Filed May 13, 1949

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949

48 Sheets-Sheet 28

INVENTORS
HANS P LUHN
RICHARD L JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 32

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733
TYPEWRITER CONTROLLED CALCULATOR
Original Filed May 13, 1949 48 Sheets-Sheet 34
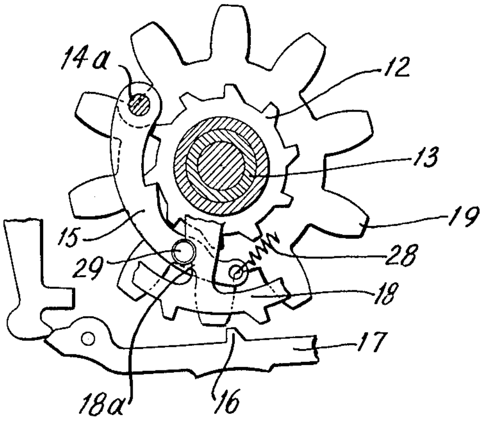
FIG. 4
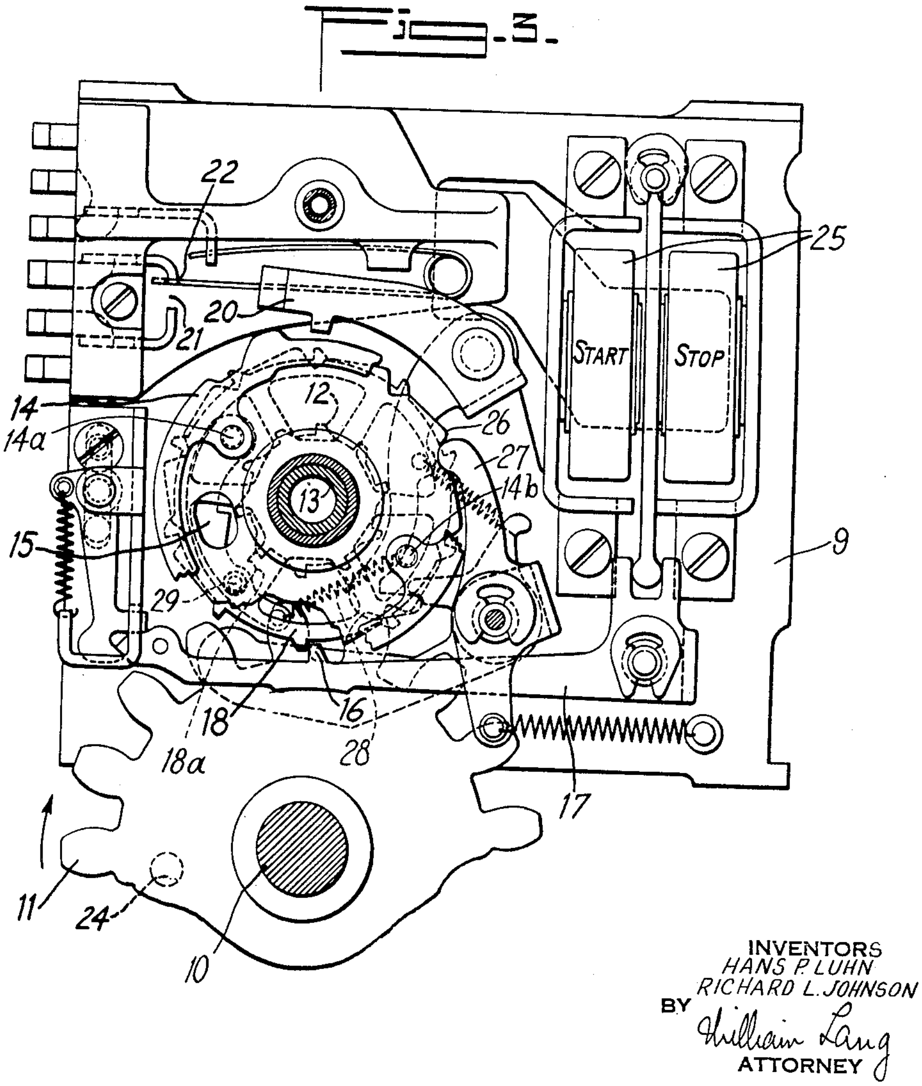
INVENTORS
HANS P. LUHN
RICHARD L. JOHNSON
BY William Lang
ATTORNEY INVENTORS
HANS P. LUHN
RICHARD L. JOHNSON
BY William Lang
ATTORNEY INVENTORS
HANS P. LUHN
RICHARD L. JOHNSON
BY William Lang
ATTORNEY Sept. 13, 1955 H. P. LUHN ET AL 2,717,733

TYPEWRITER CONTROLLED CALCULATOR

Original Filed May 13, 1949 48 Sheets-Sheet 37

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 38

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

150

GRID TRAVERSE SHEET

OPERATOR R. J. Jones
CHECKED BY Bill Odum
DATE 21 October, 1947
TRAVERSE 231A FROM 3A TO 3A
DATE 18 Oct. 47

| STATION TO STATION | AZIMUTH | DISTANCE | LATITUDE N OR S | DEPARTURE E OR W | COORDINATES NORTHINGS Y | COORDINATES EASTINGS X |
|---|---|---|---|---|---|---|
| 3A | | | | | 100000 | 100000 |
| 3A - 3B | 754137 | 64253 | + 15877 | + 62260 | 115877 | 162260 |
| 3B - 3C | 1634009 | 73263 | - 70307 | + 20600 | 45570 | 182860 |
| 3C - 3D | 2100344 | 41690 | - 36082 | - 20884 | 9488 | 161976 |
| 3D - 3E | 2930008 | 70002 | + 27354 | - 64436 | 36842 | 97540 |
| 3E - 3A | 21350 | 63205 | + 63157 | + 2460 | 99999 | 100000 |

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Fig. 23b

| SEQ. STEP | CB CYCLES | FS (6 … 1, 6 … 1) | LH (12 … 1) | RH (12 … 1) | MP (6 … 1) | MC (6 … 1) |
|---|---|---|---|---|---|---|
| 7 | 10" | Cos. 14°10"(Comp.) 030411 | RESET 999999999999 | | MINUTES 8383 | DIFFERENCE 716 |
| 8 | 11" | | 999994959999 | 999999311999 X8 | | |
| 8 | 12" | | 999999798999 | 999999986199 X3 | | |
| 8 | 13" | | 999999949599 | 999999993119 X8 | | |
| 8 | 14" | | 999999997989 | 999999999861 X3 | | |
| | | | 999994706589 | 999999291181 | | |
| 9 | 15" | | TRANSFER 999999291181 | RESET 999999999999 | | RESET 000000 |
| | | Sin.14°10"(Comp.) | 999993997771 | ROUNDING | | |
| 10 | 16" | -755256 +000600 | RESET 999999999999 | 999999994999 | | DIFFERENCE 2820 |
| | | -755256 -031011 Cos.14°18'23"(Comp.) | | | | |
| 11 | 17" | | 999983899999 | 999993539999 X8 | | |
| 11 | 18" | | 999999799999 | 999999353999 X3 | | |
| 11 | 19" | | 999999838999 | 999999935399 X8 | | |
| 11 | 20" | | 999999997999 | 999999993539 X3 | | |
| | | | 999983536999 | TRANSFER 999992817939 | | |

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 46

INVENTORS
HANS P. LUHN
RICHARD L. JOHNSON
BY William Lang
ATTORNEY

INVENTORS
HANS P. LUHN
RICHARD L. JOHNSON
BY William Lang
ATTORNEY

Sept. 13, 1955 H. P. LUHN ET AL 2,717,733

TYPEWRITER CONTROLLED CALCULATOR

Original Filed May 13, 1949 48 Sheets-Sheet 48

INVENTORS
HANS P. LUHN
RICHARD L. JOHNSON
BY William Lang
ATTORNEY

United States Patent Office 2,717,733

Patented Sept. 13, 1955

2,717,733

TYPEWRITER CONTROLLED CALCULATOR

Hans P. Luhn, Armonk, and Richard L. Johnson, Wappingers Falls, N. Y., assignors to International Business Machines Corporation, New York, N. Y., a corporation of New York Original application May 13, 1949, Serial No. 92,996. Divided and this application August 15, 1951, Serial No. 241,988

8 Claims. (Cl. 235—59)

This application is a division of our copending application Serial No. 92,996, filed May 13, 1949.

The present invention relates to calculating machines and particularly to the type of calculator controlled through the action of the keys of a typewriter.

In carrying out the invention, a set of auxiliary keys is provided which the operator will actuate in accordance with the value of any measured angle lying within the range of a complete circle. This angle is automatically entered digit by digit into a storage mechanism which in turn controls the typewriter keys to type the angle on a suitable record sheet.

One of the objects of the invention is to provide improved controls for such entry so that upon completion of each digital entry the storage device will effect operation of the typewriter to print the digits. If through observation the operator notes that the correct digit is typed, this will be an indication that such digit is correctly set up in the storage device and also that the operator has not made an error in keying.

Upon completion of the angle entry and typing, there is a transfer of the angle from the storage device to a so-called function analyzing mechanism, wherein it is ascertained in which octant of a circle the angle lies. This is effected by initially setting up the octant limit angles 45°, 90°, 135°, 180°, 225°, 270°, 315°, and 360° and concurrently comparing the typed angle with each of these limit angles.

A so-called table lookup mechanism is provided in which the sines and cosines of all angles from 0° to 45° are set up in steps of tens of minutes, together with the differences between successive settings. As a preliminary, the seconds of the entered angle are corrected to a decimal of minutes and combined with the units of minutes. As a further step in the procedure, the units of minutes so obtained is multiplied by a difference value derived from the table lookup mechanism and the product combined algebraically with the selected sine and cosine values for the degrees and tens of minutes part of the angle to obtain the ultimate sine and cosine values for the complete angle.

While the selection and calculation of the sine and cosine are proceeding, the operator may manipulate the auxiliary keys to enter a value representing the measured distance between two survey stations into the storage device which will in turn cause typing thereof. Upon completion of both the distance entry and function calculation, the distance is multiplied in succession by the sine and cosine to determine the north-south and east-west distances between the two stations. In the procedure, it is required to first obtain a north-south value, and this may require either multiplication by the sine or cosine depending upon the octant within which the angle lies.

Upon completion of the first product representing the north-south component of the distance (which distance is the hypotenuse of the triangle), it is automatically typed and thereafter the other function is multiplied by the distance to obtain the east-west value, which is then also typed.

A further object is to provide controls between a denominationally ordered readout device and a typewriter wherein the digits are read out in succession with zeros to the left of the first significant digit, automatically causing space operations of the typewriter and zeros to the right causing zero print operations.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1*a*, 1*b*, 1*c*, 1*d*, 1*e*, 1*f*, 1*g*, 1*h*, 1*i*, 1*j*, 1*k*, 1*m*, 1*n*, 1*p*, 1*q*, 1*r*, 1*s*, 1*t*, 1*u*, 1*v* and 1*w* when arranged in the order indicated in Fig. 5*a* constitute a wiring diagram of the electric circuits of the machine.

Figs. 2*a*, 2*b*, 2*c*, 2*d*, 2*e*, 2*f*, 2*g*, 2*h*, 2*i*, 2*j*, 2*k*, and 2*m* when arranged from left to right in the order named constitute a sequence diagram of the operation of current responsive devices during the performance of a representative problem.

Fig. 3 is a view of one denominational order section of the accumulating mechanism.

Fig. 4 is a detail of the accumulator clutching mechanism in operating position.

Figure 5:
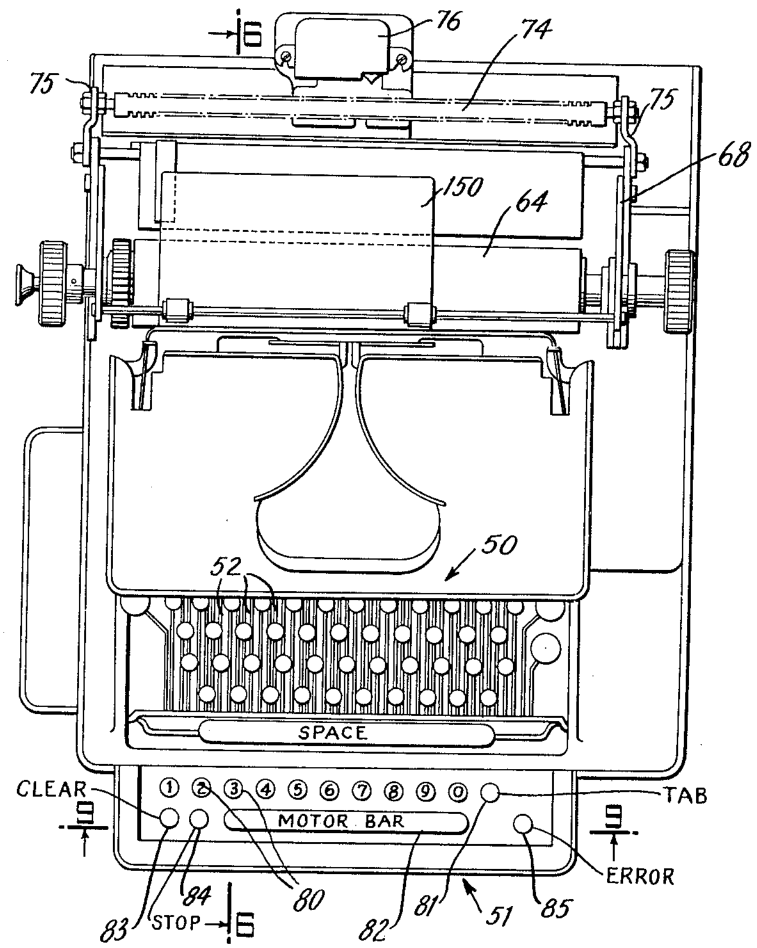
Fig. 5 is a plan view of the typewriter showing location of the auxiliary keyboard.
Figure 5A:
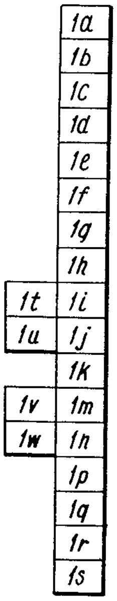

Fig. 5*a* is a diagram of the arrangement of the sheets to constitute the circuit diagram.

Figure 6:
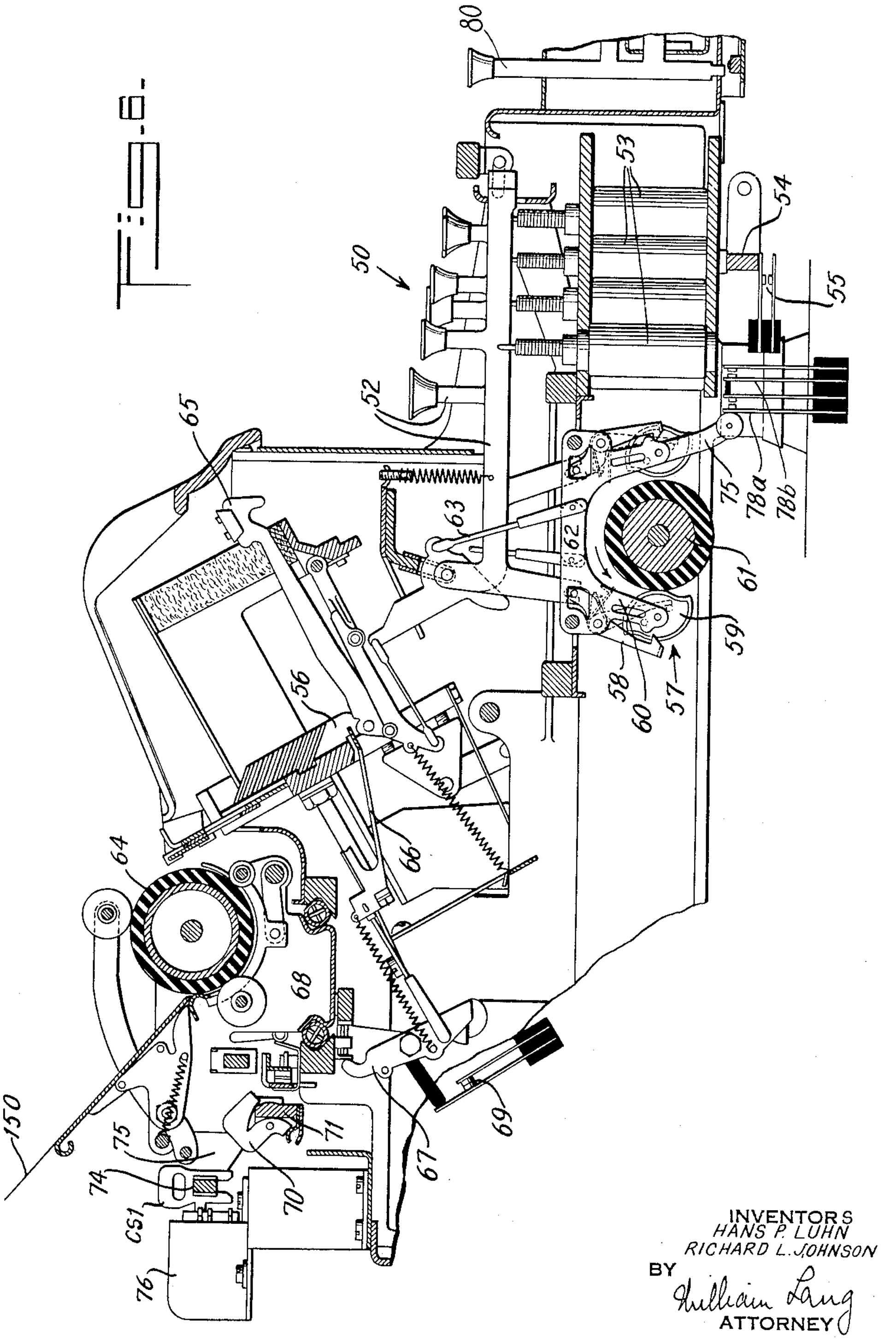

Fig. 6 is a sectional elevation through the typewriter taken substantially on lines 6—6 of Fig. 5.

Figures 7, 8:
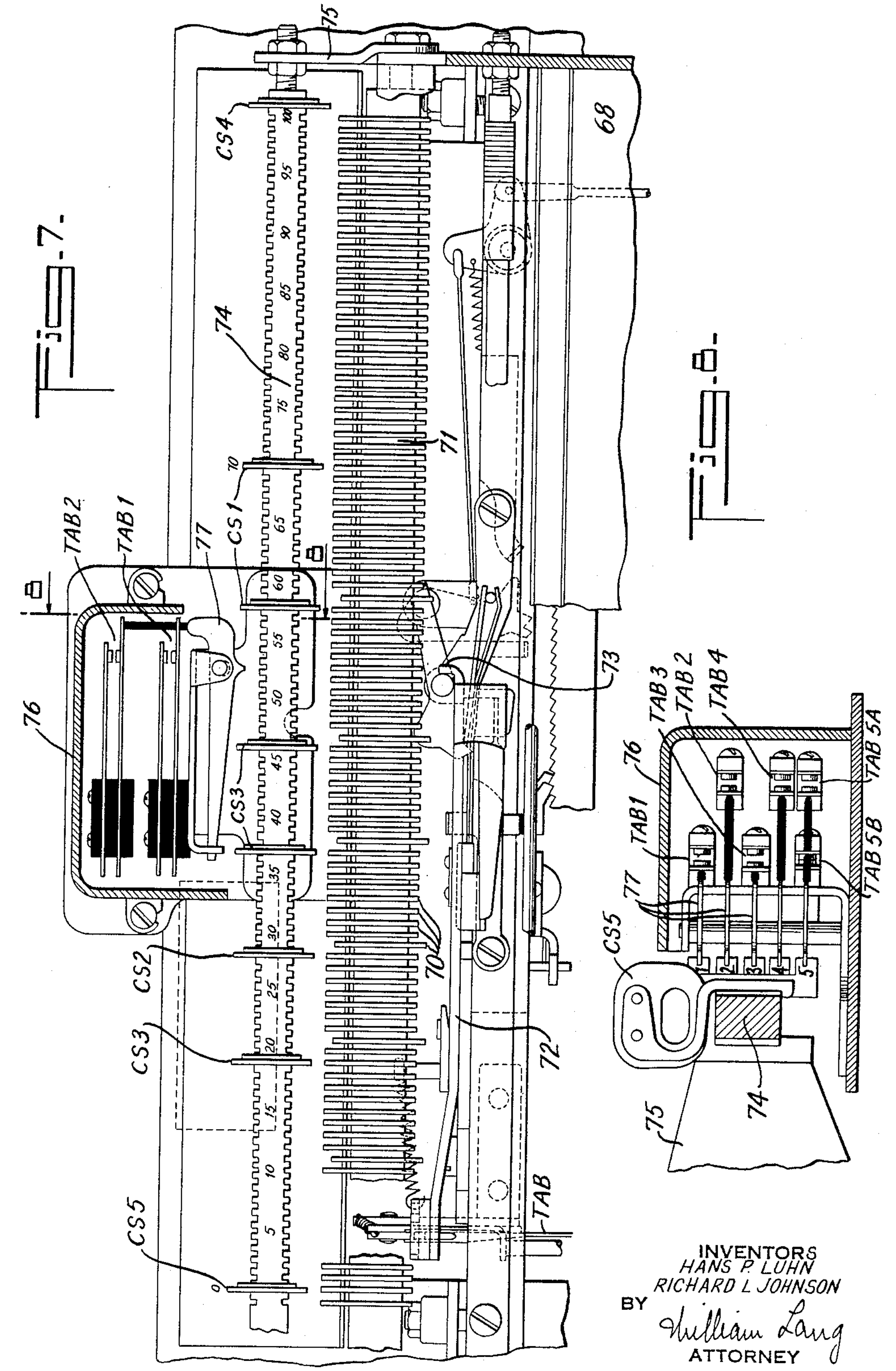

Fig. 7 is a detail of the skip bar of the typewriter carriage and the contacts controlled thereby.

Fig. 8 is a section taken on lines 8—8 of Fig. 7.

Figures 9, 10, 11:
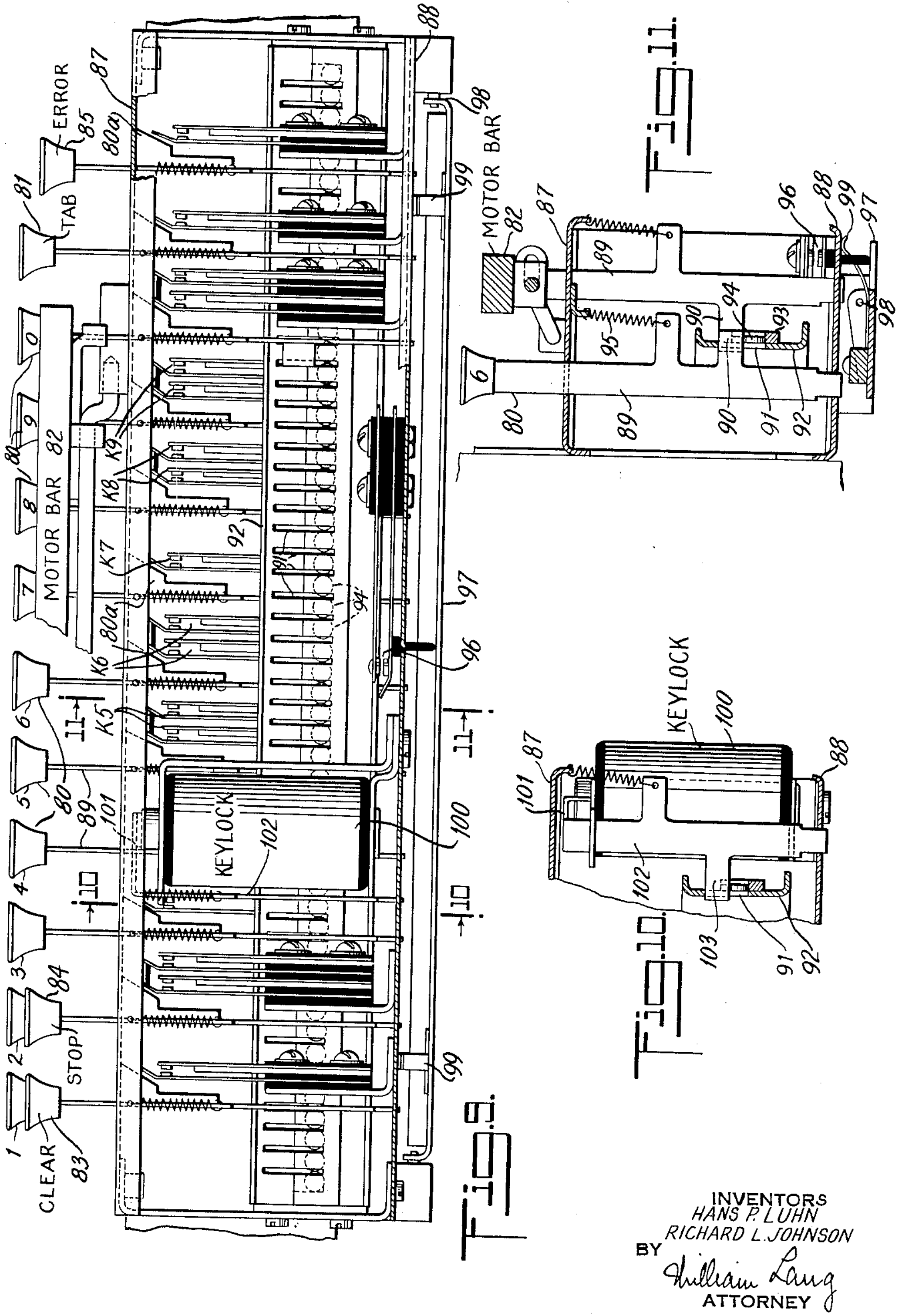

Fig. 9 is a section through the auxiliary keyboard taken on lines 9—9 of Fig. 5.

Fig. 10 is a section taken on lines 10—10 of Fig. 9.

Fig. 11 is a section taken on lines 11—11 of Fig. 9.

Figures 12, 13:
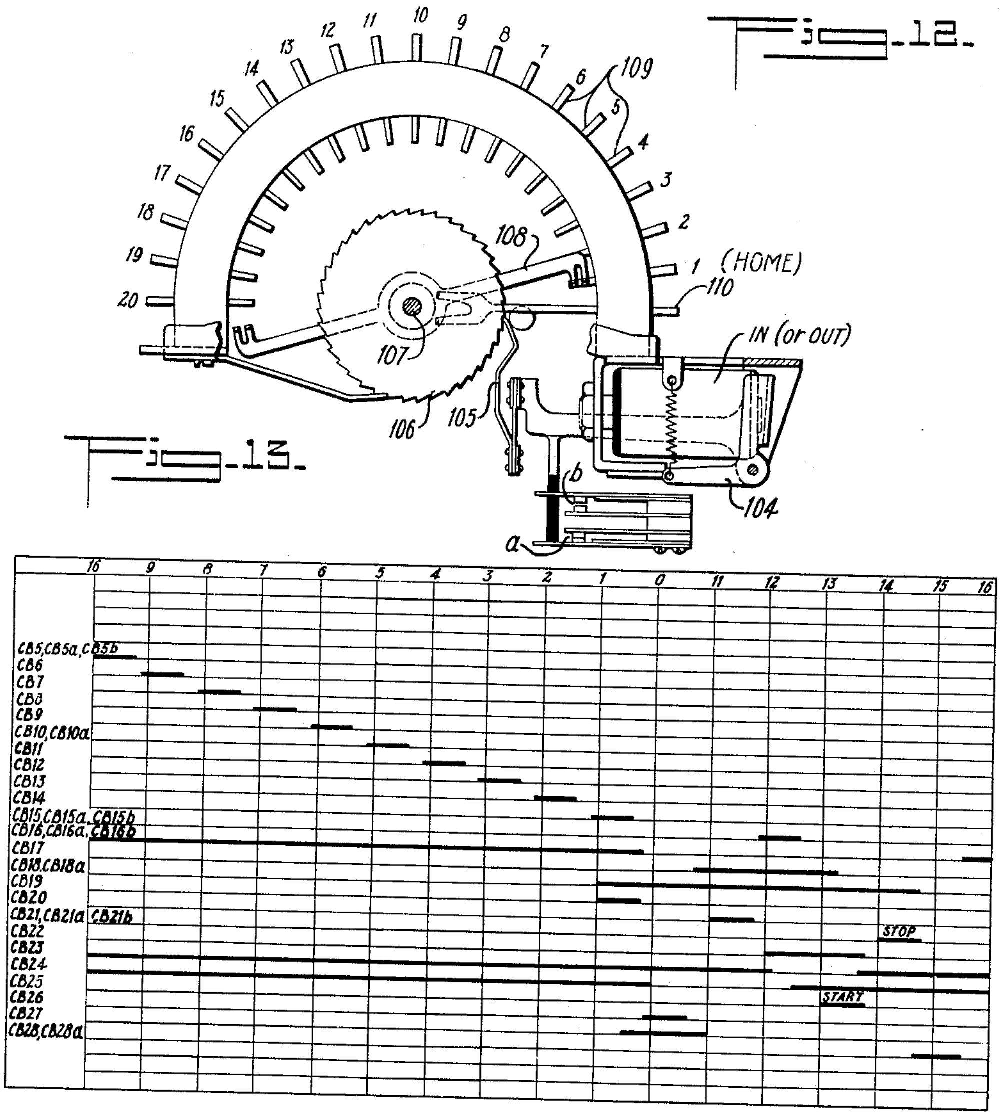

Fig. 12 is a detail of a stepping switch.

Fig. 13 is a time chart of circuit breaker devices identified as CB contacts.

Figure 14:
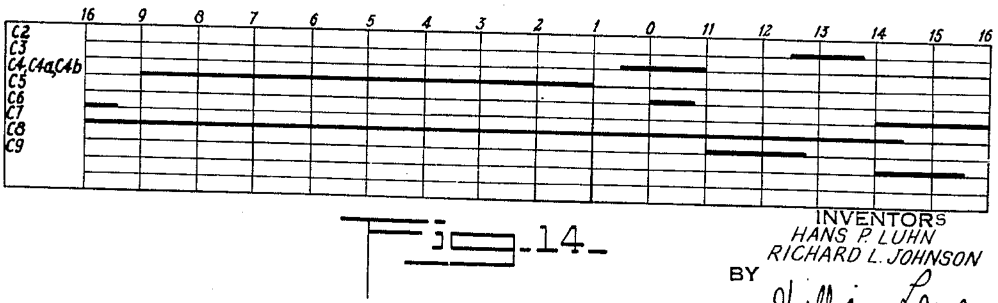

Fig. 14 is a time chart of circuit breaker devices identified as C contacts.

Figure 15:
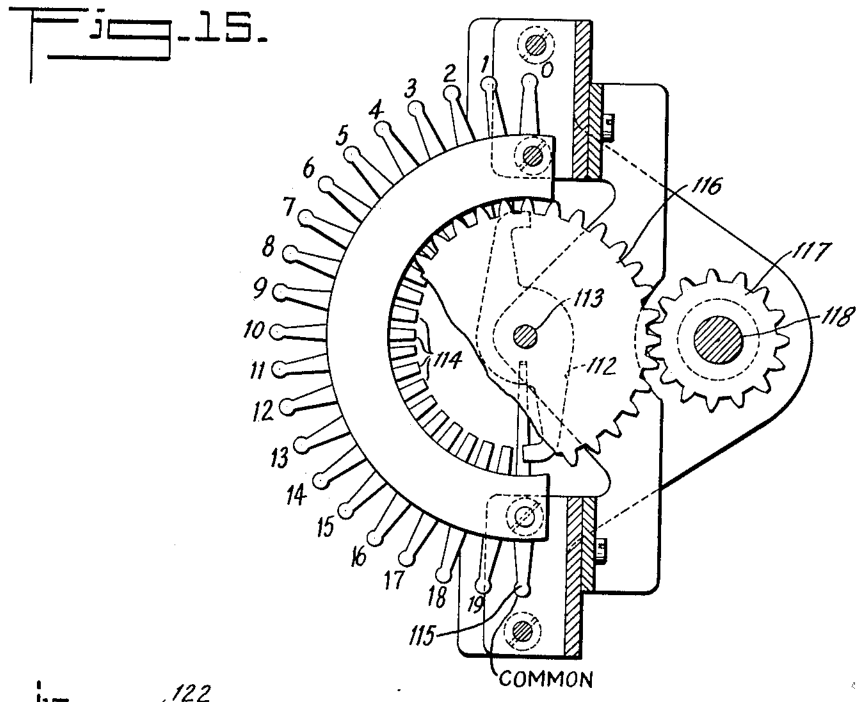
Figure 16:
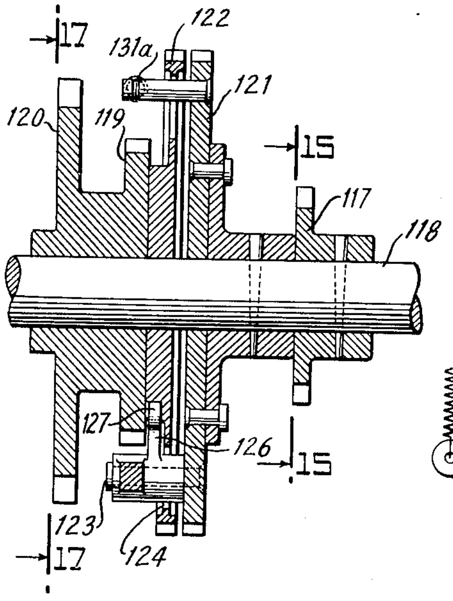

Fig. 15 is a sectional elevation of a switch constituting one section of the table lookup device and is viewed in the direction of lines 15—15 of Fig. 16.

Figure 17:
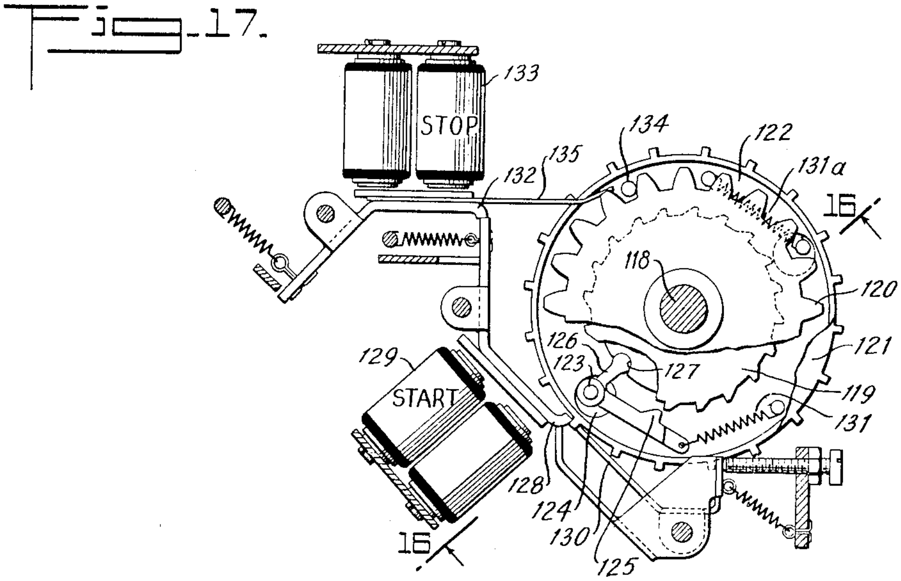

Fig. 16 is a section taken on lines 16—16 of Fig. 17 through the clutch connection of the table lookup device.

Figure 16A:
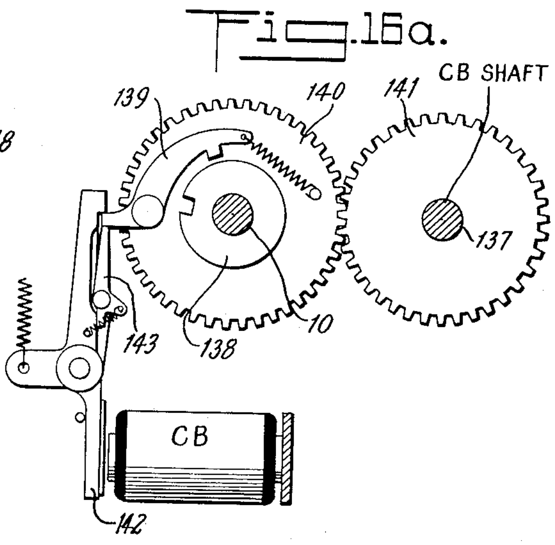

Fig. 16*a* is a detail of a one-revolution clutch.

Fig. 17 is a detail of the table lookup clutch in normal position.

Figure 18:
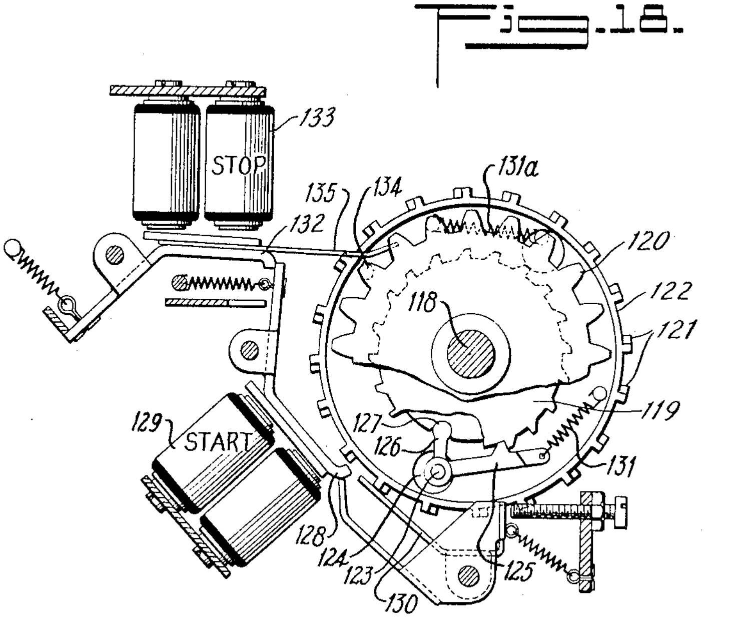

Fig. 18 is a detail of the table lookup clutch in operated position.

Figure 19:
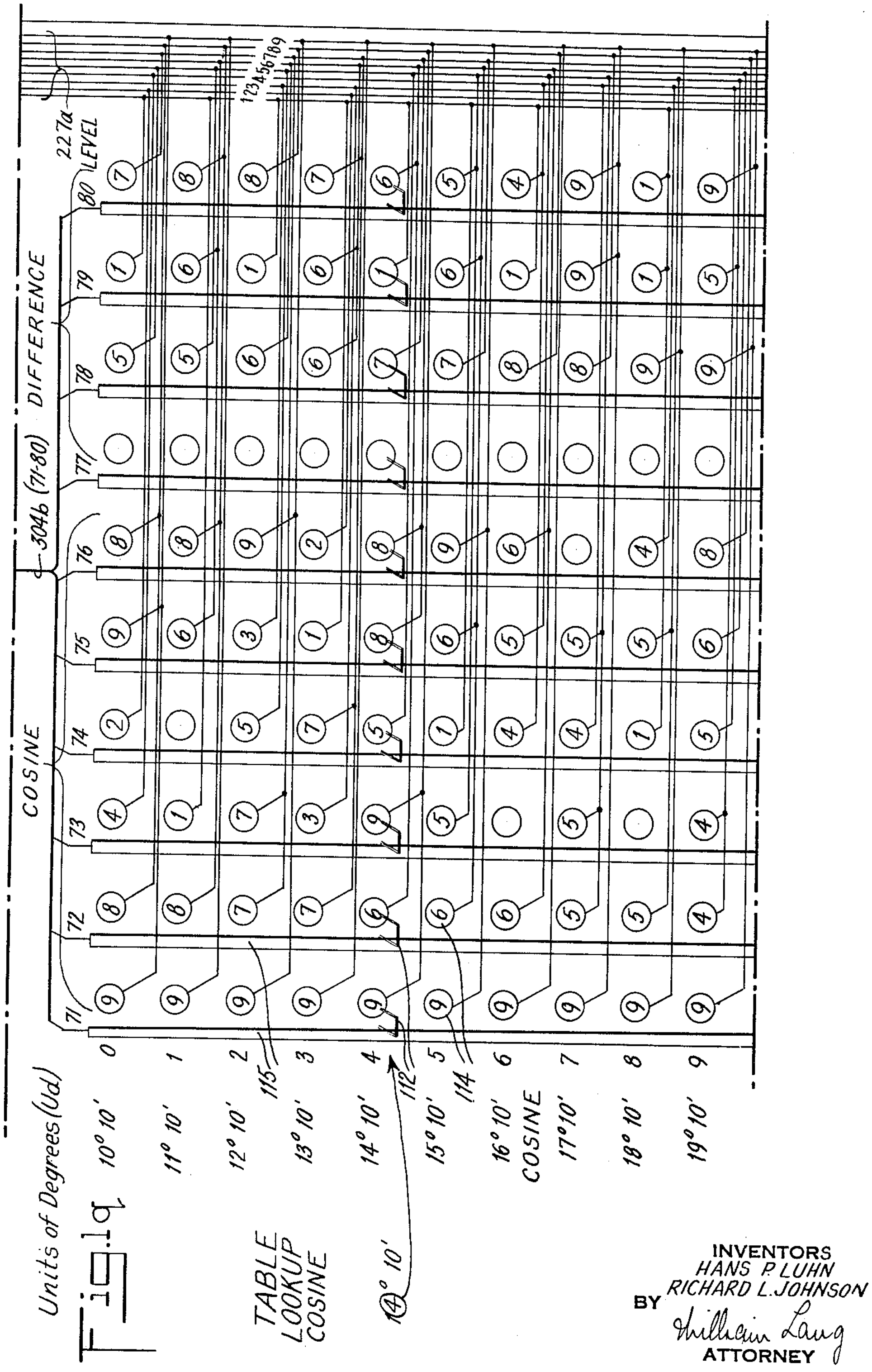

Fig. 19 is a diagram illustrating the surveying problem selected for illustration of the manner of operation of the machine.

Figures 19, 20:
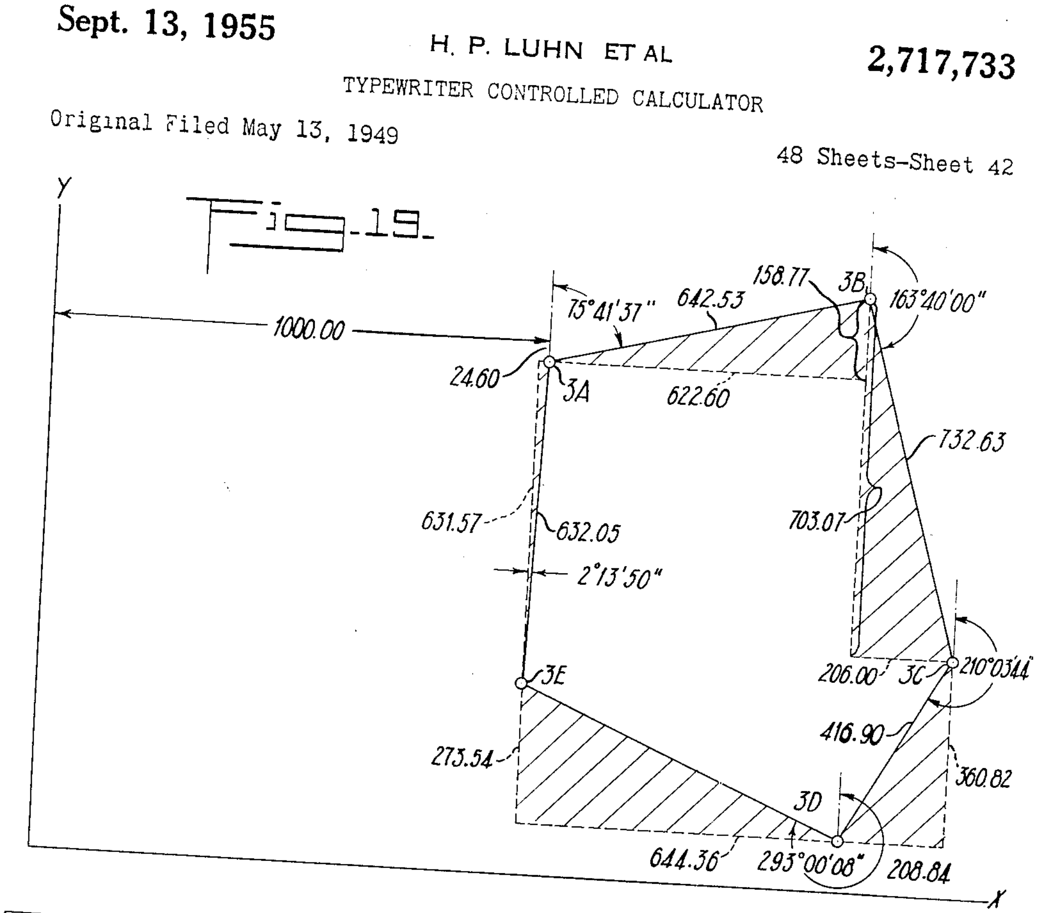
Figure 21:
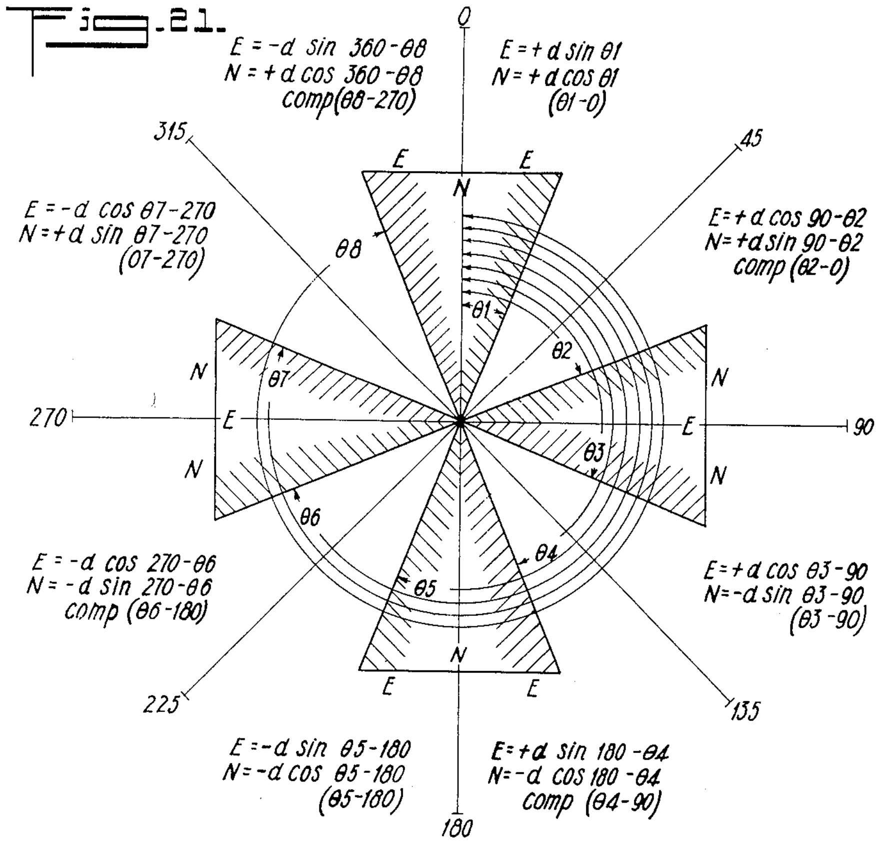

Fig. 20 is a sheet upon which the data entering into the computations is recorded.

Figure 21:
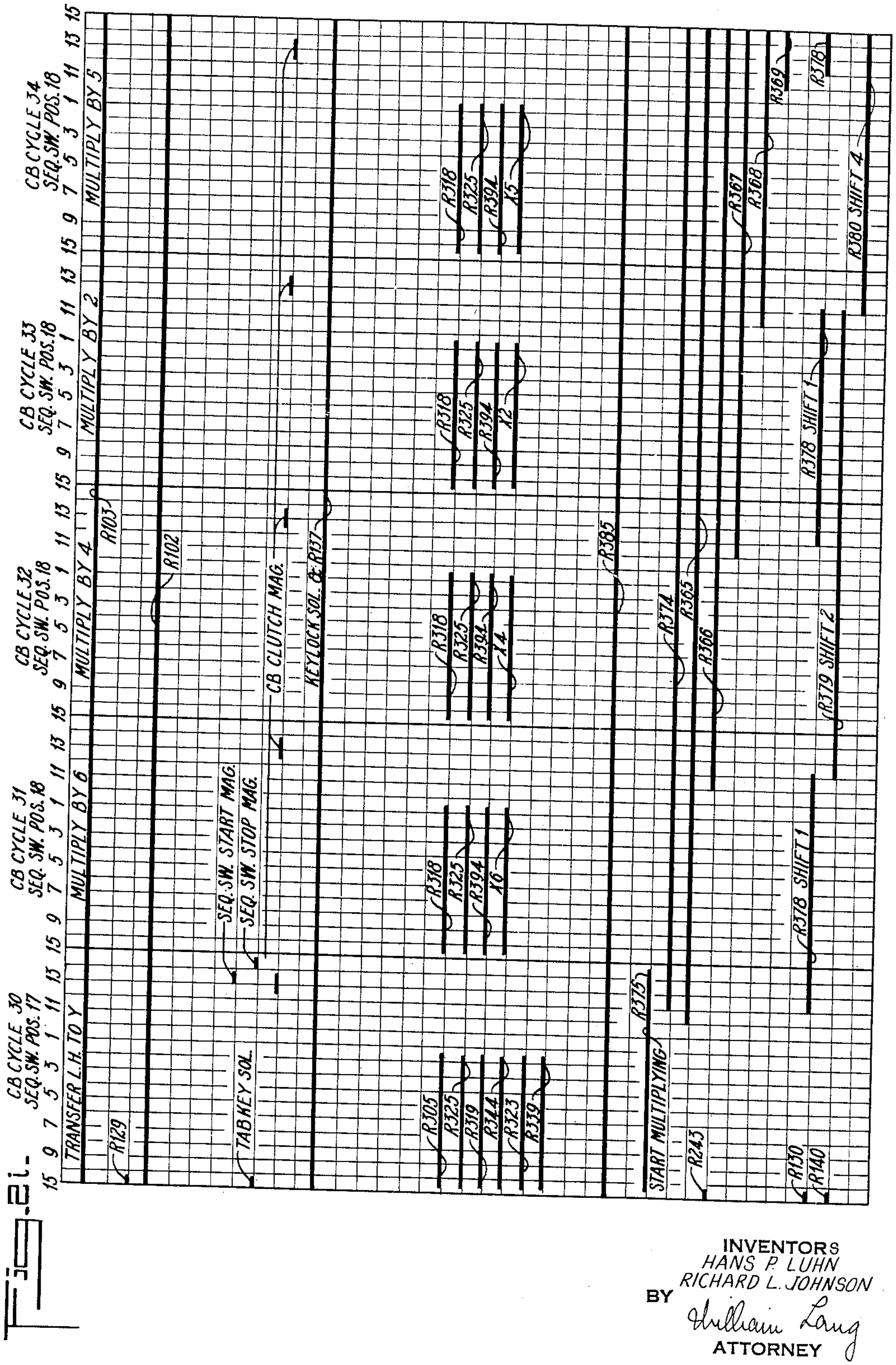

Fig. 21 is a diagram illustrating the manner in which various angles are identified.

Figure 22:
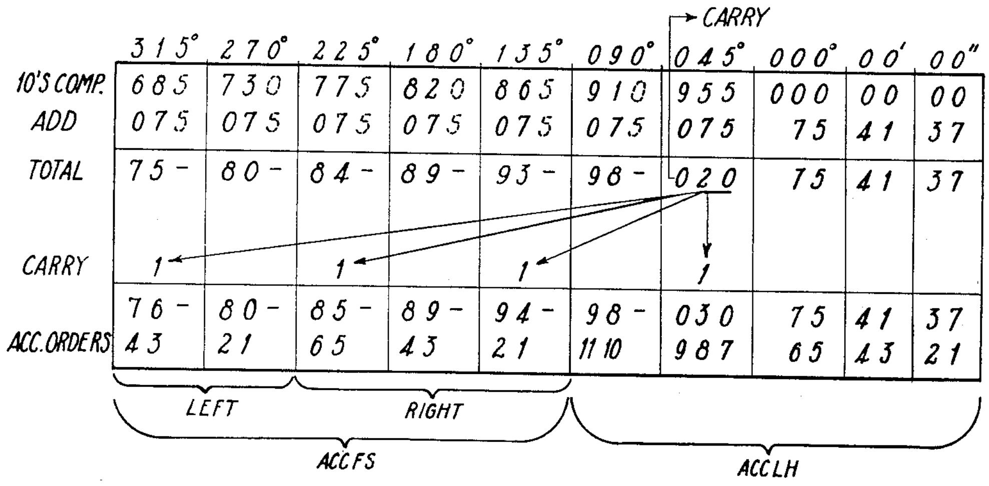

Fig. 22 is a chart illustrating the manner of entering angle values into the accumulator orders.

Figs. 23*a*, 23*b*, 23*c* and 23*d* arranged vertically in the order named constitute a chart showing the entries in certain of the accumulators throughout a succession of cycles of operation for a representative problem.

Fig. 23 is a diagram showing the table lookup arrangement.

In the following, an explanation will first be given of the several mechanical units of the apparatus followed by a description of the circuit diagram in connection with which a representative problem will be carried through the various steps leading to the solution thereof.

*The accumulating mechanism*

The accumulating mechanism is of the well known type disclosed in the Lake et al. Patent 2,328,653, granted Sept. 7, 1943, and one unit or order thereof is shown in Fig. 3. Its operation is as follows.

Each denominationally ordered accumulator unit comprises a mounting plate 9 (Fig. 3) which has fixed to it a sleeve 13 rotatably carrying a drive ratchet 12 and integral gear 19 (Fig. 4). Gear 19 is continuously driven by a gear 11 fixed on a shaft 10 which is in constant rotation from power source (not shown). Gear 11 makes one revolution a cycle and has sixteen teeth while gear 19 has ten teeth.

Rotatably carried by a hub of ratchet 12 is a disk 18 having ten teeth adapted to be engaged by a tooth 16 on the long arm of a clutch lever 17 to hold the disk against rotation in a counterclockwise direction. At the side of disk 18 is a register or adding wheel 26 rotatable on sleeve 13 and provided with ten peripheral notches. Wheel 26 may take any of ten rotative positions corresponding to values 0 to 9. A spring-pressed lever 27 engages with a notch of the register wheel to hold the wheel impositively and to center it in the value position to which it has been rotated. A transfer or tens carry cam 14 is fixed to the side of wheel 26 by a pair of studs 14a and 14b. These studs extend through openings of disk 18 to positions adjacents ratchet 12 where stud 14a pivotally carries a clutch dog 15 and stud 14b anchors one end of a spring 28. The other end of the spring is connected to the free end of dog 15 to urge a tooth of the clutch dog to engage ratchet 12.

In the position shown in Fig. 3, the clutch lever 17 is in declutching position, its tooth 16 is restraining rotation of disk 18 counterclockwise, and clutch dog 15 is clear of ratchet 12. The clutch dog is being held clear of ratchet 12 by coaction of a pin 29 on the dog with the upper portion of a cam edge 18a of disk 18. When the clutch lever 17 is dropped to cause its tooth 16 to release the disk 18 for counterclockwise movement, the spring 28 is effective to rock the clutch dog 15 into engagement with ratchet 12. During this movement of the clutch dog, its pin 29 rides down the cam edge 18a of disk 18 and cams the disk counterclockwise until its tooth, previously engaged by tooth 16, is to the right of the latter tooth. The parts are then in clutching position, shown in Fig. 4, and the register wheel 26 is coupled to the drive device 12—19 for rotation. Through engagement of the pin 29 of the clutch dog with cam edge 18a, the disk 18 is forced to rotate counterclockwise together with the register wheel.

When the clutch lever 17 is returned to upper, declutching position, its tooth 16 intercepts a tooth of disk 18 and stops the disk. The register wheel and clutch dog continue rotating while cam edge 18a of disk 18 cams the pin 29 of the clutch dog outwardly until it is again in its outer position. As the pin 29 is cammed outwardly, clutch dog 15 moves clear of the ratchet 12 and declutches the register wheel from the driving means. The register wheel is then held and centered in its new value position by lever 27.

A cycle of operation represented by a revolution of shaft 10 is divided into sixteen so-called cycle points designated as 9, 8, 7, 6, 5, 4, 3, 2, 1, 0, 11, 12, 13, 14, 15 and 16. To enter any signicant digit, clutching is effected at the correspondingly numbered cycle point, and later declutching at the 0 cycle point will leave the accumulating element or wheel 26 advanced a corresponding amount. The driving ratio is such that wheel 14 advances a tenth of a revolution for each cycle point of engagement and thus has ten rotative positions representative of the ten digits.

When ring 14 attached to wheel 26 stands at its rotative position 9, a carry lever 20 rocks to close 9's carry contacts 21 and, when the wheel passes from 9 to 0 position, 10's carry contacts 22 are closed and latched as shown in Fig. 3. To effect a carry entry of one unit, lever 17 is rocked counterclockwise after the 0 point in the cycle, and one point later it is rocked back again to effect uncoupling.

A magnet 25 designated Start, when energized, will rock lever 17 counterclockwise to start rotation of the accumulating wheel 26, and a second magnet 25 designated Stop, when energized, will rock lever 17 in reverse direction to stop rotation of the wheel. This second magnet is employed for subtracting operations wherein the 9's complement of a digit is entered by initially energizing Start magnet 25 at the 9 point in the cycle and thereafter energizing Stop magnet 25 at the cycle point corresponding to the value of the digit whose 9's complement is to be entered.

As usual in this type of accumulator, each wheel 26 has connected thereto a so-called readout brush 30 (shown diagrammatically in the circuit, Fig. 1*h*) which takes any of ten positions with relation to a series of contact segments 31 to effect an electrical connection between the segment and a common conductor 32. In the actual accumulator, the segments 31 and conductor 32 are circularly disposed as is well known, but in the circuit they are illustrated in a linear manner for more convenient explanation and circuit tracing.

*The typewriter*

In the illustrated embodiment, the selective printing on the data sheet is effected by a typewriter which will be recognized by those skilled in this art as being basically similar to a well known commercial form of power driven typewriter. The general principles of operation and features of construction of this kind of typewriter are fully disclosed in a number of United States patents, among which are Patents No. 1,777,055, granted September 30, 1930, and No. 1,873,512, granted August 23, 1932. As will be apparent as the description proceeds, the typewriter includes certain changes and additions over the commercial form referred to, which were made to suit the requirements of the illustrated embodiment.

The structural features of the typewriter are disclosed in Figs. 5 to 11 and the key arrangement of its main keyboard 50 and auxiliary keyboard 51 is shown somewhat diagrammatically in Fig. 5. The keys composing the main keyboard each comprise a key cap mounted on a related key lever 52 (Fig. 6) and each key may be actuated by manually depressing its related key cap, and it may also be selectively operated by a solenoid 53.

The solenoids related to the digit printing keys for digits 1 to 9 are arranged in a line above a bail 54, so that when any of these nine solenoids is energized, its plunger will move down to rock bail 54, and thereafter close a pair of contacts 55.

The type bars 65 of the typewriter, one of which appears in Fig. 6, are pivotally mounted in a type basket 56 and each bar carries the usual type. Each time a character key is depressed, a corresponding cam unit 57 si operated by releasing a latch 58 from a cam 59, thereby permitting a spring-pressed lever 60 to move the cam 59 against the periphery of a continuously rotating motor-driven power shaft 61. The cam 59 is then rotated by frictional contact with the shaft 61 thereby causing the carrier 62 of the cam to rock in a direction for pulling a link 63 which, through a suitable link-and-lever arrangement, propels the corresponding type bar 65 toward the platen 64 to effect printing of the character on the sheet. During the final increment of movement of the type bar, it strikes a universal bar 66 to actuate, through suitable linkage, an escapement lever 67 for releasing the escapement mechanism and thereby to effect a spacing movement of the carriage 68. A pair of contacts 69 is provided and arranged to be opened by the escapement lever 67 whenever the latter is actuated.

Depression of the usual space bar directly or through a related solenoid 53 similarly results in downward movement of a key lever 52 to effect operation of a cam unit 57 and thereby operate suitable linkage for actuating the escapement lever 67 to cause a character space operation. The linkage and the escapement mechanism operated by the lever 67 are not disclosed in detail herein as they do not per se form a part of the present invention. They are fully disclosed in the above-mentioned Patent No. 1,873,512.

The carriage return mechanism is operated by depressing the related key and is of the type disclosed in United States Patents No. 2,104,559, granted January 4, 1938, and No. 1,753,450, granted April 8, 1930. As is usual in the power driven typewriter shown, the carriage return movement is accompanied by a line spacing operation. After the carriage has been returned and a single line spacing operation effected as an incident thereto, a repeated depression of the carriage return key merely causes an additional line space operation.

The tabulating mechanism operated by the related key is such as shown in United States Patent No. 1,935,436, granted November 14, 1933, and United States Patent No. 2,451,722, granted October 19, 1948, and includes the usual settable tab stops 70 (Figs. 6 and 7) which are pivotally mounted on a rack bar 71 extending across the back of the machine. As is disclosed fully in the last-mentioned patents, the depressing of the tab key effects movement of a tab lever 72 to an operated position where the end 73 thereof lies in the path of the preset tab stops 70. The movement of the tab lever also releases the escapment mechanism to permit tabulating movement of the carriage 68. When the carriage 68 reaches the character space position where a regular tab stop 70 has been preset, the end 73 of the tab lever 72 is engaged by the preset stop 70 and thereby stops the carriage 68 and restores the tab lever 72 to its normal position at such character space position.

As shown in Figs. 5, 6, 7 and 8, a special or extra rack bar 74 is mounted on the back of the carriage 68 for movement therewith, and is fixed at its two ends to rearwardly extending support plates 75, which are suitably fixed to the two end plates of the carriage 68. As shown, the special rack bar 74 is formed with a plurality of pairs of vertical grooves, each pair being formed on opposite sides, respectively, of the bar 74 and extending in a common transverse vertical plane. The several pairs of grooves correspond, respectively, to the character-space positions of the carriage, the same as the regular settable tabular stops 70 previously described. Each of the pairs of grooves is adapted to receive any one of five kinds of control stops indicated respectively by the reference characters CS1 to CS5.

Each of these control stops functions when the carriage 68 reaches the character-space position corresponding to the pair of grooves where such control stop has been placed to actuate a related pair of interlock contacts mounted within a contact assembly 76 fixed to the rear portions of the typewriter frame. As will appear more fully hereinafter in the description of the operation in connection with the circuit diagram, there is a separate pair of interlock contacts actuated by each of the five kinds of control stops CS1 to CS5. Such contacts are designated as TAB1, TAB2, etc. (Figs. 7 and 8) and are located in interlock circuits for controlling certain operations of the apparatus disclosed herein.

Each pair of contacts is actuated by a separate related lever 77 when the latter is engaged by a contact actuating tab formed on its related control stop.

In Fig. 7, the character space positions of the typewriter which correspond respectively to the different pairs of grooves are indicated on the rack bar 74 by corresponding numerals, and the control stops CS1 to CS5 are located in the pairs of grooves of the rack 74 they will occupy when the apparatus in the illustrated embodiment is operated to effect the automatic typing of the data appearing on the sheet shown in Fig. 20.

In Fig. 6 the cam actuated lever associated with the carriage return key is designated 75 and, when this is actuated by the power roller 61, it closes pairs of contacts 78*a* and 78*b* whose functions will be explained in connection with the circuit diagram.

*The auxiliary keyboard*

As stated hereinabove, the auxiliary keyboard 51 (Figs. 5 and 9) is arranged at the front of the main keyboard 50 and comprises ten digit keys 80, a TAB key 81, and a motor bar 82, which may be manually operated to store numeric values in a relay storage unit. The auxiliary keyboard 51 appears in plan in Fig. 5 and is shown in the sectional views (Figs. 9, 10 and 11). In addition to the keys named, the auxiliary keyboard comprises certain functional control keys which are identified in Fig. 5 as follows: a clear key 83, a stop key 84 and an error key 85, the operation of which will all be explained in the circuit description.

The auxiliary keyboard 51 is suitably fixed to the frame of the typewriter and comprises a top frame plate 87 (Fig. 9) and a bottom frame plate 88 joined together by suitable end plates. Each digit-representing key 80 and the TAB key 81 comprises a key cap mounted on a vertically movable bar 89 which extends through aligned openings in the top and bottom plates 87 and 88, respectively. An integral projection 90 extends laterally from each bar 89 and is slidable within a related slot 91 formed in a guide comb plate 92, the latter being fixed. A bar 93 is fixed across the front of the comb plate 92 and is provided with transverse vertical slots aligned with the slots 91 of the comb plate 92, and the bar 93 is also provided with a recess extending for its length thereof and filled with a multiplicity of interlock rollers 94 as shown in Fig. 9. As is well known, the number of rollers 94, their dimension, and the length of the recess in the bar 93 are such that, when any key is depressed, the projection 90 moves to the bottom of its aligned slots 91, and in so doing the rollers 94 are displaced laterally of the recess in the bar 93, so that a roller 94 will then extend across each of the other slots and will thereby prevent any of the other keys having projections 90 from being depressed until the key previously depressed is restored to its normal or inactive position shown. The motor bar 82 is mounted on two such vertically slidable bars 89, but only one of such bars is provided with a projection 90 extending into a slot 91 of the comb plate 92 and an aligned slot in the bar 93. Each of the keys 83, 84 and 85 also comprises a key cap and a vertically slidable bar 89, but the bars thereof are not provided with interlocking projections. Tension springs 95 serve to return all keys of the auxiliary keyboard 51 to their upper or normal positions shown, when such keys are released by the operator.

Each key and the motor bar of the auxiliary keyboard closes one or more pairs of related key contacts when such key is depressed. As shown in Fig. 9, a contact actuating wedge 80*a* is fixed to a side of each of the bars 89 and to the righ-hand bar 89 of the motor bar 82. As each key and the motor bar is depressed, its wedge engages the upper inclined end of a movable spring contact blade and thereby cams such movable blade to the right to close related contacts. The contacts closed by the digit keys 1 to 9 are indicated in Fig. 1*f* by the reference numerals K1 to K9, inclusive.

A pair of bail contacts 96 (Figs. 9 and 11) are also closed each time one of the digit keys 80 is operated and each time the TAB key 81 is operated. To this end a bail 97 extends lengthwise beneath the bottom frame plate 88 and is pivoted at its end, as indicated at 98. The bail extends beneath the lower ends of each of the bars 89 of the digit keys 80 and the TAB key 81. One side of the bail extends beneath a contact actuating pin which is fixed to the lower movable blade of the pair of bail contacts 96. Thus, when any one of the keys 80 or the key 81 is depressed, the lower end of its bar 89 engages and thereby rocks the bail 97 counterclockwise as viewed in Fig. 11 to close the contacts 96. Leaf springs 99 fixed to the bail and engaging the under side of the bottom frame plate 88 return the bail to the position shown in Fig. 11, when the keys are released, and thereby permit the contacts 96 to open due to the inherent spring force of their blade.

Means is provided for locking the digit keys 80, the TAB key 81, and the motor bar 82 so that they cannot be depressed. This means is shown in Fig. 10 as being in the form of a solenoid 100 including an armature 101 to which is attached a bar 102 like the bars 89 of the keys 80. The bar 102 includes a projection 103 movable within aligned slot 91. Thus, when the solenoid 100 is energized, its projection 103 is moved downward in its slot 91 and thereby displaces the interlock rollers 94 laterally and, as a result, none of the keys 80, 81 or bar 82 can then be depressed. A tension spring serves to restore the bar 102 and armature 101 when the locking magnet 100 becomes deenergized.

*In and Out stepping switches*

The apparatus is provided with two stepping switches of well known construction, one of which is illustrated in Fig. 12. Each switch comprises a stepping magnet In (or Out) which upon energization will rock its armature 104 counterclockwise to draw down a spring biased pawl 105 an extent so that, upon deenergization of the magnet, ratchet 106 will be advanced counterclockwise one tooth or step. Ratchet 106 is secured to a shaft 107 to which there is also secured a plurality of wipers 108 which traverse spaced contact segments 109. A common conductor 110 makes constant contact with related wiper 108 and therethrough their is an electrical connection made between common conductor 110 and individual segments 109.

Each wiper 108 and a related set of segments 109 and conductor 110 constitutes a section or level and in the circuit diagram these will be suitably identified. When magnet In (or Out) is energized, its armature closes a pair of contacts designated *b* and opens a pair of contacts designated *a* (Fig. 12). Ratchet 106 has forty teeth, and wiper 108 being double ended will make a full sweep of the twenty magnets 109 for twenty operations of magnet In starting from the 1 or Home position.

*Table lookup switches*

The table lookup switches are similar to the stepping switches in their circuit closing arrangement (Fig. 15) in that a wiper 112 on a shaft 113 is rotated counterclockwise in increments of $\frac{1}{40}$ of a revolution to successively engage twenty individual segments 114 numbered 0 to 19. A common conductor 115 serves to supply current to the wiper. For table lookup purposes, three sets of wipers are provided with one set related to tens of degrees having ten sections or levels, a second set related to units of degrees having fifty sections or levels, and a third set related to tens of minutes having three hundred sections or levels.

Each set has its wipers secured to the related shaft 113 and this is advanced through the mechanism shown in Figs. 15 to 18. A gear 116 secured to the end of shaft 113 meshes with a gear 117 on a shaft 118 with a 2 to 1 ratio so that, if shaft 118 advances $\frac{1}{20}$ of a revolution, wipers 112 will advance $\frac{1}{40}$ of a revolution or one step.

Freely rotatable on shaft 118 is a ratchet 119 and integral gear 120, which latter is suitably driven from the constantly running cyclic shaft 10 to make one revolution for each cycle of the machine. Secured to shaft 118 is a square toothed wheel 121 and coaxial therewith is a similar wheel 122 freely mounted on the shaft. Wheel 121 has a pin 123 secured therein which extends through an opening 124 in wheel 122 and supports a clutching dog 125 having an integral finger 126 fitted into a notch 127 of the hub of wheel 122. A pair of aligned teeth of the two wheels 121 and 122 are normally blocked against clockwise rotation by the lower ends of the armature 128 of start magnet 129 and against counterclockwise movement by a spring urged lever 130. With the wheels so held, dog 125 will be maintained in the position of Fig. 17 where spring 131 tends to urge it counterclockwise about pin 123 and to urge wheel 122 through finger 126 in a clockwise direction.

Upon energization of Start magnet 129, armature 128 releases the wheels and spring 131 assisted by a spring 131*a* will then effect relative rotation of the wheels which will enable dog 125 to engage driving ratchet 119, so that wheel 121 will be driven and cause advance of the wipers 112. When magnet 129 is energized, its armature rocks to permit the right end of the armature 132 of Stop magnet 133 to snap into the position of Fig. 18 where it holds armature 128 in releasing position.

Stop magnet 133 may be energized after one or more steps of advance to free armature 128 which will thereupon swing into position to intercept a pair of related teeth of wheels 121, 122 by first engaging the tooth of wheel 122 holding it back while wheel 121 advances to bring its tooth into alignment and at the same time due to the relative rotation of the wheels dog 125 will be disengaged from ratchet 119.

Provision is made in the form of a pin 134 for engaging an extension 135 of stop armature 132 when the wheel advances from its 19 to its 0 or home position.

*Sequence switch*

Figure 1A:
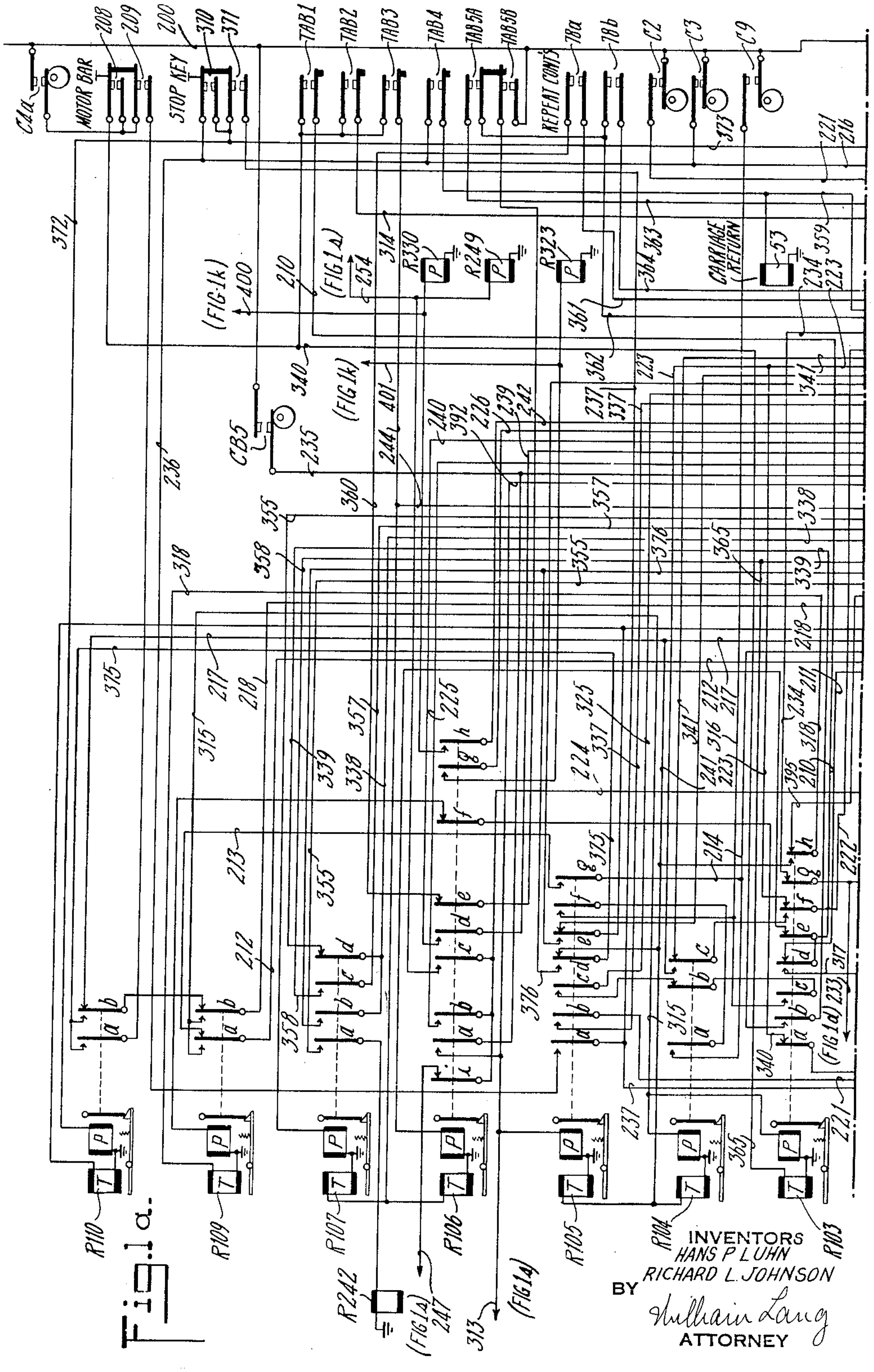
Figure 1B:
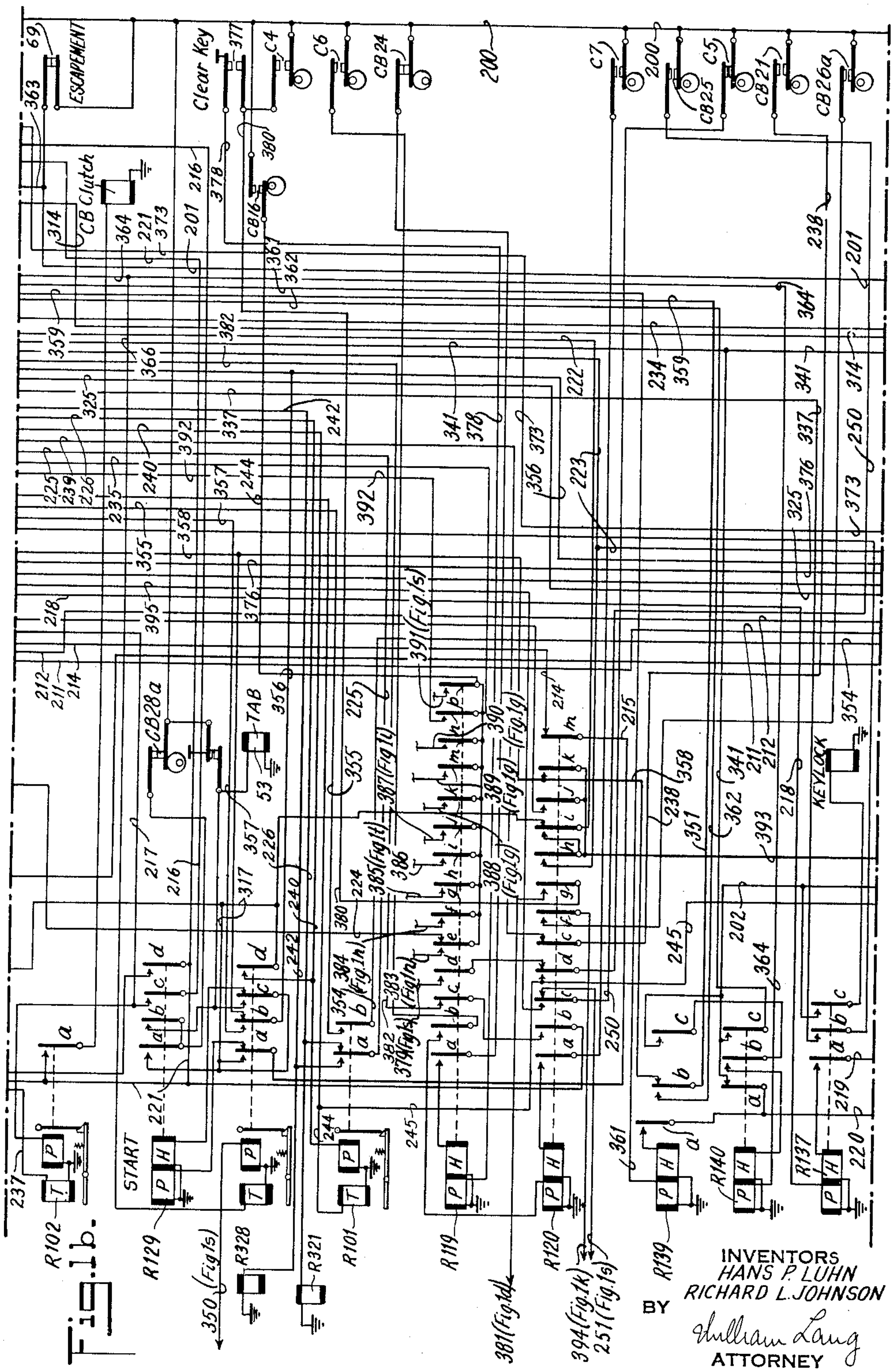
Figure 1C:
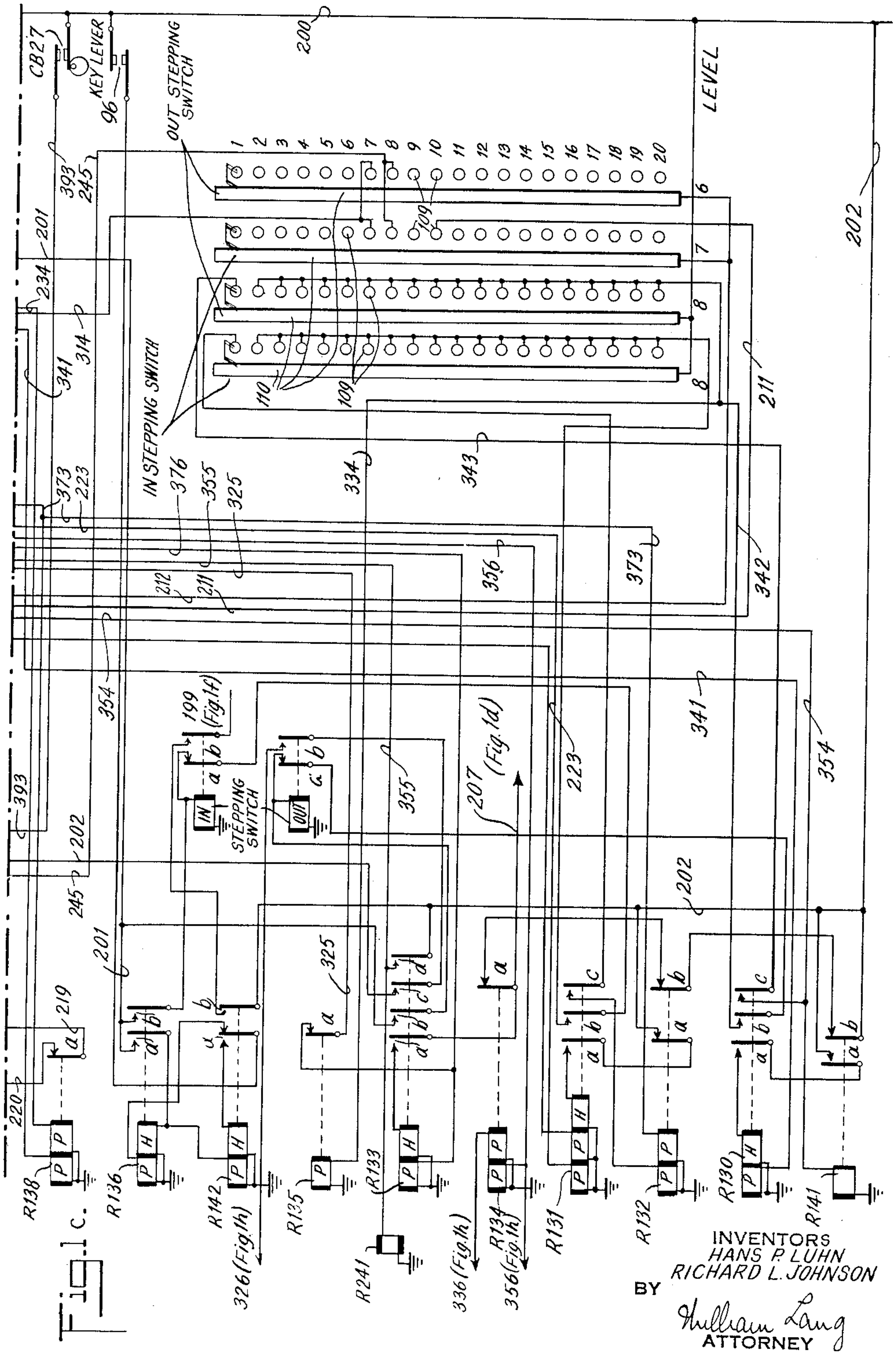
Figure 1D:
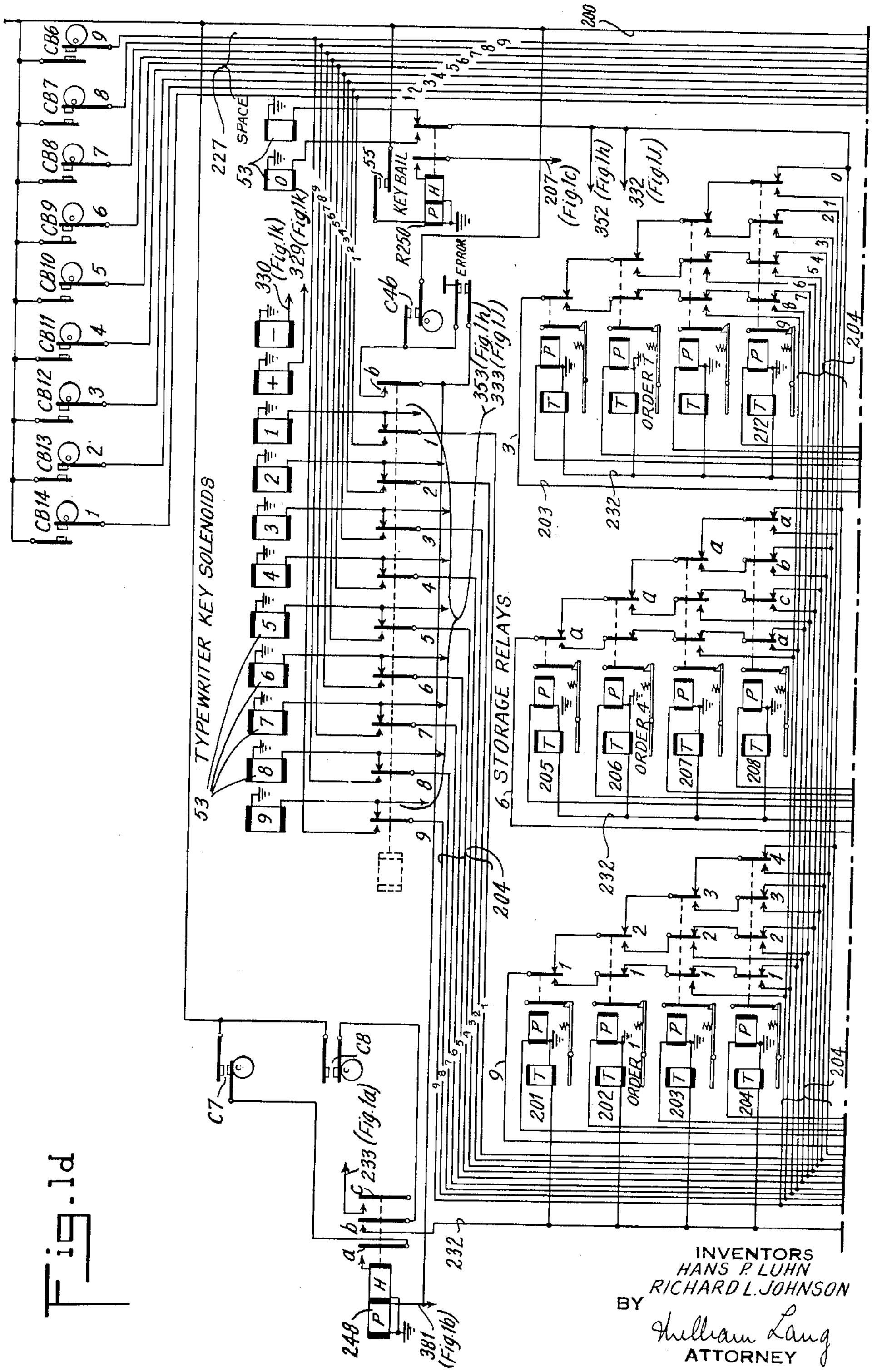
Figure 1E:
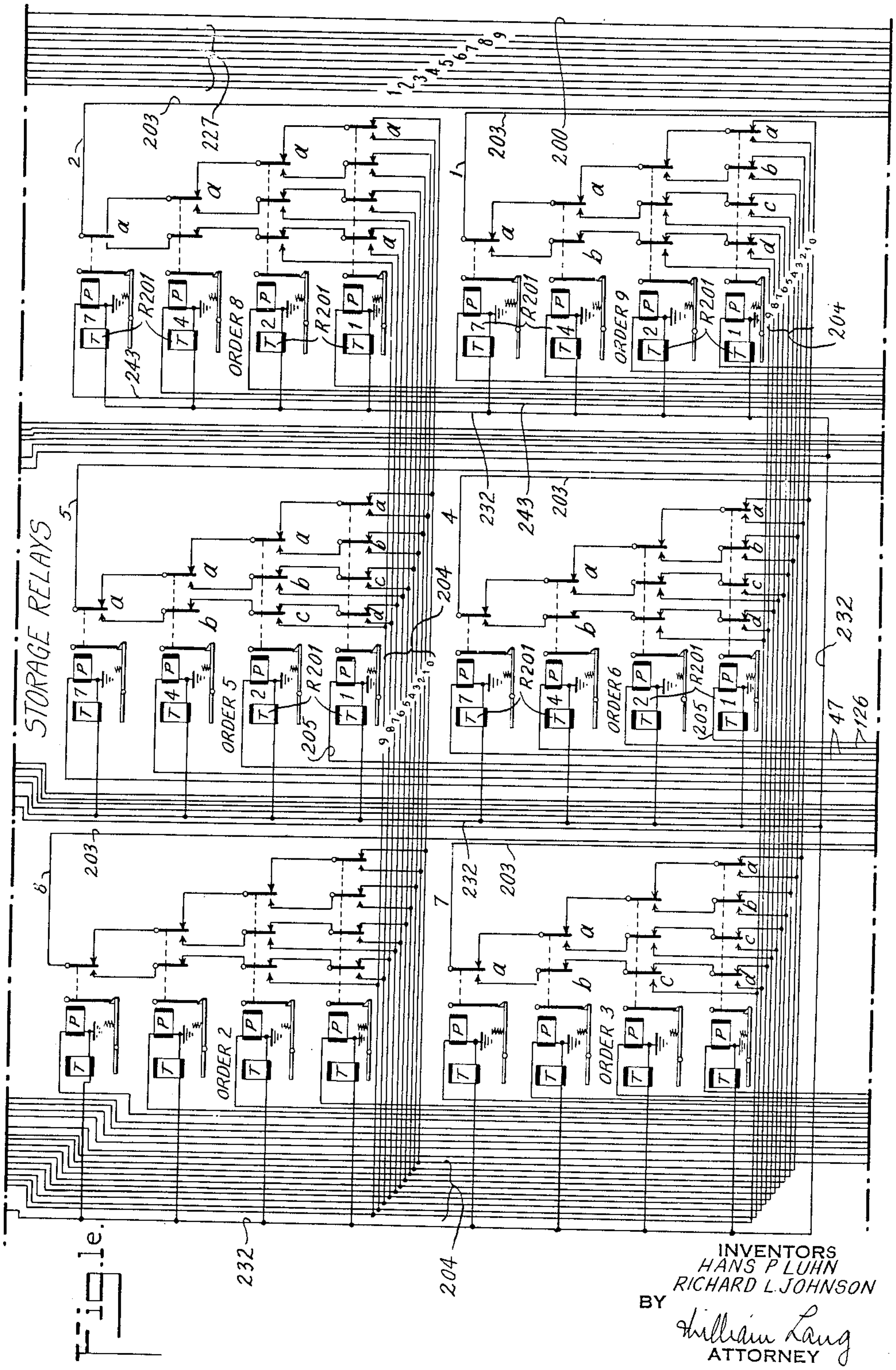
Figure 1F:
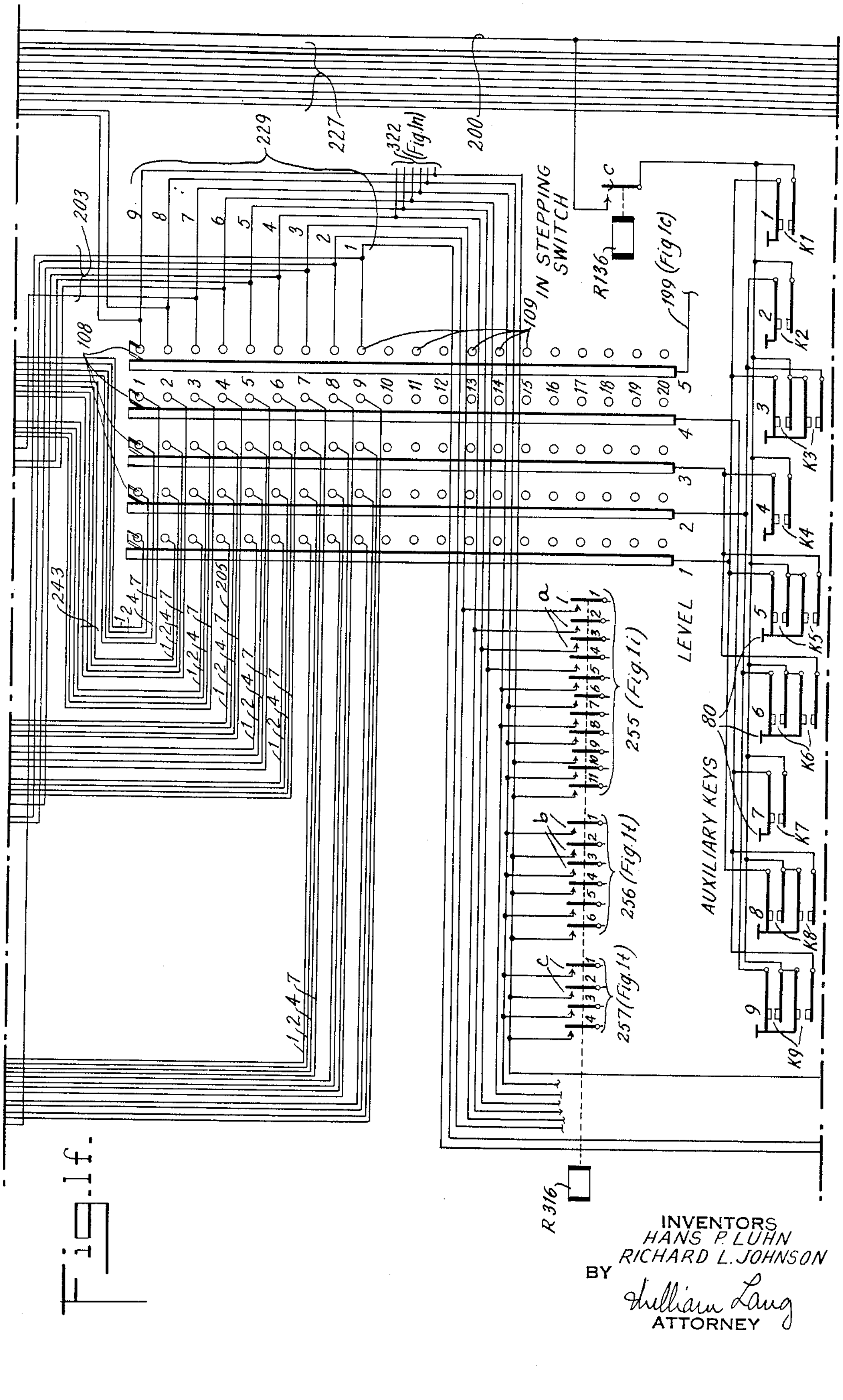
Figure 1G:
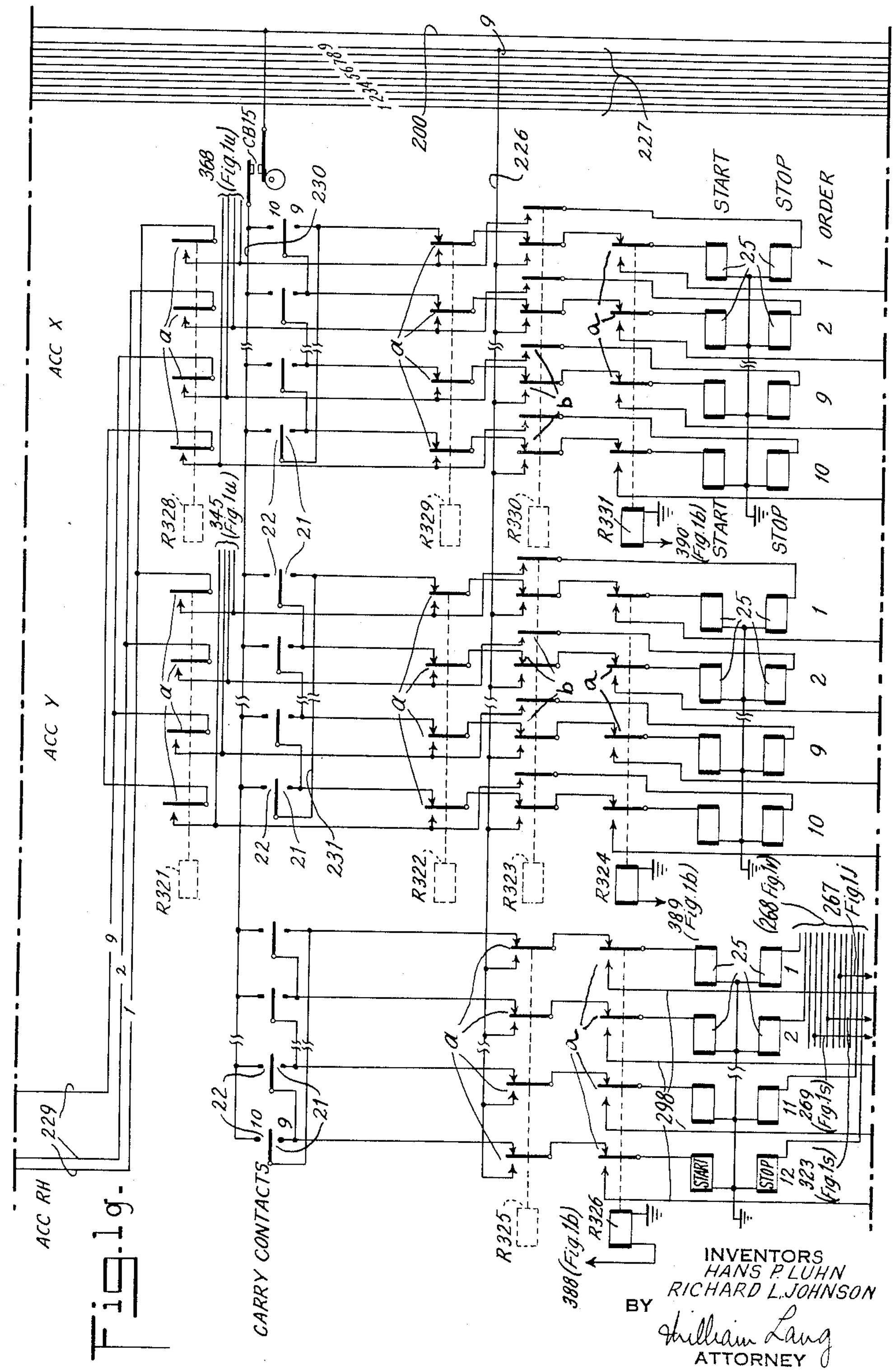
Figure 1H:
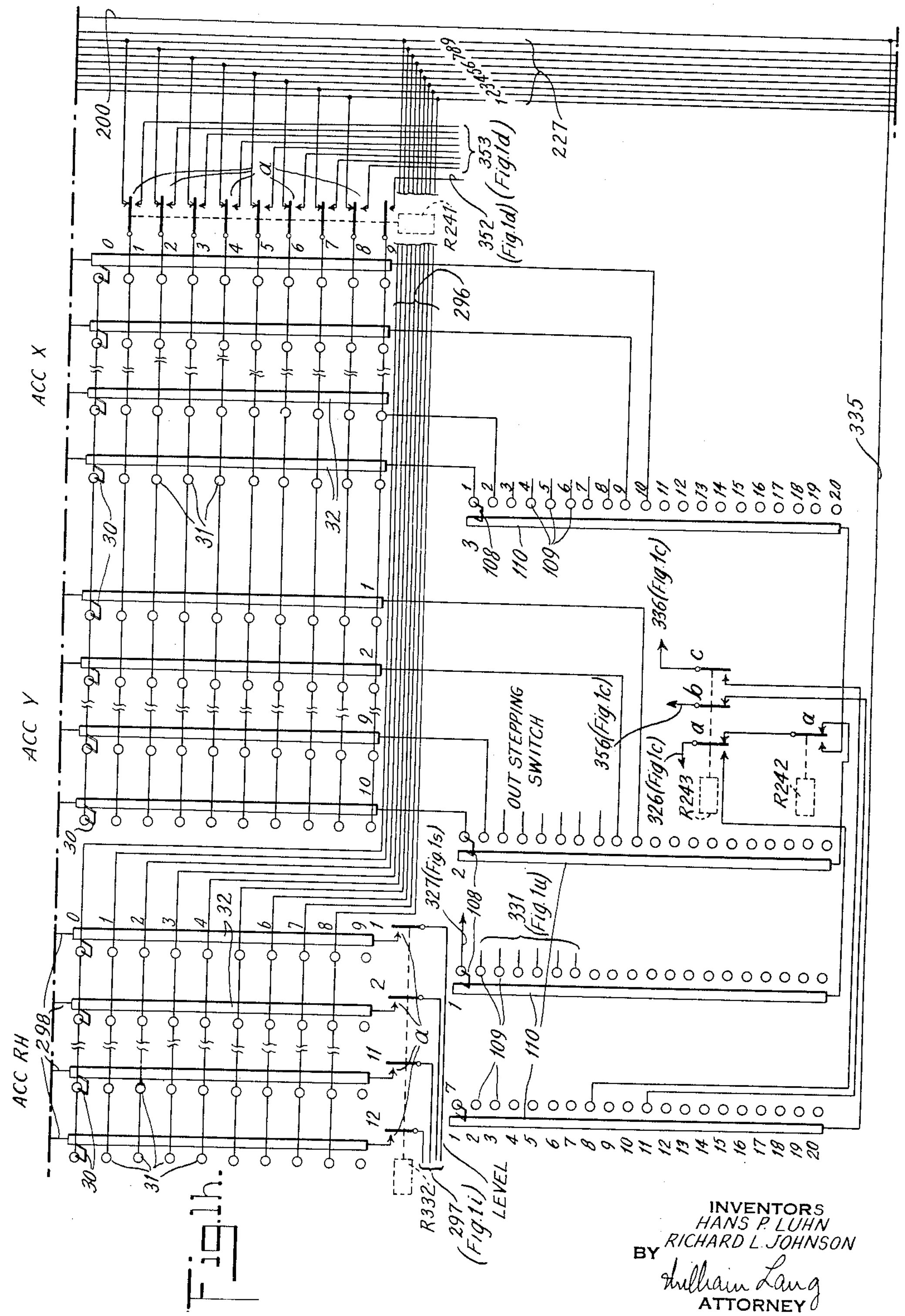
Figure 1I:
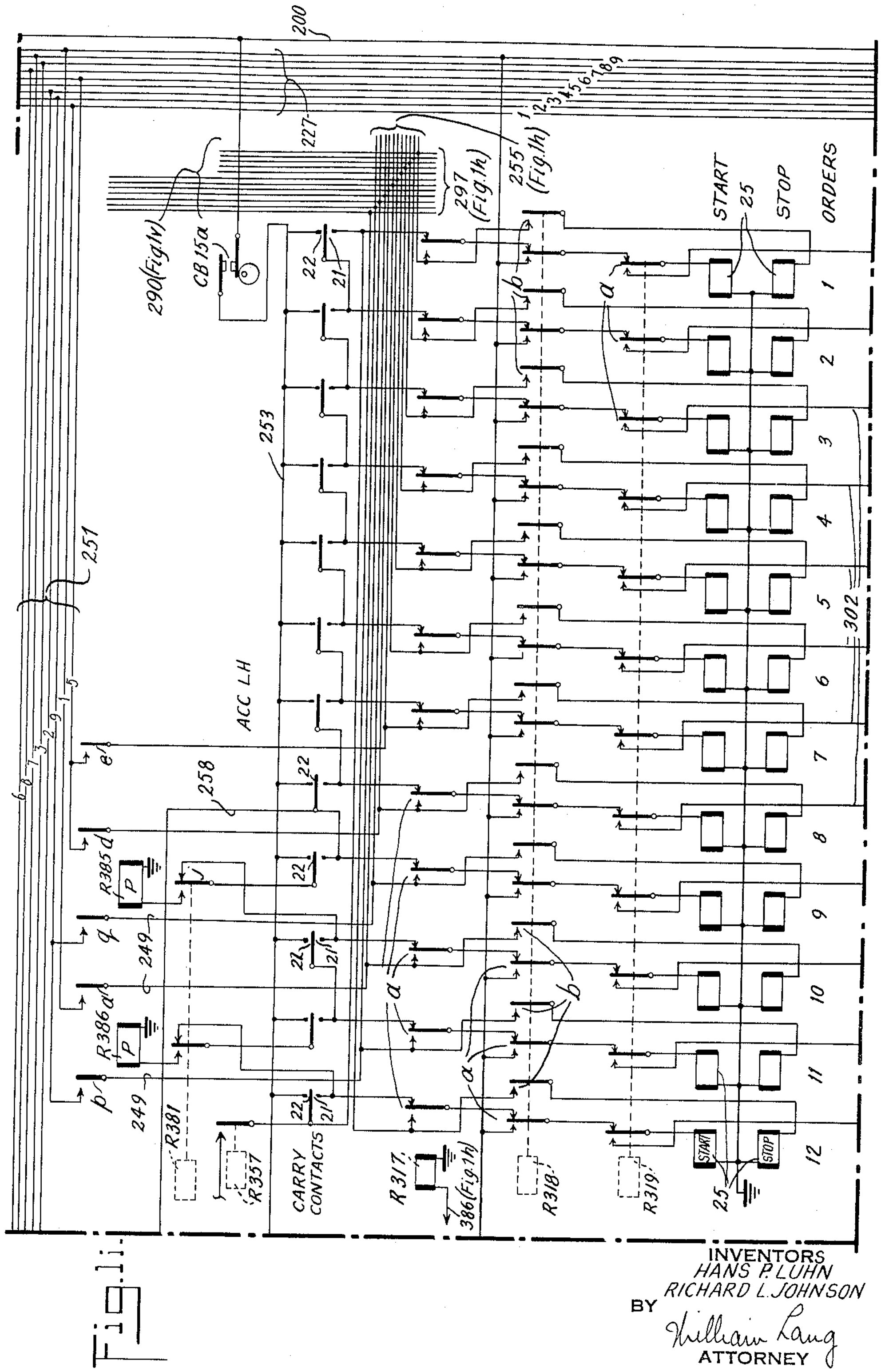
Figure 1J:
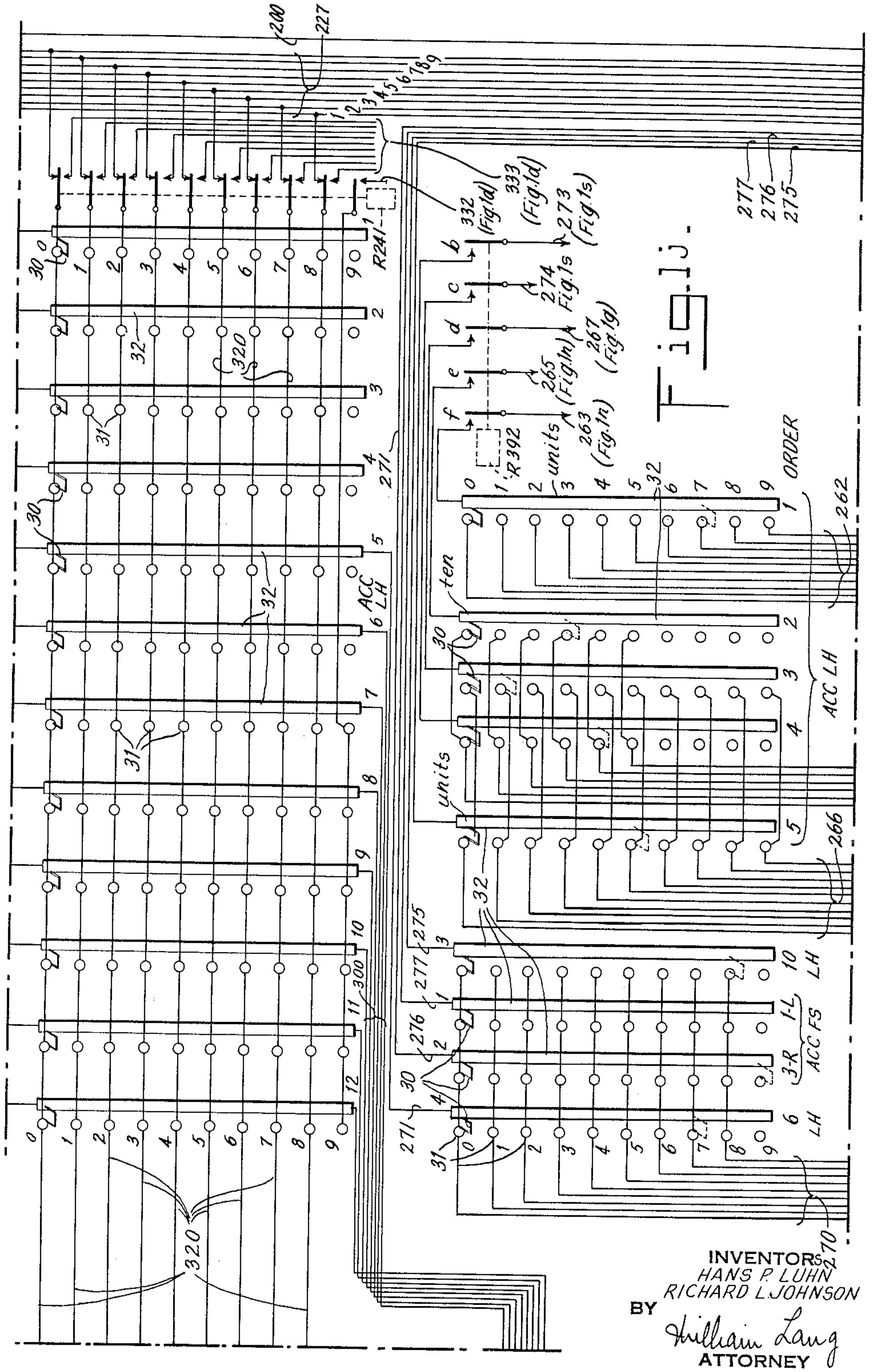
Figure 1K:
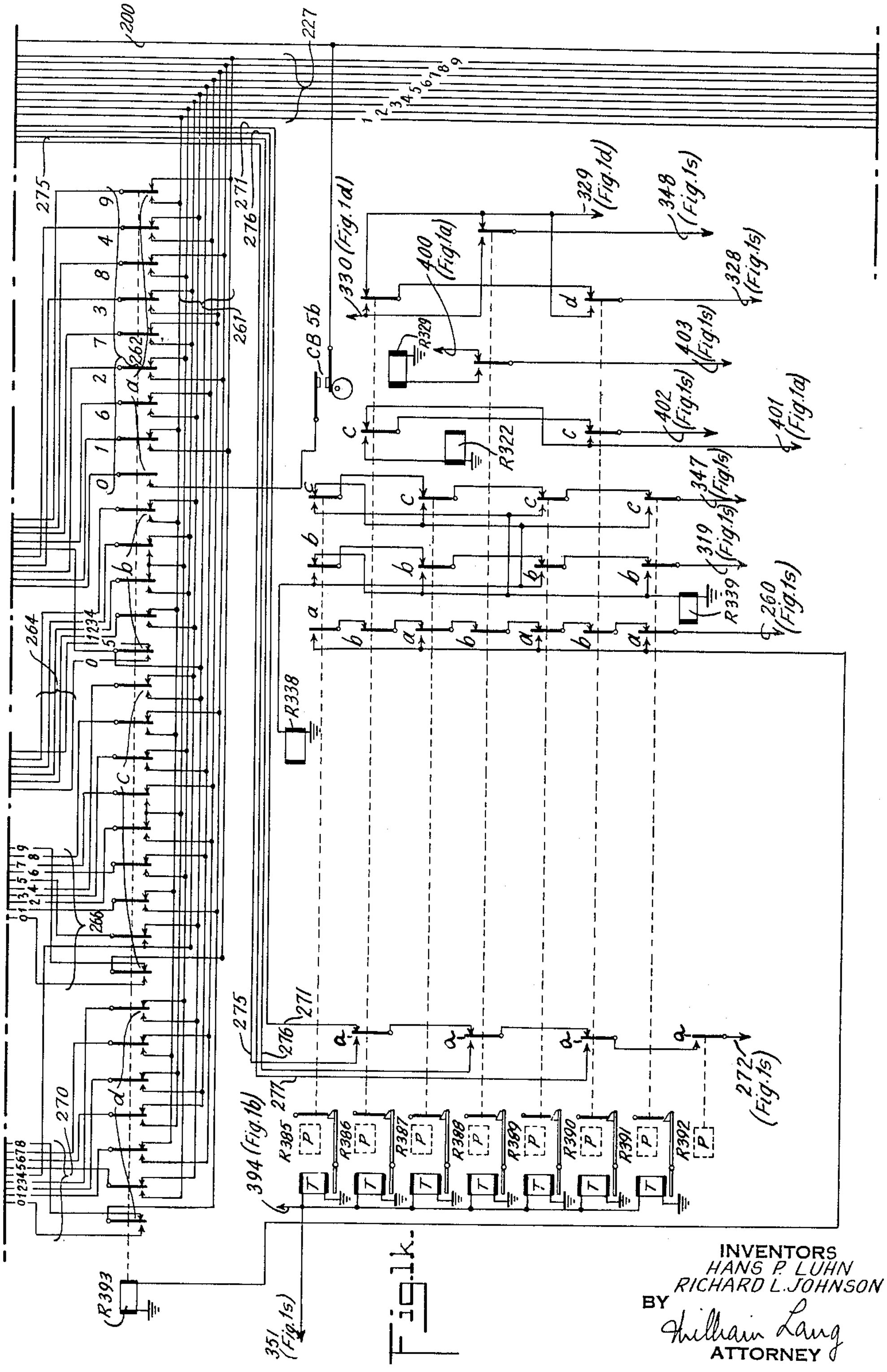
Figure 1M:
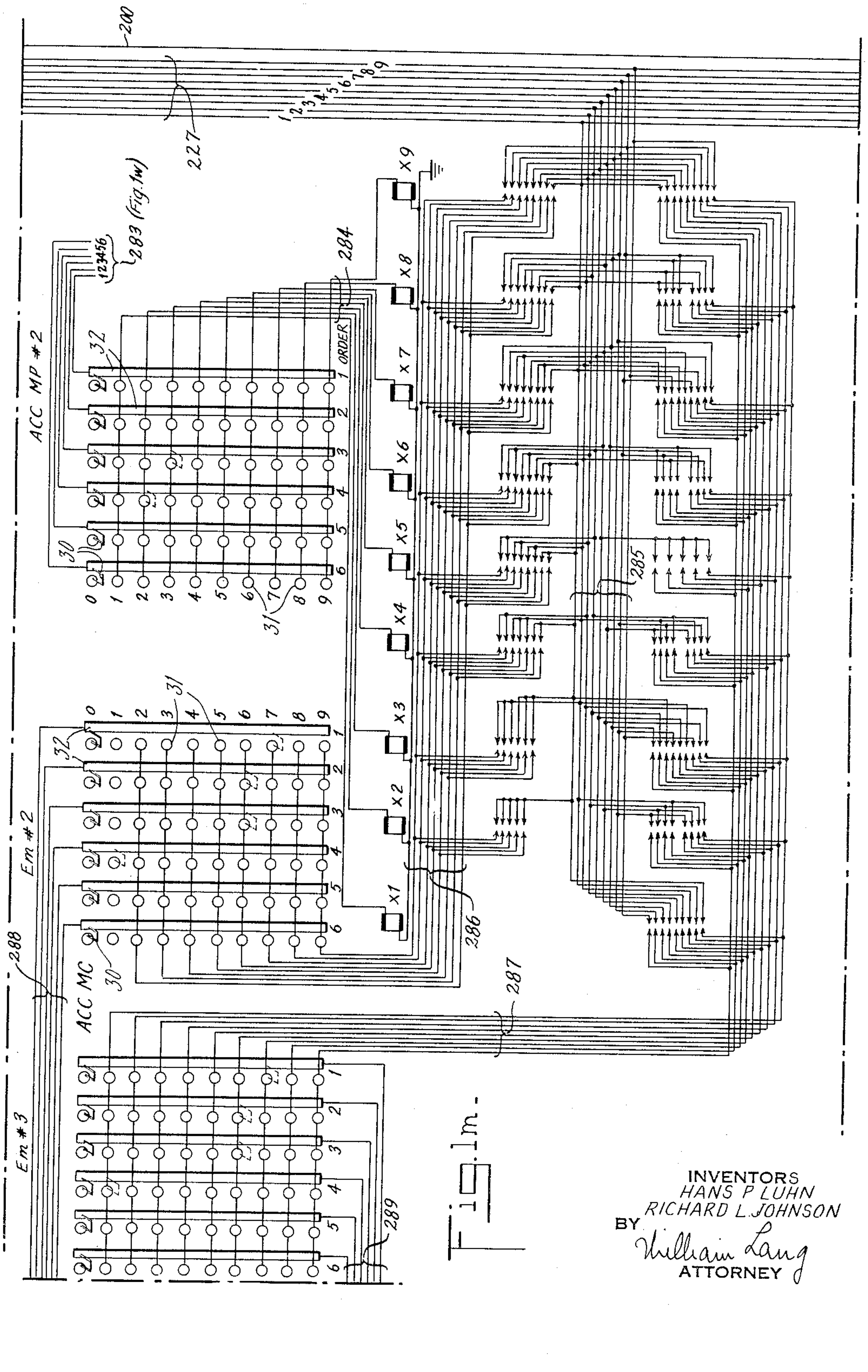
Figure 1N:
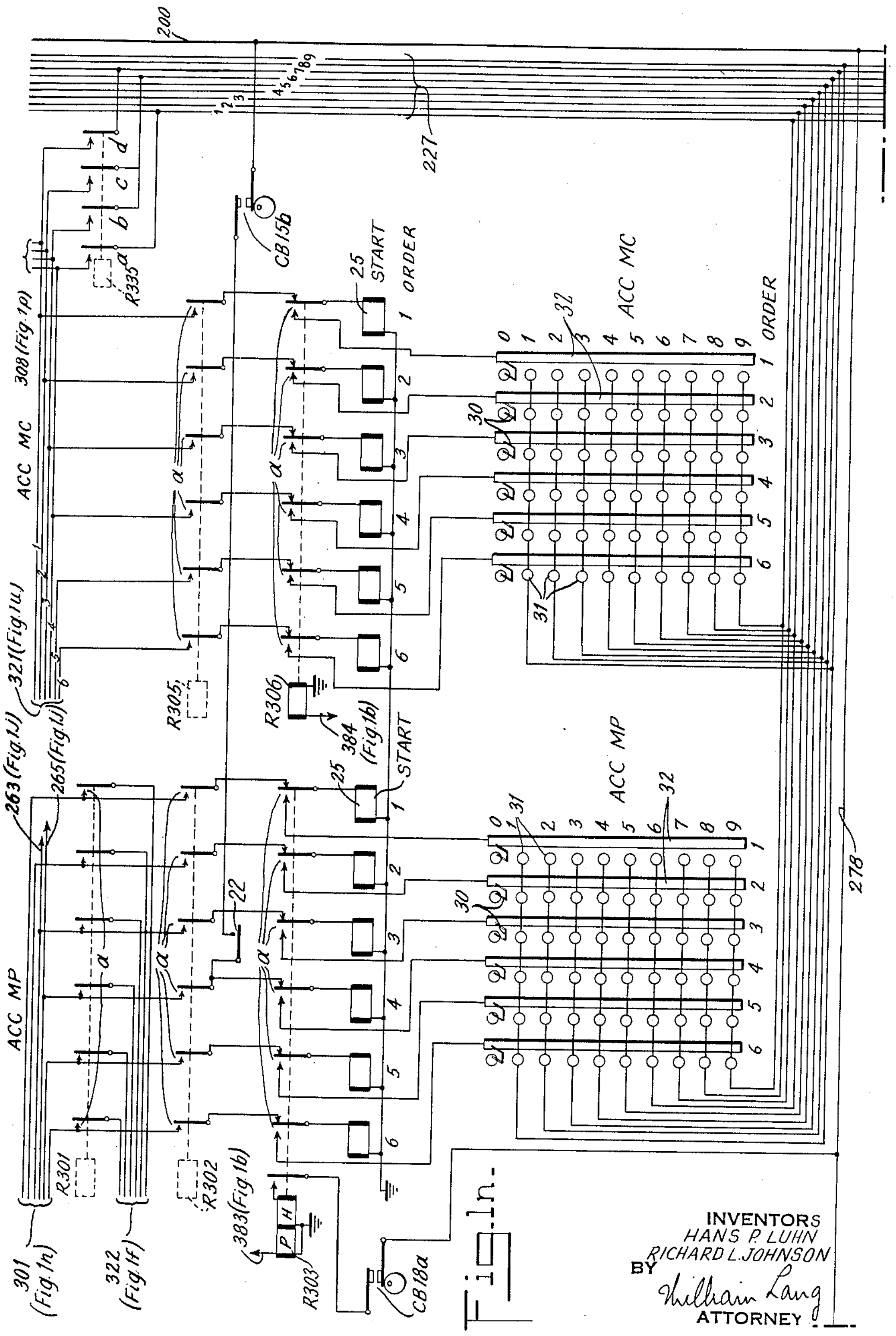
Figure 1B:
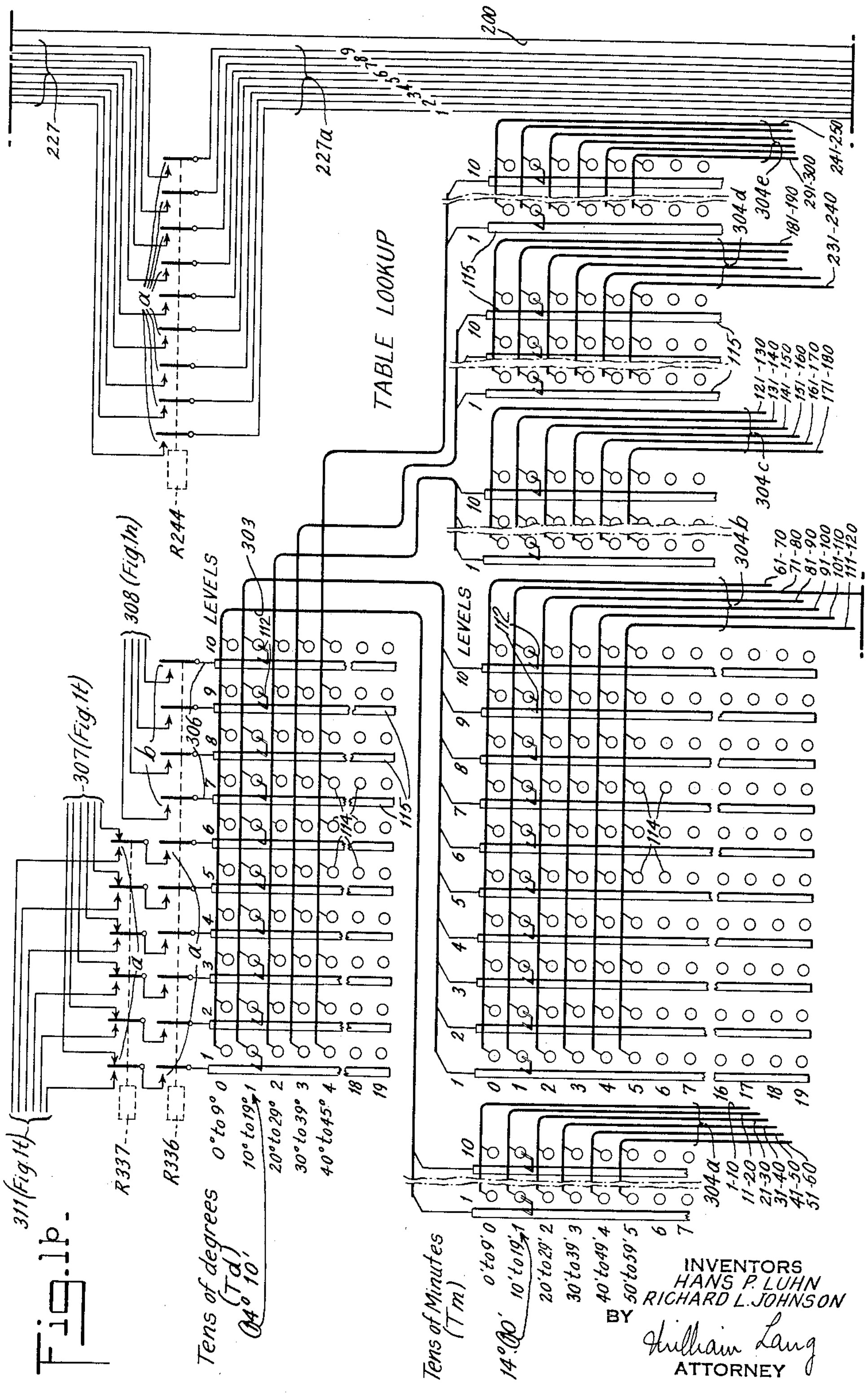
Figure 1R:
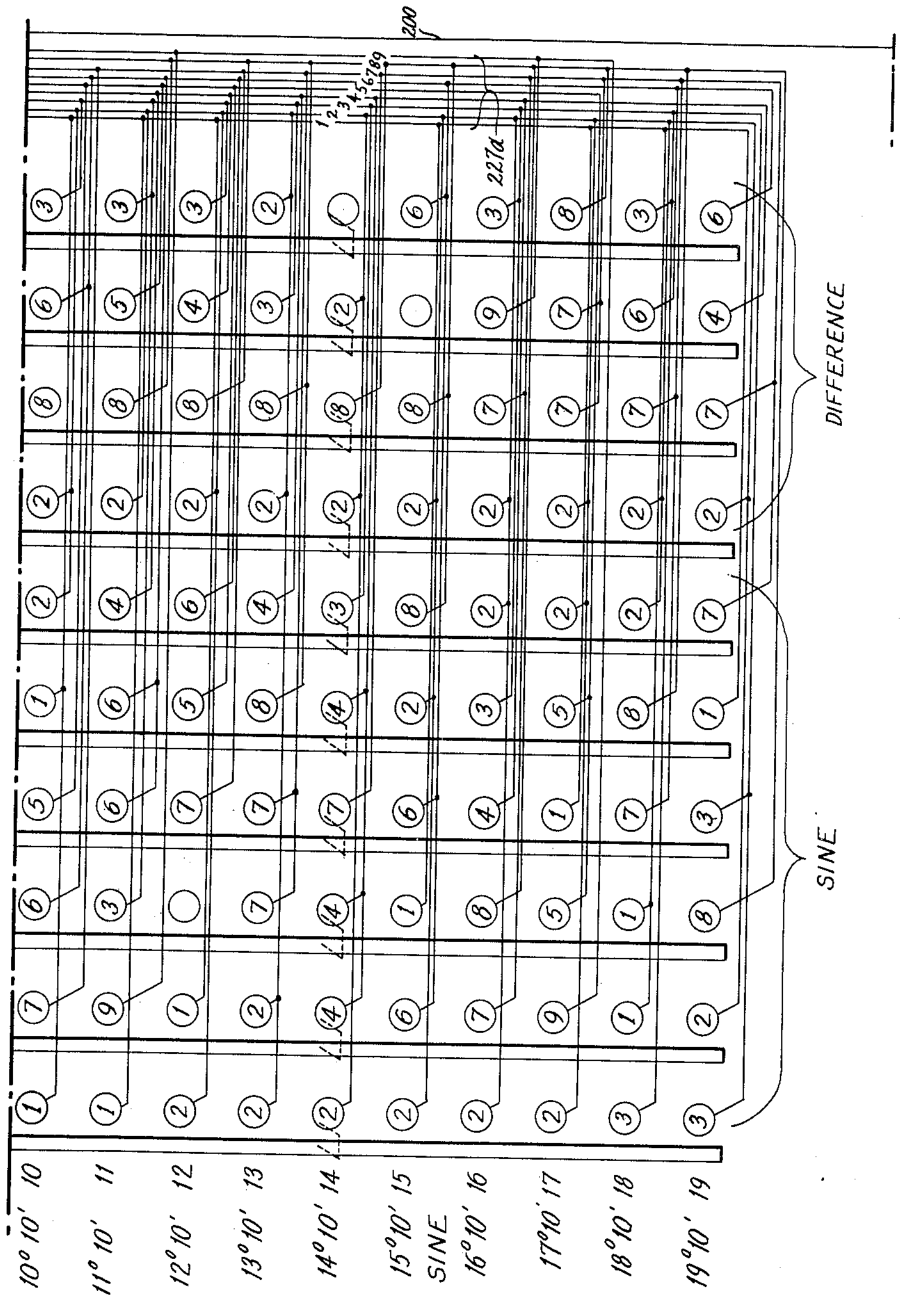
Figure 1S:
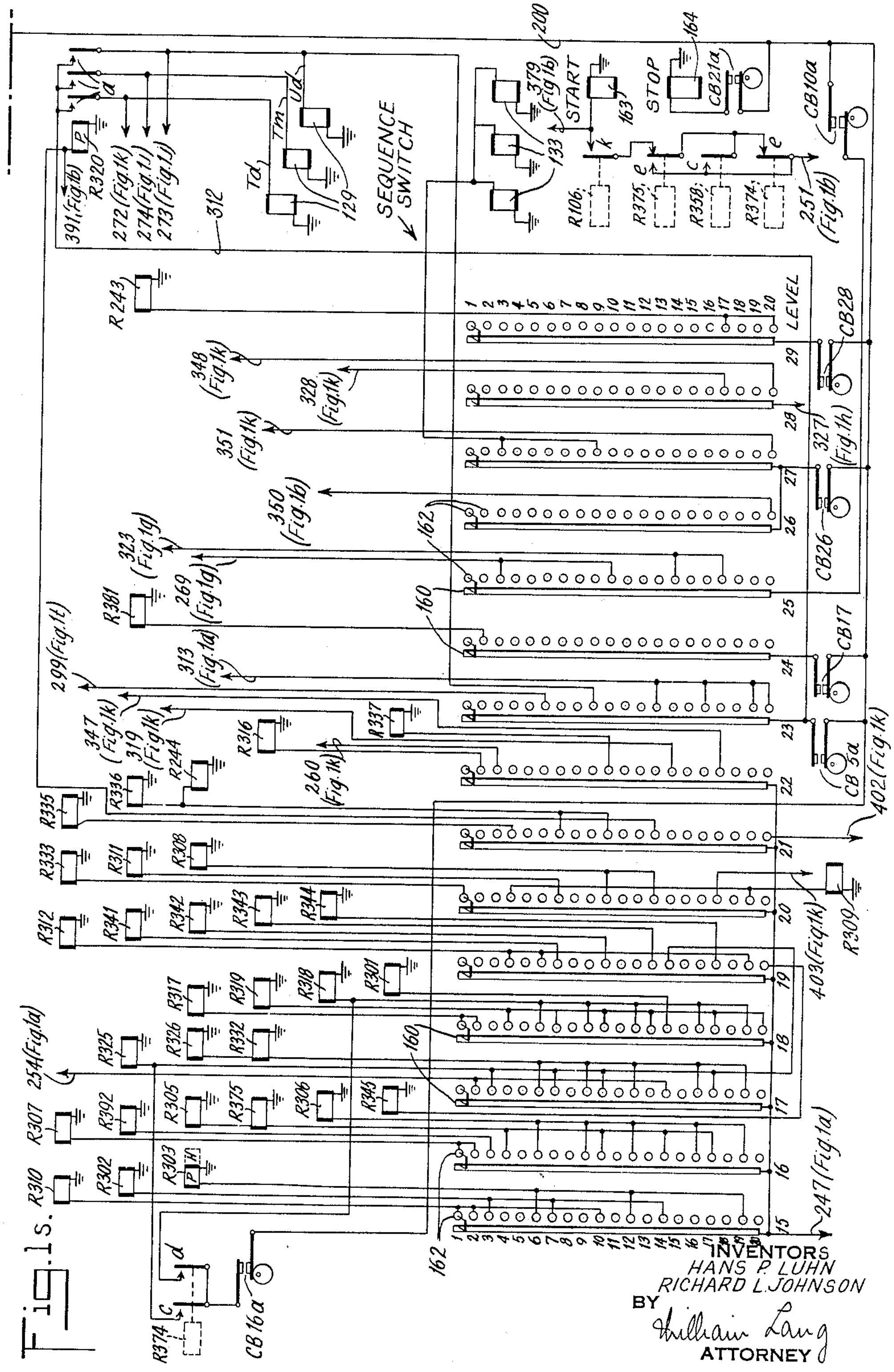

A sequence switch is provided which is of the same construction as the table lookup switches and this is diagrammatically represented in Fig. 1*s* by a plurality of common conductors 160, wipers 161, individual segments 162, start magnet 163, and stop magnet 164. The several levels are identified and also the twenty successive positions.

*CB contacts*

The main constantly running drive shaft 10 carries a number of circuit breaker operating cams which control contacts generally prefixed with the letter C and whose number and timing with respect to a cycle of operation is represented in the timing diagram (Fig. 14).

Additional cam controlled contacts designated by the prefix CB are represented in Fig. 13 and their controlling cams are mounted on a shaft 137 (Fig. 16*a*) which is driven from shaft 10 through a common form of one revolution clutch comprising a driving element 138 secured to shaft 10 and a dog 139 pivoted to gear 140 loose on shaft 10 but meshing with gear 141 on shaft 137. Upon energization of magnet CB, its armature 142 will rock clutch lever 143 to engage the clutch for driving shaft 137 and operation of the CB contacts. As indicated in Fig. 13, the contacts have a Home position corresponding to the cycle point position 15, that is, when magnet CB is energized the contacts operate in unison with the contacts of Fig. 14 starting at position 15, through a cycle and stop again at 15 if magnet CB is given only a momentary impulse.

*Circuit diagram*

In the circuit diagram (Figs. 1*a* to 1*w*), the several cam controlled contacts are prefixed C and CB with their timing as given in Figs. 14 and 13, respectively. Relays are designated with the prefix R and in the apparatus two types are employed. One is a multiple coil or winding type in which a plurality of windings are made on a common core with generally one winding serving as a pickup winding and the other as a holding winding. In the diagram the letters P and H applied to the windings designate the respective functions.

Other relays are of the so-called latching type provided with a pickup coil designated P and a tripping coil designated T (see Fig. 1*a*). The contacts operated by the relays are generally shown adjacent to the windings but in some instances to effect simplification of the circuit connections contacts are shown at points remote from the coil, but in such cases the controlling coil is indicated by dotted outline alongside the contacts.

*Problem*

The apparatus of the invention is utilized to calculate and type the entries on the Grid Traverse Sheet 150 of Fig. 20 from data supplied by observations and measurements resulting from a survey as diagrammatically illustrated in Fig. 19. In this figure, 3A represents a starting station chosen so that the areas surveyed will lie to the right of ordinate Y and above ordinate X. From here to station 3B, the distance 642.53 is measured as well as the angle 75°41′37″. From station 3B to station 3C the distance 732.63 is measured as well as the angle 163°40′00″. Similar measurements are taken for stations 3D, 3E and back to 3A, it being noted that all angles are measured from the vertical ordinates passing through the stations.

With these measurements before him, the operator inserts sheet 150 in the typewriter and in normal manner types the data on the heading and spaces to the line headed station 3A, where such designation is typed and also the arbitrary ordinates 1000.00 in the Northings and Eastings columns. Next, after line spacing 3A—3B is typed followed by operation of the keys of the auxiliary keyboard which results in entry of the angle into the apparatus and typing thereof. This is followed by operation of the keys of the auxiliary keyboard which results in entry of the angle into the apparatus and typing thereof. This is followed by similar entry of the distance.

At this point the automatic calculating mechanism takes over to fine the sine of the complement of angle 75°41′37″ multiplying it by the distance and type the result 15877 in the Latitude column with a plus sign. Thereafter, the cosine is found and multiplying by the distance and the result +62260 typed. These values are then added to the initial Northing and Easting values and the sums automatically typed to give the location of stacker 3B with respect to the X, Y ordinates.

Automatic carriage return and line spacing now brings the carriage into position to receive the next typed entry 3B—3C after which the next angle and distances are entered. This time the triangle shaded to the left of line 3B—3C (Fig. 19) is solved to obtain a negative value 70307 and a positive value 20600 which are algebraically added to the last two columns and the carriage again returned.

On selecting the sine and cosine values the table lookup device is set up to six place accuracy, so that the results obtained are accurate within such range and accounts for the last Northing entry being 99999 instead of 100000.

In the following, the detailed steps of operation involved in carrying out the perforation of sheet 150 of Fig. 20 will be explained in connection with the circuit diagram of Figs. 1*a*, etc. and the sequence diagram of Figs. 2*a*, etc., which latter sets forth the various relays energized and their period of operation. As a further guide Figs. 23*a* to 23*d* are provided to illustrate the entries in certain of the accumulators at successive steps in the operation and serve to explain the mathematical procedure involved.

As a preliminary, the typewriter motor (not shown) is placed in operation and the sheet 150 is inserted around the platen 64 (Fig. 5) after which the operator will type the identifying data as shown at the top of the sheet (Fig. 20) and will then space down to the line on which the starting or initial coordinate Y and X values are to be typed. On this line, the identification 3A is first typed and the carriage is then advanced either manually or through the usual tab key to position the first column of the field headed "Y" in printing position (i. e., three spaces to the left of the 1). This field has seven positions plus two decimal positions, and the manner in which the entry therein is effected is as follows.

*Entry circuits for initial Y value*

With the carriage in position as stated, the 0 key 80 on the auxiliary keyboard (Figs. 5 and 11) is operated to close the key lever contacts 96 which will complete a circuit from plus side of line 200 (Fig. 1*c*), through the key lever contacts 96, *a* contacts of relay R142, P winding of relay R136 to ground. This relay closes its *a* contacts to provide a holding circuit traceable from ground, through the holding winding H of relay R136, its *a* contacts, wire 201 (Fig. 1*b*), normally closed escapement contacts 69 to line 200. The holding circuit for relay R136 (Fig. 1*c*) branches from its H holding winding to the P winding of relay R142 and ground, which relay will in turn shift its *a* contacts to thereby prevent a repeat energization of relay R136. The *a* contacts of R142 will now provide a holding circuit for relay R142 through the key lever contacts 96, so that this relay remains energized until these contacts are opened by release of the key 80.

A further circuit is traceable through the *b* contacts of relay R136 traceable from line 200, through the key lever contacts 96, *b* contacts of R136 (closed) and the In stepping magnet to ground. This stepping magnet controls the switch shown in Fig. 12 which is provided with twenty successive contacting positions.

At the beginning of operations, the related contact wiper 108 normally sets at the 1 position and in the circuit diagram this switch is represented diagrammatically in Fig. 1*f* as a straight line arrangement. The switch is provided with a plurality of sections termed "levels" herein for identification, with a wiper provided for each level and arranged to travel as a unitary structure. It will be noted in Fig. 12 that the stepping switch is of the type wherein energization of the magnet simply retracts the stepping pawl 105, so that advance of the wiper occurs upon deenergization of the magnet. Incidentally, the magnet is provided with two contacts designated *a* and *b* which open and close respectively when the magnet is energized.

With the *b* contacts of relay R142 and the *b* contacts of the stepping magnet In both closed, a circuit is traceable from line 200, wire 202 (Fig. 1*c*), through these two *b* contacts in series, wire 199 (Fig. 1*f*) to the common conductor 110 of the In stepping magnet at level 5, wiper 108, segment 109 in the 1 position, wire 203 (Fig. 1*e*), thence in series through the *a* contacts of each of a set of storage relays (which are generally designated R201 and separately identified as 1, 2, 4 and 7) related to the highest entering order designated Order 9. From these contacts the circuit continues through the 0 wire of a group designated 204 (Fig. 1*d*) to the *b* contacts of relay R250, Space key solenoid 53 and to ground. The operation of the Space Key solenoid will effect a character space operation of the typewriter during which the escapement contacts 69 (Fig. 1*b*) will open to deenergize relay R136 which in turn opens the circuit to the stepping magnet In and the wipers thereof will then advance to their 2 position.

The operator now repeats the depression of the 0 key two more times, for each of which the circuits just traced will be repeated to energize the Space solenoid and successively advance the carriage to present the column in which the figure 1 is to be typed so that, when this column is in printing position, the stepping switch In will have been advanced to place its wipers in their 4 position. Upon the second 0 key operation, wipers 108 (Fig. 1*f*) are at their 2 positions and the circuit extends through the 2 wire 203 to the storage relays of Order 8 (Fig. 1*e*) and through the *a* contacts of the 7, 4, 2 and 1 relays R201 in this order to the 0 wire 204 and thence to the space key solenoid 53 as before. Upon the third 0 key operation, a similar circuit extends to the 3 wire 203 and contacts in relay storage Order 7.

It may be pointed out that the circuits traced through relays R136, R142 and magnet In will be completed upon operation of any of the other digit keys inasmuch as all of them close the key lever contacts 96. For significant digit key operation, there will be a character space operation of the typewriter under control of the printing bars and an advance of the wipers of the In stepping switch to their next higher position. In the case of the significant digit keys, additional circuits are called into operation to effect entry of the value of the digit into the Storage Relays and also printing of the character.

For the particular example where the 1 key is operated, this key will close contacts K1 in Fig. 1*f* so that, when the *c* contacts of relay R136 close, a circuit is completed from line 200, through the *c* contacts of R136, through the contacts K1 of the 1 key 80, to the common conductor 110 at level 1 of the In stepping switch, whose wiper is now set in the 4 position. From here it extends through the 1 wire 205 (Fig. 1*e*) to the P winding of the 1 magnet R201 in order 6 of the storage device, and thence to ground. These magnets R201 are of the so-called latching type wherein, when the magnet is energized, its contacts will shift and become latched until the winding designated T is energized to unlatch the contacts.

Now when the *b* contacts of the magnet In close, a circuit extends from line 200 (Fig. 1*c*), wire 202, *b* contacts of R142, *b* contacts of In, wire 203 (Fig. 1*f*) as before to the common conductor in level 5 whose wiper is in the 4 position, 4 wire of the group 203 (Fig. 1*e*), *a* contacts of magnets R201 in order 6, in the 7, 4 and 2 positions in series, the *a* contacts of the 1 magnet R201 (shifted), the 1 wire 204 (Fig. 1*d*), through a pair of *a* contacts of a relay designated R249 to the 1 Key Solenoid and ground. The operation of this solenoid will effect printing of the character 1 and will also bring about the incidental character space operation during which the escapement contacts 69 will open momentarily to break the circuits as previously explained.

In this instance the circuit to the relay R201 is completed to shift the related contacts before the circuit is completed to the wire 203, and thus the circuit through such wire is directed to the wire 204 corresponding to the key operated. In the previous case where the 0 key 80 was operated, since such key has no related contacts, no R201 relay is energized and the circuit from wire 203 goes through the unshifted contacts of the 7, 4, 2 and 1 relays R201 to the 0 wire 204.

The operator now actuates the 0 key 80 five times in succession and it will be noted in Fig. 20 that the 0's are now printed. This is brought about under control of the prior significant digit printing, in that provision is made for normally suppressing the printing of 0's and rendering the suppression ineffective following the operation of a significant digit solenoid. In Fig. 6 the solenoids 53 associated with the significant digits 1 to 9 have their plungers extending down to operate the bail 54 through which a pair of contacts 55 is closed whenever one of these solenoids receives current. Accordingly, when the character 1 is printed as explained, these contacts called zero suppression Key Bail contacts 55 will be closed to complete a circuit from line 200 (Fig. 1*d*), contacts 55, and winding P of relay R250 to ground. This relay will close its *a* contacts to provide a holding circuit from ground, through holding winding H of the relay, its *a* contacts, wire 207 (Fig. 1*c*), *a* contacts of relay R134, *b* contacts of R132, *b* contacts of R141 to line 200. Relay R250 (Fig. 1*d*) shifts its *b* contacts so that the circuit previously traced therethrough will now extend to the 0 solenoid 53 instead of the Space solenoid and as a result the 0 will be printed, whereas heretofore a spacing operation was effected without printing.

After the last 0 in the Y field of the sheet 150 is printed, the carriage escapes to the first recording position in the X field. At this point the wipers of the In relay are in their 10 position in which it will be noted from Fig. 1*f* that for levels 1 to 5 no connections are provided so that any further key operations will have no effect through these levels.

Briefly recapitulating, the first key operation closes contacts 96 to energize relay R136 and, if this is a significant digit key, the value thereof is entered in the 1, 2, 4, 7 combination code into the highest ordered set of storage relays. This occurs immediately upon closure of the *c* contacts of R136 (Fig. 1*f*). Very shortly thereafter, when R142 has been energized and its contacts shifted, the readout circuit is completed through the contacts of the set storage relays in the highest order to energize the type bar solenoid 53 corresponding to the entered digit. This brings about the escapement of the type printer carriage and release of R136 and In, with R142 being held until the key is released to open key lever contacts 96. Where the first key is the 0 key, the circuits through the contacts of storage relays R201 is directed to the space solenoid. Thus, there is provided a sequence of operations wherein a digital value is entered in a storage relay order, and such order in turn controls the typewriter to print the entered digit, if significant, or to cause a space operation of 0. By observing the type characters as they appear, the operator is assured that the storage relays contain the desired entries. With the carriage in its present position, a pair of tab contacts are closed. These are identified in Fig. 1*a* as TAB 1.

*Transfer of Y from storage relays to accumulator Y*

The Y ordinate entry will now be transferred from the storage relays to accumulating mechanism, and this is brought about as follows.

*Circuit for start relay R129.*—The operator now depresses the motor bar to close contacts 208 and 209 in Fig. 1*a*, whereupon a circuit will be completed from line 200, through contacts C4*a*, motor bar contacts 208, contacts TAB1, wire 210, *d* contacts of R103, wire 211 (Figs. 1*b* and 1*c*), contact segment 109 in position 10 of the In stepping switch, level 7, at which the wiper 108 is now set, the common conductor 110 thereof, wire 212 (Figs. 1*b* and 1*c*), *a* contacts of R109, wire 213, *g* contacts of relay R105 (shifted), wire 214 (Fig. 1*b*), *m* contacts of R120, wire 215, *a* contacts of R100, to winding P of Start relay R120 and to ground. (To facilitate the explanation, it is assumed that relay R105 has been energized without tracing the pickup circuits at this time. Briefly, this relay is energized near the end of a prior operation and its contacts latched in their shifted position.)

It will be observed that this circuit to relay R129 cannot be completed until the carriage is in position to close contacts TAB1 and also until the In stepping switch has been advanced to its 10 position and thus serves as a check that the operator has typed the correct number of positions in the Y field of the sheet. Start relay R129 closes its *a* contacts to provide a holding circuit traceable from ground, hold winding H of the relay, *c* contacts of relay R100, *a* contacts of R129, contacts CB28*a* to line 200.

*Circuit for TAB solenoid 53.*—A further circuit extends from line 200, contacts CB28*a*, *b* contacts of relay R129, and TAB solenoid 53 to ground. This solenoid operates the tabular key of the typewriter in the usual manner to advance the carriage to the next typing position which, for the present problem, is the position in the X field of the sheet 150 providing for an entry of a seven-place figure followed by two decimal positions.

*Circuit for relay R106.*—A further circuit is traceable from contacts C4*a* (Fig. 1*a*), motor bar contacts 208, contacts TAB1, wire 210, *e* contacts of R103, pickup winding P of relay R106 to ground. This relay is of the latching type and will accordingly have its shifted contacts latched.

*Circuit for keylock solenoid.*—Following the energization of relay R129, when contacts CB close, a circuit is traceable from line 200 (Fig. 1*a*), through contacts C3, wire 216 (Fig. 1*b*), *c* contacts of R129, wire 217 (Fig. 1*a*), *b* contacts of relay R110, *b* contacts of R109, wire 218 (Fig. 1*b*), winding P of relay R137 to ground. This relay closes its *a* contacts to provide a holding circuit traceable from ground through the hold winding H of the relay, its *a* contacts, wire 219 (Fig. 1*c*), *a* contacts of relay R138, wire 220 (Fig. 1*b*), *a* contacts of R140, and wire 202 (Fig. 1*c*) to line 200. Relay R137 (Fig. 1*b*) closes its *c* contacts to complete a circuit from line 200, wire 202 (Figs. 1*c* and 1*b*), *c* contacts of R137 and Keylock solenoid 100 to ground. This solenoid is shown in Fig. 10 where it acts upon the interposer 102 to lock the keys of the auxiliary keyboard against further operation.

*Circuit for relay R102.*—A further circuit is completed when contacts C3 close which is traceable from line 200, to contacts C3 (Fig. 1*a*), wire 216 (Fig. 1*b*), *c* contacts of R129, pickup winding P of relay R102 to ground. As a result, this relay shifts its *a* contacts into latched position.

*Trip circuit for relay R102.*—At this time a circuit is also completed to energize the trip magnet T of relay R105 traceable from line 200, contacts C3 (Fig. 1*a*), wire 216 (Fig. 1*c*), *c* contacts of R129 (shifted), wire 217 (Fig. 1*a*), branching through wire 241 to the trip magnet of R105 and ground.

*Circuit for magnet CB.*—Later in the cycle, contacts C2 (Fig. 1*a*) close to complete a circuit from line 200, through the contacts C2, wire 221 (Fig. 1*b*), *a* contacts of R102 (shifted), the clutch magnet CB to ground. Clutch magnet CB couples the shaft 137 (Fig. 16*a*) containing the operating cams for the CB contacts to the constantly running shaft 10, so that these contacts now make one revolution in synchronism with the constantly running cam contacts.

Figure 2A:
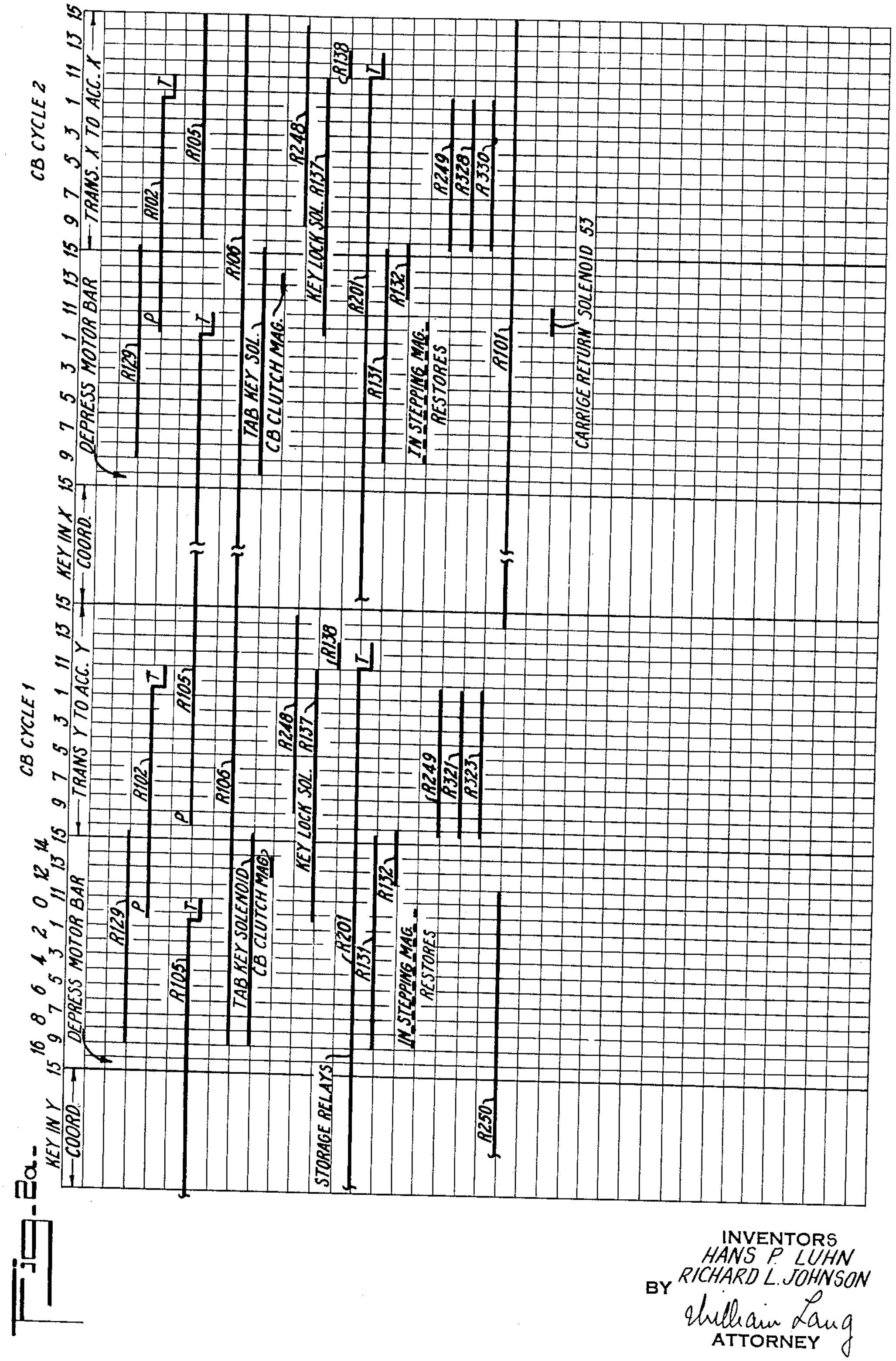

In Fig. 2*a* the relative timing and sequence of the several magnets whose circuits have just been traced is shown.

*Restoring the In stepping switch.*—This switch is restored by advancing it until its wipers 108 are again in the 1 position, and this is brought about as follows. A circuit is first completed from line 200 (Fig. 1*b*), contacts CB28*a*, *a* contacts of R129, *i* contacts of relay R120, wire 222 (Fig. 1*a*), *f* contacts of R103, wire 223 (Figs. 1*b* and 1*c*), winding of relay R131 to ground. Relay R131 will hold through its *a* contacts in series with *a* contacts of R132, through wire 202 to line 200. A circuit is now traceable from line 220 (Fig. 1*c*) to the common conductor 110 at level 8 of the In stepping switch, thence through the wiper 108 now set in the 10 position to the segments 109 connected in series, and to the *b* contacts of R131 (now closed), *a* contacts of In stepping magnet, and then through the magnet to ground.

As a result, the In stepping switch will advance one step during which the *a* contacts of the stepping magnet will open momentarily and, with the wiper now in the 11 position, the circuit will be repeated. It is apparent that a succession of such operations will thereafter take place to advance the wipers 108 to the 1 position through which there is no circuit to the In stepping magnet, so that the wiper comes to rest in this position.

With the wiper of level 8 in the 1 position, a circuit will be completed from the positive side of line to the common conductor and wiper to the 1 segment, and thence through *c* contacts of R131 and P winding of R132 to ground. Opening of the *b* contacts of R132 will break the holding circuit previously traced for relay R250. The opening of the *a* contacts of R132 will break the holding circuit of R131.

*CB Cycle 1*

*Transfer circuits.*—The entry made in the storage relays will now be transferred to accumulator Y, and this will occur during the first cycle of the CB contacts which will be termed CB cycle 1 and is so designated in Fig. 2*a*.

As previously pointed out, the accumulators are of the type which reset to 9's in all positions. The entry of a true value will accordingly be in the form of a 9's complement and a negative value will be entered directly. In the present case, the true amount 1000.00 is to be entered. As a preliminary, the start magnets in all positions of the accumulator are energized at the 9 time in the entering cycle to initiate the rotation of all the adding wheels. In the fifth highest order, wherein the 1 is to be entered, the stop magnet will be energized after one step of rotation while in all remaining orders the wheels will advance through nine steps and then mechanically disengage at that time. Since all ten orders of the Y accumulator are alike, only four are illustrated to avoid excessive duplication.

The energizing circuit for relay R323 which prepares accumulator Y to receive the initial start impulse is traceable as follows: from line 200 (Fig. 1*b*), through contacts CB16, through *e* contacts of R119, wire 224 (Fig. 1*a*), *b* contacts of R106 (now closed), wire 225 (Fig. 1*b*), *a* contacts of R101, wire 226 (Fig. 1*a*), *g* contacts of R106 (shifted), winding of relay R323 to ground. Relay R323 (Fig. 1*g*) shifts its *a* contacts, and these will remain in shifted position for the period of closure of contacts CB16 (see Fig. 13). Relay R321 is energized concurrently with R323 through a circuit extending from the *a* contacts of R101 (Fig. 1*b*) to relay R321 and ground, so that this relay will also shift its *a* contacts (Fig. 1*g*).

At the 9 entry time in the cycle, the contacts CB6 close to transfer an impulse through the 9 wire 227 (Figs. 1*d* to 1*g*), and thence through wire 226 to the *a* contacts of relay R323 in each order of accumulator Y, thence through the *a* contacts of relay R324, and start magnets 25 to ground. In Fig. 1*a* relay R249 is energized through a circuit traceable from ground to relay R249, *c* contacts of relay R106 now closed, wire 224 (Fig. 1*b*), *e* contacts of R119, contacts CB16 to line 200.

Relay R249 shifts its *a* contacts in Fig. 1*d* and at the 1 time in the cycle a circuit is completed from contacts CB14 to the 1 wire of the group of impulse wires generally designated 227 to the 1 wire of the group generally designated 228, thence through the shifted *a* contacts of R249 designated the 1 wire of the group of wires designated 204 extending to Order 6 of the storage device (Fig. 1*e*). The circuit continues from the 1 wire 204 to the *a* contacts of the 1 relay R201 (shifted), *a* contacts of the 2, 4 and 7 relays in series to the related 4 wire of the group designated 203 (Fig. 1*f*), branching through the 6 wire of a group 229 (Fig. 1*g*), thence through the *a* contacts of R321 (shifted) to the *b* contacts of R323 (shifted) and Stop magnet 25 to ground. As a result, the adding wheel in order 6 will be interrupted after an advance of eight steps. As explained, the wheels in all other orders will advance nine steps. Since the accumulator initially starts at 9 in all orders, the entries will cause closure and latching of the tens carry contacts 22 in all orders, so that at the carry time when contacts CB15 close a circuit is completed in each order higher than the lowest, which is traceable from line 200 (Fig. 1*g*), contacts CB15 to wire 230, tens contacts 22 of the lowest order of accumulator Y, *a* contacts of R322 in the next higher order, *a* contacts of R323 (now deenergized), *a* contacts of R324, and Start magnet 25. In the units order, the tens carry circuit extends through the tens carry contacts in the highest order and through wire 231 to the Start magnet 25 in the lowest order. One step later, the mechanical knockout is effected to interrupt the advance of the wheels so that for the problem under consideration accumulator Y will stand at 9999899999.

It will be noted that in the foregoing operation the keys will enter the value in the storage relays and that the control of the type bars is from the storage relays and therefore represents the setting of the relays to serve as a check that they are set up in accordance with the printed data.

It may also be noted at this point that the storage relay contacts of Figs. 1*d* and 1*e* are controlled to be read out in two different manners. In one manner the entry of an amount is read out digit by digit from Orders 9, 8, 7, 6, etc. in succession through circuits entering from the In stepping switch level 5 (Fig. 1*f*), through wire 203, through the relay contacts and then through wires 204 and contacts of R249 to the key solenoids 53. Through the stepping of wiper 108 in level 5 the orders are read out one after the other. In the second manner, relay R249 disconnects wires 204 from the key solenoids and connects them directly to impulse emitting wires 227 (Fig. 1*d*), so that current flows concurrently to all relay contact orders and upwardly through the same sets of contacts and wires 203 to wires 229 which extend to the accumulator entry magnets 25.

*Resetting of storage relays.*—When contacts C4*b* (Fig. 1*d*) close, a circuit is completed from line 200, through these contacts, *b* contacts of relay R249 and winding P of relay R248 to ground. This relay closes its *a* contacts to provide a holding circuit through contacts C7 and prepares the energizing circuit for the trip magnets T of the storage relays which, later in the cycle, are energized through a circuit traceable from line 200, contacts C8, *b* contacts of R248, wire 232 (Fig. 1*e*) and thence to all the trip magnets T of all the relays R201.

A further circuit is completed through contacts C8 (Fig. 1*d*), *c* contacts of R248, wire 233 (Fig. 1*a*), *g* contacts of R103, wire 234 (Figs. 1*b* and 1*c*) and winding of relay R138 to ground. This relay opens its *a* contacts which are in the holding circuit of R137, so that the latter becomes deenergized and in turn opens its *b* contacts in the holding circuit of the Keylock solenoid, so that the keys in the auxiliary keyboard are now released for further operation (Fig. 2*a*).

During the transfer cycle, when contacts CB5 close, a circuit is completed from line 200, contacts CB5 (Fig. 1*a*), wire 235, *a* contacts of R106 (closed), pickup winding of R105 to ground. When contacts C3 close, a circuit is traced from line 200, through the contacts C3 (Fig. 1*a*), wire 236, *a* contacts of R105 (shifted), wire 237 (Fig. 1*b*) to the trip magnet T of relay R102, releasing its *a* contacts so they may open and break the circuit to the CB clutch magnet.

*Circuit for relay R101.*—Near the end of the cycle, relay R101 (Fig. 1*b*) is energized through a circuit traceable from line 200 (Fig. 1*b*), contacts CB21, wire 238, *e* contacts of R120, wire 239 (Fig. 1*a*), *d* contacts of R106 (shifted), wire 240 (Fig. 1*b*), pickup winding of R101 to ground.

Cyclic operation of the CB contacts now suspends with relays R105, R106, R101 energized as indicated at the end of CB cycle 1 in Fig. 2*a*.

*Entry circuits for initial X value*

The operator now actuates the keys of the auxiliary keyboard in accordance with the X ordinate which, for the example chosen, has the same value as the Y ordinate, so that the key operation will be exactly the same as already explained, that is, the 0 key is repeatedly operated three times, then the 1 key and then the 0 key five more times. As before, the operation of the 0 key the first three times will result in spacing operations of the typewriter carriage without printing, while the later 0 key operations will result in printing of the 0's as well as spacing. Printing of the last 0 is accompanied by the usual spacing operation, and at such time the motor bar is again operated to initiate transfer of the amount now standing in the storage relays to accumulator X.

*Transfer of X from storage relays to accumulator X*

When the motor bar operated a second time, a circuit is completed in the same manner as previously traced through the *g* contacts of R105 to energize R129. Circuits are also completed in the same manner as before to energize relays R102, R137, R131, R132 and the Keylock solenoid. The In stepping switch is also advanced or restored to its 1 position. These operations are represented in Fig. 2*a* from which it is seen that they correspond to like operations following entry of the Y coordinate value into the storage relays. The trip magnet for R105 is also energized as before.

A circuit is also completed to energize the TAB solenoid which will advance the carriage to its extreme position where one of the tabs CS4 on bar 74 (Fig. 7) will shift the contacts designated TAB4. The energizing circuit for the tabulating solenoid is traceable from line 200 (Fig. 1*b*), contacts CB28*a*, *b* contacts of R129 (shifted) and TAB solenoid to ground. The energizing circuit for the carriage return solenoid 53 is traceable from line 200 (Fig. 1*a*), contacts C3, contacts TAB4, Carriage Return solenoid 53 to the ground. The energization of this solenoid in the well known manner will cause automatic return of the carriage to its other extreme position, where it will be held by the escapement mechanism. Relay R102 closes its *a* contacts to energize the CB clutch magnet through circuits already traced, so that the cams for controlling the CB contacts are now in motion for another cycle which is designated CB cycle 2 in Fig. 2*a*.

*CB cycle 2*

The operations during this cycle are the same as explained for CB cycle 1 (see Fig. 2*a*) with the exception that relays R328 and R330 are energized instead of R321 and R323, respectively. Relay R328 is energized through a circuit from line 200 (Fig. 1*b*), contacts CB16, *e* contacts of R119 (shifted), wire 224 (Fig. 1*a*), *b* contacts of R106 (closed), wire 225 (Fig. 1*b*), *a* contacts of R101 (shifted), and relay R328 to ground. R328 closes its *a* contacts (Fig. 1*g*) to connect the accumulator to the storage relays through wires 229. It is also necessary to energize R330 at this time to direct the initial starting impulse to the start magnets 25 of accumulator X. The energizing circuit, therefore, is traceable in the same manner as for relay R328 through the *a* contacts of R101 (Fig. 1*b*) from where it branches through wire 242 (Fig. 1*a*), *h* contacts of R106 (shifted) and relay R330 to ground.

Closure of contacts CB6 at the 9 time in the cycle will now direct an impulse to the 9 wire 227 (Fig. 1*g*) and to the *a* contacts of R330, to all the start magnets 25 of accumulator X, so that the wheels in all orders will commence to rotate and for the particular example chosen all the wheels will continue through nine steps until mechanically disengaged at the 0 time, with the exception of the wheel in the 6th order from the right, wherein a 1 is to be entered in the form of a 9's complement, that is, the wheel is to be advanced eight steps. Accordingly, and in the same manner as explained for the entry of the value in accumulator Y, an impulse is transmitted to the storage relays through the same circuits as previously traced, with the exception that it extends from wires 229, through the *a* contacts of R328 instead of R321 to energize the stop magnet 25 in the accumulator X at the 1 time, leaving the entry of this accumulator standing at 9999899999. At the carry time in the cycle, the usual 10's carries take place including the carry from highest to lowest order. Also, as before, R248 is energized under control of C4*b* and its contacts in turn complete the circuit through the trip magnets of all the storage relays, when contacts C8 close, thereby clearing them of entries.

The return of the carriage is accompanied by the usual line space operation and the operator now types the station designation 3A—3B and tabulates the carriage to the field headed Azimuth (Fig. 20) wherein the value of the first angle is now to be typed.

*Entry circuits for azimuth value*

The angle is entered on the auxiliary keyboard and for the example chosen the first key operated is the 0 key which, as explained, closes only the common bail contacts 96 which will result in no setting on the relay storage device, but will cause a carriage space operation and will also cause the In stepping magnet to advance its wipers 108 to their 2 position. The next key operated is for the digit 7 (Fig. 20) and, with the In stepping magnet in its 2 position, a circuit will be completed to enter the 7 in the order 8 of the relay storage in coded form.

As noted, the code adopted is the 1, 2, 4, 7 code so that for this particular digit the 7 relay R201 in order 8 will be energized. The incidental closure of the key lever contacts 96 will have energized R136 (Fig. 1*c*), so that a circuit extends from line 200 (Fig. 1*f*), c contacts of R136, contacts K7, common conductor 110 at level 4 of the In stepping switch, wiper 108 set in the 2 position, 7 wire of the group 243 (Fig. 1*e*) to the P winding of the 7 relay R201 in order 8 and ground. The stepping switch will then advance to its 3 position where the 5 key is depressed to again operate the contacts 96 picking up R136, so that the entering circuit now extends to the contacts of the 5 key designated K5. For this digit two circuits are completed to energize the 4 and 1 relays R201 in order 7. One of the circuits extends from contacts K5, common conductor 110 at level 1 of the In switch, wiper 108 set at step 3, 1 wire of the related group to the 1 relay R201 in order 7. The second circuit extends from the second pair of contacts K5, common conductor 110 at level 3 of the In switch, wiper 108 in position 3, 4 wire of the related group to the 4 relay R201 in order 7.

Inspection of the wiring arrangement to the keys shows that for the other digits the combinational selection of relays R201 will be as follows:

For the 9 key, relays 7 and 2 will be energized;
For the 8 key, relays 7 and 1 will be energized;
For the 6 key, relays 4 and 2 will be energized;
For the 4 key, relay 4 will be energized;
For the 3 key, relays 2 and 1 will be energized;
For the 2 key, relay 1 will be energized;
For the 1 key, relay 1 will be energized.

It will thus be seen that operation of the keys in accordance with the angle 75° 41′ 33″ will result in entry of this value into the storage relays. In the same manner as explained for the entry of the initial ordinate values, the relay storage network will control the typing of the entered values in succession through the circuits extending from the level 5 of the In stepping switch, so that as each succeeding digit is entered into the storage device the preceding one is typed out. The circuits involved are the same as already explained, so that they are not repeated in detail at this point. Inspection of the typed angle will indicate to the operator the correctness of the setting in the storage relays and provides for an opportunity of correction if the result is not correct.

*Error key circuit.*—If an error is found, the entries in the storage relays will be cleared and the typewriter carriage set back to its initial position. The manner of clearing is under control of the error key which will close its contacts (Fig. 1*d*) to complete a circuit from line 200, contacts C4*b*, error key contacts, pickup winding of relay R248 to ground. The relay will close its holding circuit as before, and through its *b* contacts will complete a circuit from line 200, through contacts C8, *b* contacts of R248, to all of the trip magnets of the storage relays R201 to reset the same.

As previously explained, the energization of R248 will pick up the relay R131 which in turn controls the homing or restoration of the In stepping switch which has already been explained in detail. As a result, the operator may make suitable erasure and proceed to reenter the value of the angle.

*Sine and cosine computation*

The motor bar is now again operated and a series of computations will be initiated thereby to calculate the sine and cosine of the entered angle. In the present carriage position, that is, with the first typing position of the Distance column of sheet 150 (Fig. 20) in typing alignment, contacts TAB3 are closed, so that closure of the motor bar contacts 208 (Fig. 1*a*) will complete a circuit as follows.

Figure 2B:
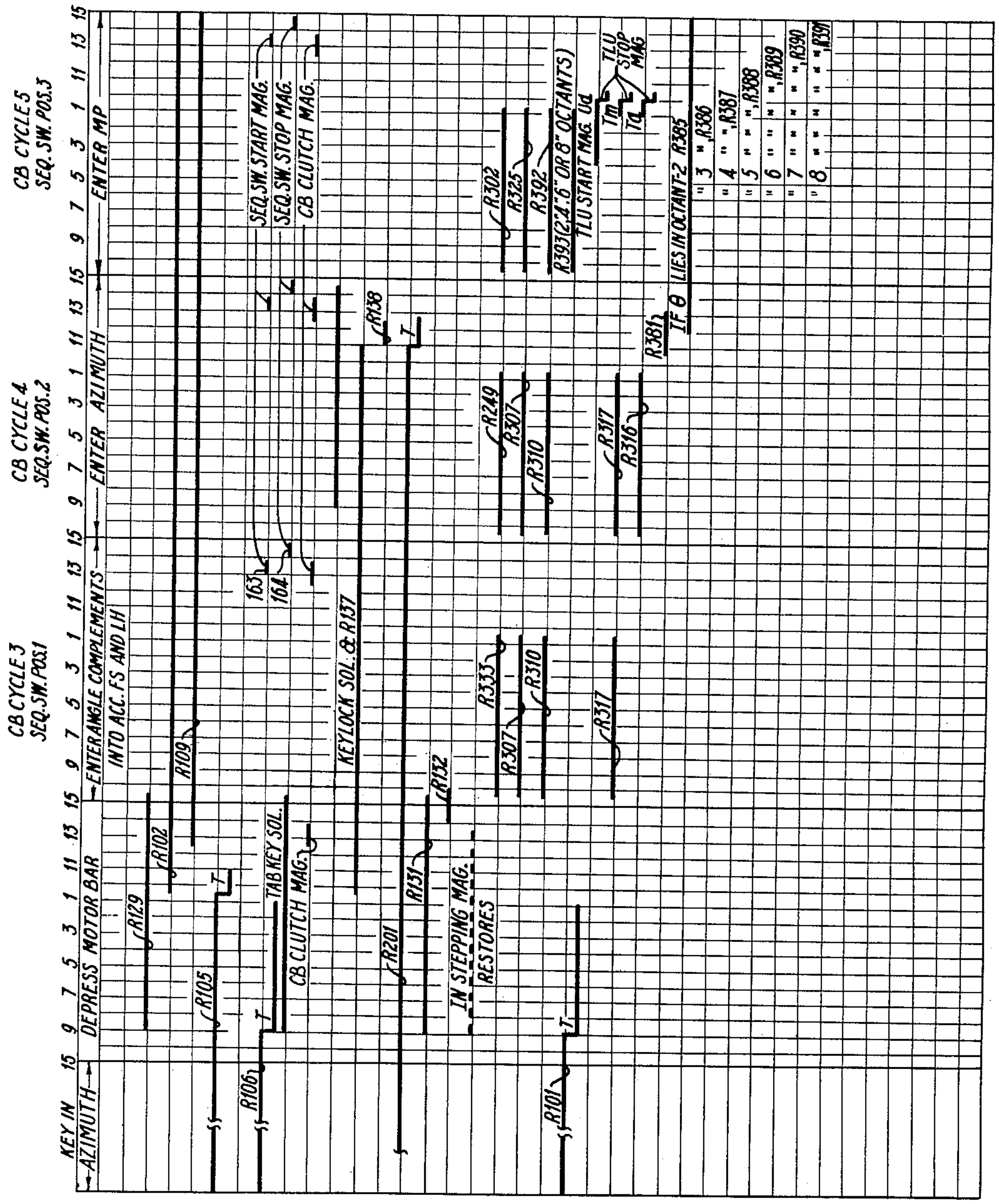

*Trip circuit for relays R106 and R101.*—From line 200 to contacts C4*a* (Fig. 1*a*), motor bar contacts 208, contacts TAB3, wire 244 to energize the trip magnet of R106, resetting the same (see also Fig. 2*b*). A further circuit extends from contacts TAB3 and wire 244 down to Fig. 1*b* to the trip magnet of R101.

*Pickup circuit for relay R129.*—A still further circuit extends from the contacts TAB3, wire 244 (Fig. 1*b*), wire 245 (Fig. 1*c*) to the 8 segment 109 of the In stepping switch, level 7, wiper 108, its common conductor 110, wire 212 (Figs. 1*b* and 1*a*), *a* contacts of R109, wire 213, *g* contacts of R105 (shifted), wire 214 (Fig. 1*b*), *m* contacts of R120, wire 215, *a* contacts of R100, pickup winding of R129 to ground.

As before, relay R102 is energized through the *c* contacts of R129 and concurrently therewith the trip magnet of R105 is energized as indicated on the sequence diagram. Through the *a* contacts of R102 the CB clutch magnet is again energized so that now the cams controlled through the coupling of the clutch will operate. Also as before, the TAB solenoid is energized through the circuit extending through the *b* contacts of R129, causing the carriage to tabulate to a position where the first digit of the Distance may be typed. As before also, the In stepping switch is restored to its 1 position through the *a* contacts of R129, which circuit has already been traced.

*CB cycle 3*

All entries made into the accumulators occur during cycles in which the CB contacts operate. Thus, for the first CB cycle the Y amount is entered into the similarly designated accumulator and the X amount is entered during the second CB cycle. In the third cycle, which is about to be described, entries are made into an accumulator designated FS. This accumulator has a left and right hand section each comprising six orders. Entries are also made into accumulator designated LH. Into these accumulators are entered the tens complement of the angle values 45, 90, 135, 180, 225, 270 and 315. Certain short cut provisions are made which might be best explained in connection with Fig. 22 in which the angles listed above are represented as three-position figures.

Directly below the same are represented the tens complements thereof. On the next lower line labeled "add" the angle 75° (for example) is designated under each of the angle values and beneath that on the line headed "total" is indicated the difference in each of the separate cases. It will be noted that for angles 45°, 135°, 225°, and 315°, the units value of their complements is 5 and that for a tens carry from the units order to the tens order of angle 45° there will also be a tens carry in the alternate higher orders. This fact is recognized in the design of the mechanism and permits the elimination of a setting for the units order values of the angles except in the case of 45°. The setting is made so that, when a tens carry takes place from the units to tens order in the 45° section, a units carry will also take place into the alternate higher orders as indicated on the diagram (Fig. 22).

The purpose of the multiple subtraction of the selected angle from the predetermined angle values is to ascertain in which Octant of the circle the selected angle falls. In the present case the selected angle of 75° 41′ 37″ is greater than 45° and less than 90°, and this is evidenced by a tens carry out of the highest order of the 45° section. In other cases the determination is made as to which is the highest valued section from whose highest order a tens carry is made.

Figure 23A:
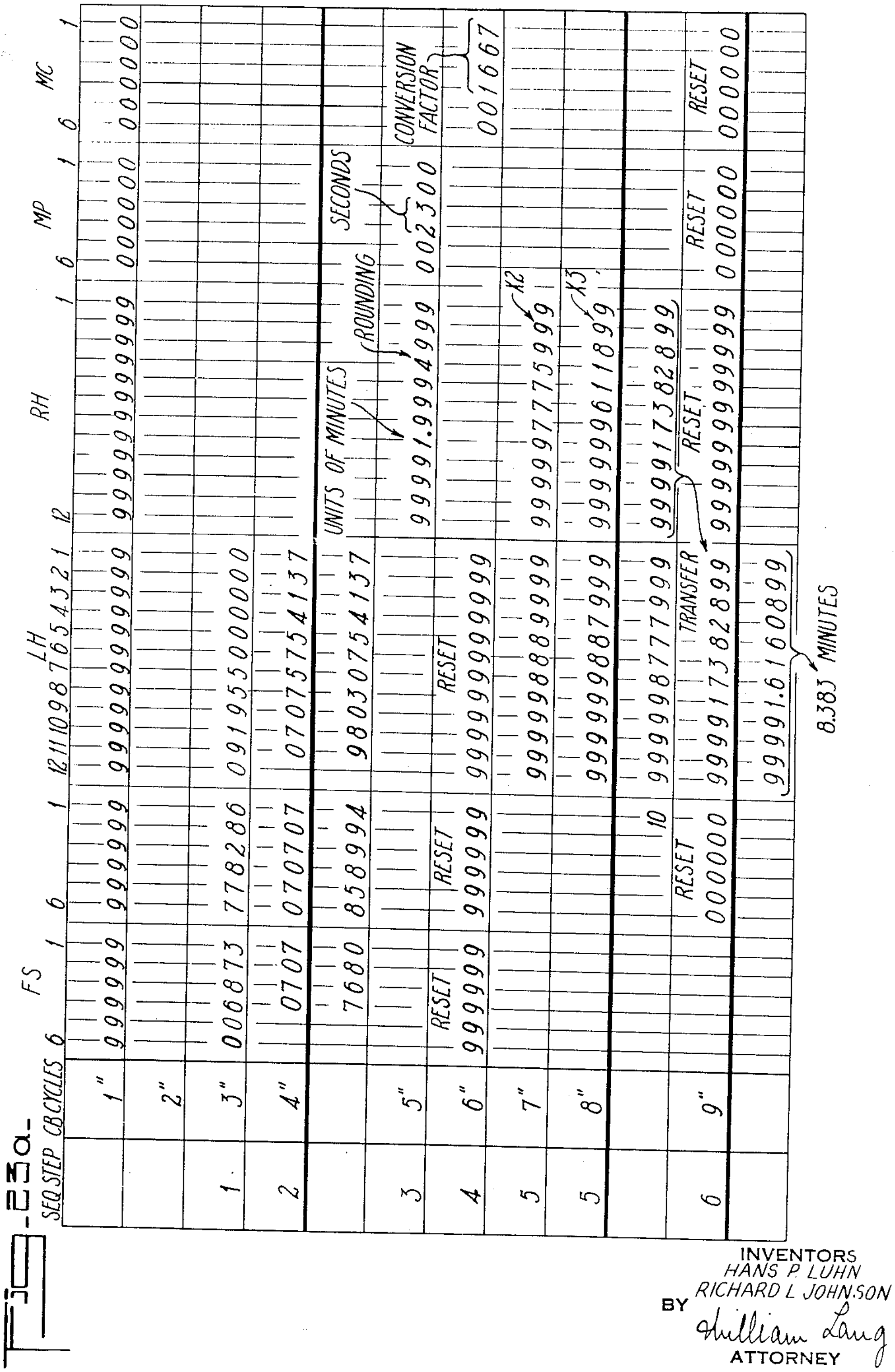

Following the principles outlined in connection with Fig. 22, the tens complements of the seven identified angles are entered during the third CB cycle in positions of the FS and LH accumulators as represented in Figs. 22 and 23*a*. During the following fourth CB cycle, the tens digit 7 of the first selected angle 75° is entered in the positions shown along the Add line of Fig. 22. In addition thereto, the units digit 5 is entered into the two positions (5 and 7 orders) of the LH accumulator and the minutes and degrees values are also entered therein for storage purposes.

*Circuit for relay R333.*—In the third CB cycle (during which relay R106 is now deenergized), a circuit is completed when contacts CB16 close which is traceable on Fig. 1*b* through the *e* contacts of R119, wire 224 (Fig. 1*a*), the *j* contacts of R106, wire 247 which extends to Fig. 1*s*, and to the common conductor 160 at level 20 of the Sequence Switch (whose wipers are all set at the home or 1 position), thence through the wiper in the 1 position, relay R333 to ground. Concurrently, the relays R307, R310 and R317 are energized to condition the FS and LH accumulators for reception of the tens complement of the angle table. These relays are energized through the circuit from wire 247, to the common conductors in levels 15, 16 and 18, through the wipers of which in the 1 position the relays R310, R307 and R317 are respectively energized. These relays will remain energized for the duration of closure of contacts CB16 as indicated on the sequence chart (Fig. 2*b*).

At the 9 time in the cycle, a circuit is traceable from the emitting contacts CB6 to the 9 wire 227 (Fig. 1*i*), wire 251, *p* and *q* contacts of R333 (shifted), thence through wires 249, *a* contacts of R317 (shifted), in the 9 and 11 orders of the LH accumulator, *a* contacts of R318, *a* contacts of R319, start magnets 25 in these two orders to ground. As a result, these orders will be coupled for rotation and will continue until mechanically disengaged after nine steps of movement.

At the 8 time in the cycle, a circuit is traceable from the 8 impulse, wire 227, wires 251 (Fig. 1*t*), *k*, *m* and *n* contacts of R333 (shifted), to the *a* contacts of R307 and R310 (shifted), thence through *a* contacts of R308 and R311 in parallel and the *a* contacts of R309 and R312 in parallel to the start magnets 25 in the third order of the left hand section of the FS accumulator and the second and fourth orders of the right hand section of the FS accumulator to effect an entry of 8 in each of these three positions as indicated in the chart (Fig. 23*a*) along the line labeled 3″ CB Cycle.

At the 7 time of the cycle, the circuits are completed from 7 impulse wire 227 (Fig. 1*i*), *h*, *i*, and *j* contacts of R333, *a* contacts of R307 and R310 in the same manner as for the entry of 8, which will result in the entry of 7's in the fifth and sixth orders of the right hand section of the FS accumulator and in the second order of the left hand section of this accumulator (Fig. 23*a*).

At the 6 time in the cycle contacts CB9 complete a circuit through the 6 wires 227 and 251 to the *f* and *g* contacts of R333 (Fig. 1*t*), through the contacts of R307 and R310 to enter a 6 in the 1 order of the right hand section and in the fourth order of the left hand section of the FS accumulator.

At the 5 time in the cycle, contacts CB10 complete a circuit through the 5 wires 227 and 251 to the *d* and *e* contacts of R333 (Fig. 1*i*) (shifted), *a* contacts of R317, and thence down to the start magnets 25 in the 7 and 8 orders of the LH accumulator to enter 5's therein.

There is no entering circuit at the 4 time.

At the 3 time, a circuit is completed from contacts

CB12, through the 3 wires 227 and 251 (Fig. 1*t*), *c* contacts of R333 to energize the start magnet in column 1 of the left hand section of the FS accumulator.

At the 2 time a similar circuit through the *b* contacts of R233 will energize the appropriate start magnet in the third order of the right hand section of the FS accumulator.

At the 1 time the circuit extends through the *a* contacts of R333 (Fig. 1*i*), and thence to the *a* contacts of R317 to energize the start magnet in the tenth order of the LH accumulator.

Through the foregoing specifically traced circuits, the tens complement of the used portion of the several angles are entered into the accumulators for comparison with the selected angle of 75°.

The FS and LH accumulators are initially set at 9 in all orders as indicated on the first line of Fig. 23*a*, so that the entries just traced will be added to these 9's and tens carries take place under control of contacts CB15*a* (Fig. 1*i*), through wire 253 (see also Fig. 1*t*), and carry contacts 22. There is also the usual carry from high to low order in the LH accumulator and separately in the left and right hand section of the FS accumulator, so that the summation is as follows.

| | | | |
|---|---|---|---|
| initial | 999999 | 999999 | 999999999999 |
| entry | 006873 | 778286 | 091955000000 |
| carry | 111111 | 111111 | 111111111111 |
| sum | 006873 | 778286 | 091955000000 |

Near the end of CB cycle 3 the sequence switch is advanced from its 1 to its 2 position, and this is brought about as follows. Upon closure of contacts CB25 (Fig. 1*b*), a circuit is completed from line 200, through these contacts, wire 250, *c* contacts of R120, wire 251 (Fig. 1*s*), *e* contacts of R374, *e* contacts of R375, *k* contacts of R106, Start magnet 163 of the sequence switch to ground. A cycle point later, the stop circuit is completed from line 200 to contacts CB21*a* to energize the Stop magnet of the sequence switch, leaving it advanced one step.

Since relay R102 (Fig. 1*b*) remains energized (see also Fig. 2*b*), the circuit through the CB clutch magnet will be completed again to effect another cycle of the CB cams, during which fourth cycle the selected angle values will be entered into the FS and LH accumulators as indicated on the chart (Fig. 23*a*).

This entry is at present standing on the storage relays and the transfer is effected as follows.

*CB cycle 4*

When contacts CB16 (Fig. 1*b*) now close, current will be directed to the *e* contacts of R119, wire 224 (Fig. 1*a*), *j* contacts of R106, wire 247 (Fig. 1*s*), the common conductors 160 to energize the relays R307, R310 and R317 as before, with the circuits extending through the wipers 161 in their 2 positions. In addition thereto, a circuit will be completed through wire 247 (Fig. 1*s*) to the common conductor of the sequence switch at level 17 to wire 254 (Fig. 1*a*) and relay R249 to ground. A further circuit extends through the common conductor of level 22 (Fig. 1*s*) to relay R316.

With these several control relays energized for the period of closure of contacts CB16, entering circuits may be completed through their related contacts traceable as follows. For the minutes and seconds values, the transfer circuits are substantially the same as those traced for the ordinate entries, except that the circuits are directed through the start magnets of the LH accumulator instead of the X and Y accumulators and are directed through the *a* contacts of R317. For the degrees there is no setting in the hundreds order, so this involves no circuit completion. In the tens of degrees order, wherein the value 7 is set on order 8 of the storage relays, the circuit is completed at the 7 time in the cycle through the 7 wires 227 and 228 (Fig. 1*d*), *a* contacts of R249 (shifted), 7 wire 204, extending to the 8 order of the storage relays (Fig. 1*e*), d contacts of 1 relay R201, *c* contacts of 2 magnet R201, *b* contacts of 4 magnet R201, *a* contacts of 7 magnet R201 (shifted), 2 wire 203 (Fig. 1*f*), 8 wire 229, thence through a pair of *a* contacts of R316 (shifted) to the 6 wire of the group 255 (Fig. 1*i*), and the *a* contacts of R317 to the start magnet 25 in the sixth order of the LH accumulator. This circuit also branches (Fig. 1*f*) from the 7 wire 229 through the *a* contacts of R316, to the 8 and 10 wires 255, from which circuits extend through the corresponding *a* contacts of R317 to the start magnets 25 in the 8 and 10 orders of the LH accumulator to direct entries of 7 in such orders as indicated in the diagram of Fig. 23*a*.

Figure 1T:
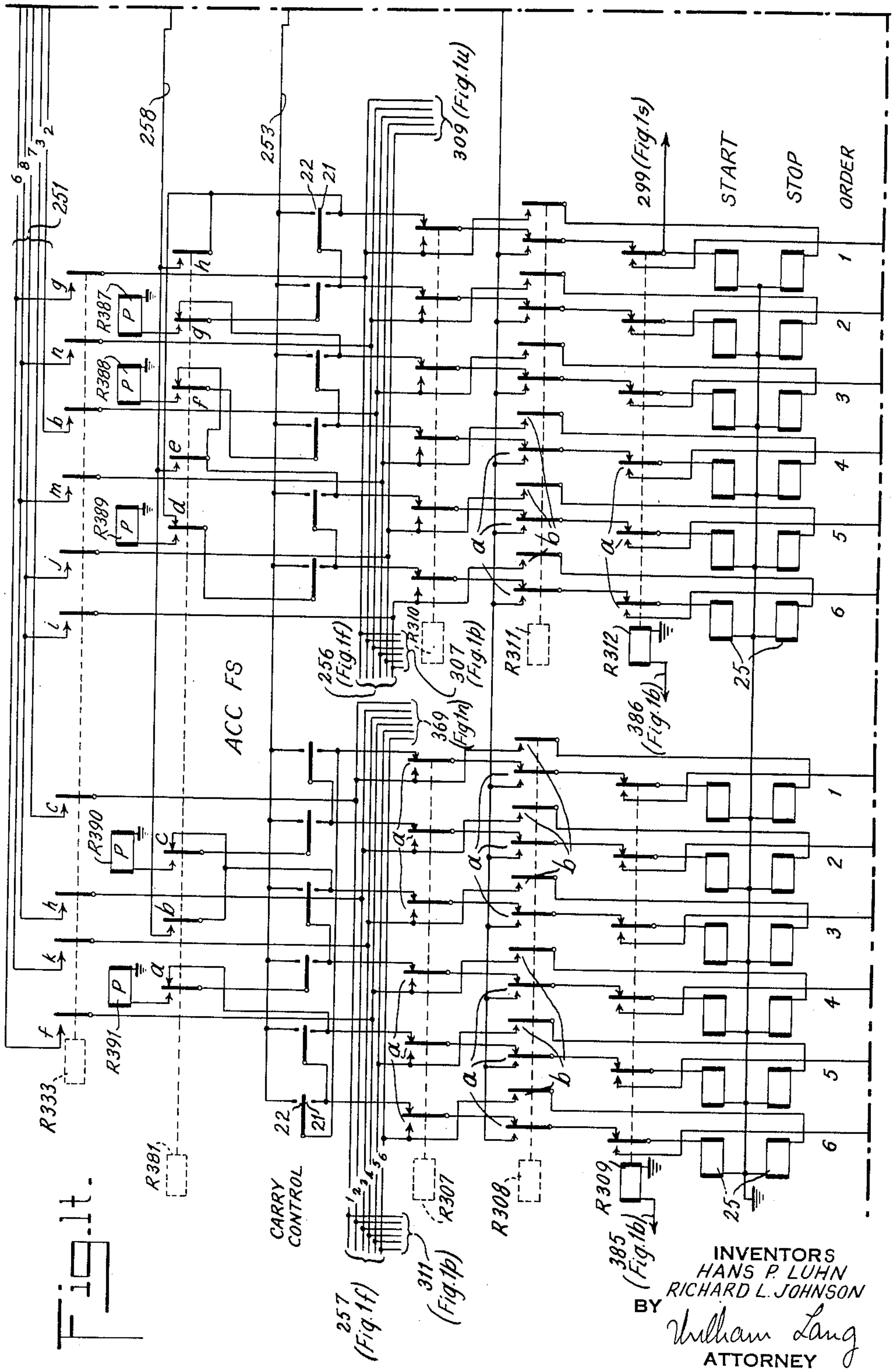
Figure 1U:
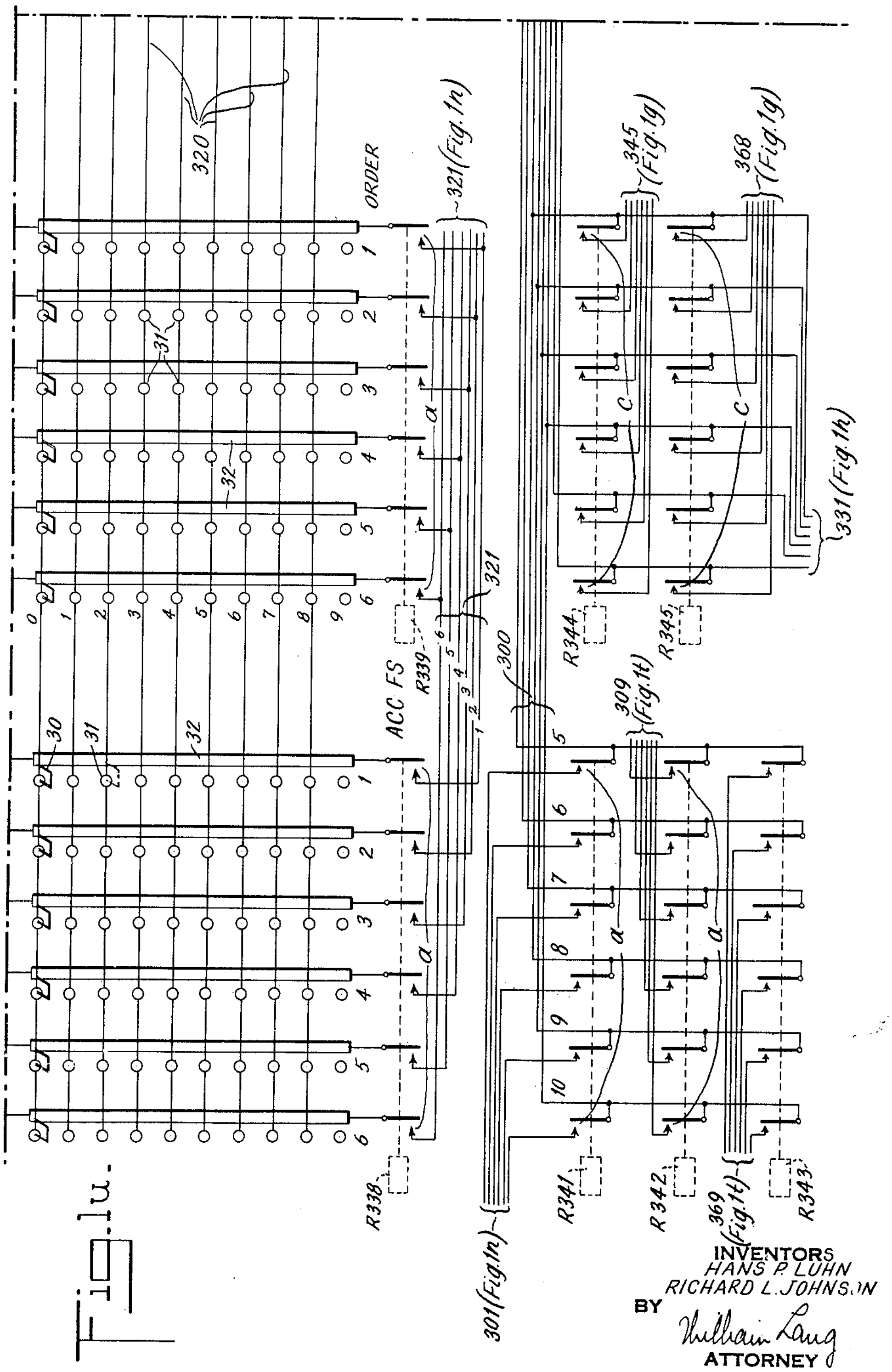

There are further branches from the 7 wire 229, through *b* contacts of R316 (Fig. 1*f*) to the 1, 3 and 5 wires of a group designated 256 which extend to Fig. 1*t* to direct the circuits through *a* contacts of R310 (shifted), and through *a* contacts of R311 and R312 to start magnets 25 in the 1, 3 and 5 orders of the right hand section of the FS accumulator.

Still further branches extend from the 7 wire 229 (Fig. 1*f*), through *c* contacts of R316 to the 1 and 3 wires of a group designated 257 which extend to Fig. 1*t* to direct circuits through *a* contacts of R307 (shifted) and *a* contacts of R308 and R309 to start magnets 25 in the 1 and 3 orders of the left hand section of the FS accumulator.

For the units of degrees, a circuit is completed at the 5 time in the cycle through the seventh order of the storage device to the 7 wire 229 (Fig. 1*f*) from which parallel circuits extend through the *a* contacts of R316 to the 5 and 7 wires 255 (Fig. 1*i*) and thence through the corresponding *a* contacts of R317 to enter a 5 in the 5 and 7 positions in the LH accumulator. Through the connections in Fig. 1*f* and with reference to Fig. 23*a*, it can be determined through which circuit paths the other digits of the angle are entered into accumulator LH.

*Control of tens carry circuits during cycle 4.*—Just prior to the tens carry period of the cycle, a circuit is completed from line 200, through contacts CB17 (Fig. 1*s*), common conductor 160 in level 24 of the sequence switch, the wiper 161 and segment 162 in its 2 position, to relay R381 and ground. This relay controls contacts designated *a* to *j* in Figs. 1*t* and 1*i* which in their normal position are included in the tens carry circuits of the FS and LH accumulators to enable tens carries to progress normally from lower to higher orders in the LH accumulator and in the two sections of the FS accumulator.

With the relay R381 energized, tens carry is suppressed between the ninth and tenth orders and also between the eleventh and twelfth orders of the LH accumulator and between the second and third, and fourth and fifth orders of the right hand section of the FS accumulator and between the second and third, and fourth and fifth orders in the left hand section of the FS accumulator. At the carry time in the cycle, when contacts CB15*a* close (Fig. 1*i*), a circuit is traceable from line 200, contacts CB15*a*, wire 253, through the tens carry contacts 22 in the seventh order of the LH accumulator (in which 5 is added to 5, see Fig. 23*a*), *a* contacts of R317 in the eighth order, down to the start magnet 25 in such order.

A branch circuit extends from the tens contact 22 in the seventh order over wire 258 (Fig. 1*t*) to the *h*, *e* and *b* contacts of R381 (shifted), thence down to *a* contacts of R310 and R307 to the start magnets 25 of the FS accumulator which are specifically the 1 and 5 orders of the right hand section and the 3 order of the left hand section, to enter a 1 in each of these orders. The entry of 1's in these orders is in accordance with the procedure outlined hereinabove in connection with Fig. 22 and will result in advance of the FS and LH accumulators, so that they represent the values indicated along the line below that representing the fourth CB cycle in Fig. 23*a* and the line following the one labeled Carry in Fig. 22.

*Selection of angle difference.*—In accordance with Fig. 21, the angle of 75° lies between 45° and 90° and, as a result of the entries made in the fourth CB cycle, there will be a tens carry out of the 9 order of the LH accumulator which is the order in which the hundreds of degrees is entered (see Fig. 23*a*). The occurrence of the tens carry out of this order is an indication that the value of the selected angle is greater than 45°. Inspection will show that, if the angle had been greater than 90°, the tens carry would be effective from order 11 of the LH accumulator; if the angle were greater than 135°, the carry would be effective out of order 2 of the right hand section of the FS accumulator; if the angle were greater than 180°, the carry would be effective out of order 4; if the angle were greater than 225°, carry would be effective out of order 6; if the angle were greater than 270°, the carry would be effective out of order 2 in the left hand section of the FS accumulator, and if the angle were greater than 350°, carry would be effective out of order 4.

For the example chosen, where the angle lies between 45° and 90°, the carry circuit out of the ninth order of the LH accumulator completes a circuit from line 200, cam contacts CB15*a* (Fig. 1*i*), wire 253, through the tens carry contacts 22 of order 8 of accumulator LH to and through the tens contacts 21 in order 9, *j* contacts of R381 (shifted), and winding P of relay R385, to ground. This is a latch type relay and its contacts accordingly remain shifted until the related T winding is energized. Relay R385 is one of a set designated R385 to R391 (Figs. 1*i* and 1*t*), and these are each connected to contacts *j*, *i*, *g*, *f*, *d*, *c* and *a*, respectively, of R381 from which it can be seen that, when carries occur in the other positions as explained above, the set of relays will be energized accordingly so that for any given angle greater than 45° one or more of the relays R385 to R391 will be energized. If the angle is less than 45°, none of this set of relays will be energized. The trip winding T and the contacts controlled by the relays are shown in Fig. 1*k*.

*CB cycle 5*

During this cycle the complement of 75°41′37″ is to be read out of the LH accumulator. It will be mentioned at this point that a table lookup device is provided which has set up therein the sine and cosine values of angles from 0 to 45 degrees in steps of 10 minutes. Since the table is arranged with 10 minutes intervals, any angle expressed in degrees and tens of minutes can be directly read from the table. Where units of minutes and seconds are involved, steps of interpolation are carried out to obtain such values. For the present example, the angle is handled in its complementary form of 14°18′23″ of which sine of the portion 14°10′ may be read directly from the tables.

Referring to Fig. 21, this diagram represents the circle divided into octants and the angle under consideration lies in the second octant, that is, between 45° and 90°. It is designated as $\theta 2$. The problem involves solving the shaded triangle lying within the second octant, specifically, finding the E and N values of this triangle. The angle of the triangle which is to be solved is 90° minus $\theta 2$, and as is obvious this is the complement of the given angle. For this reason, the table lookup selection is made in accordance with such complement. Since the value of the degree portion of the angle has been set up in orders 5 and 6 of the LH accumulator, a simple inversion of the reading will produce the complementary value.

Examination of Fig. 21 will show that for angles in each of the octants the angle of the shaded triangle to be solved is represented in terms of 90°, 180°, 270°, and 360° minus the given angle or the given angle minus these four values, so that in each case the value of the units of degrees of the given angle will always be algebraically combined with a 0. This enables the conservation of the accumulator orders by always reading the units of degrees from the fifth order of the LH accumulator either directly or in complementary form according to which octant is under consideration. The manner in which the angles lying in the various octants are handled will be more specifically set forth hereinafter.

The remainder of the angle complement is converted to a decimal of tens of minutes. The machine will take the difference between the value of the sine of 14° 10′ and 14° 20′, multiply this difference by the decimal equivalent of tens of minutes, and combine it with the direct sine value to obtain the sine or cosine value of the complete angle.

*Entry circuits for complement of seconds.*—As indicated in Fig. 23*a*, the complement amount 23 seconds is to be entered into the multiplier accumulator MP, and this 23 represents the complement of the seconds value 37 complemented to 1 minute or 60 seconds. As a first step of this operation, relay R302 is energized to prepare the MP accumulator to receive the entry. This relay is energized through a circuit from line 200, through contacts CB16 (Fig. 1*b*), *e* contacts of R119, wire 224 (Fig. 1*a*), *j* contacts of R106 (shifted), wire 247 (Fig. 1*s*), common conductor 160 in level 15 of the sequence switch, wiper 161 in the 3 position and relay R302 to ground. This latter, of course, will be energized for the duration of closure of contacts CB16 (Fig. 2*b*). A further circuit is completed through contacts CB16 to *j* contacts of R106, wire 247 extending to the common conductor 160 at level 16, wiper 161 in position 3 to energize relay R392.

A third circuit is completed through CB16 to wire 247 and common conductor in level 22, wiper in position 3, wire 260, *a* contacts of R391, *b* contacts of R390, *a* contacts of R389, *b* contacts of R388, *a* contacts of R387, *b* contacts of R386, *a* contacts of R385 (now shifted), thence through relay R393 to ground.

*Units of seconds circuit.*—For then entry of the units of seconds (complementary 3) into order 3 of accumulator MP (Fig. 23*a*), a circuit is traceable from the 3 impulse wire 227 (Fig. 1*k*) at the 3 time in the cycle to one of the group of wires 261, through one of the group of *a* contacts of relay R393 (now shifted), to the 7 wire of group 262 (Fig. 1*j*), to the segment in the 7 segment of order 1 of the LH accumulator readout device, wherein the brush 30 is set at 7.

The group of *a* contacts of R393 (when shifted) will invert the impulses from the wires 227 in accordance with the tens complementary values and, when in normal position, connect the value positions of the readout directly to correspondingly valued wire 227.

From the 7 segment 31 (Fig. 1*j*) at which the accumulator brush 30 is set, the circuit continues through the common conductor 32 to *f* contacts of R392 (shifted), wire 263 (Fig. 1*n*), *a* contacts of R302 (shifted) in the third position of accumulator MP, *a* contacts of R303 to the start magnet 25 in the third position and thence to ground. Accordingly, the wheel in this order will advance three steps before being mechanically disengaged.

*Tens of seconds circuit.*—In the next higher order a similar circuit is traceable from the 2 impulse wire 227 (Fig. 1*k*) at the 2 time in the cycle, the 2 wire 262, through one of the *b* contacts of R393 (shifted) to the 3 wire 264 (Fig. 1*j*), which directs the circuit to the readout segment 31 in the 3 position of the second order of accumulator LH, where the brush is set at 3, thence through *e* contacts of R392 (shifted) wire 265 (Fig. 1*n*), *a* contacts of R302 in the fourth order of accumulator MP, to the related start magnet 25 to enter a 2 in such order.

It may be pointed out that the *b* contacts of R393 are connected (when shifted) to direct the impulses to the positions in the second order of the LH readout device in accordance with the 5's complement of the digit standing in such order.

*Circuits for 00 seconds.*—In a special case where the LH accumulator has a setting of 00 seconds, the manner of converting to the complement of 60°, which would result in the entry of 60° in the related orders of the MP accumulator, varies somewhat and may best be explained by specifically tracing the circuits involved. Thus, for the units of seconds the circuit is traceable from line 200 (Fig. 1*k*) through contacts CB5*b*, left hand *a* contacts of R393 (shifted), 0 wire 262 (Fig. 1*j*), the 0 readout segment in order 1 of the LH accumulator, *f* contacts of R392 (shifted), and from thence to the start magnet 25 in the third order of the MP accumulator, as previously traced. This circuit is completed one step ahead of the 9 time in the cycle (Fig. 13), so that the wheel will advance ten steps, that is, it will rotate a full revolution, returning to its initial position, which in this case is 0. Tens carry contacts 22 (Fig. 1*n*) are provided between the third and fourth orders of the MP accumulator, so that as a result of this entry of 10 the carry contacts 22 will be closed and the tens carry impulse through contacts CB15*b* will be effective to carry a 1 into the fourth order.

In the tens of seconds order a circuit will be completed at the 5 time in the manner similar to that previously explained for the chosen example, so that the fourth order of the accumulator MP will be advanced five steps. Later in the cycle at the carry time the carry circuit through the now closed carry contacts 22 will effect an additional step of advance so that the wheel will represent 6.

*Units of minutes circuits.*—In the RH accumulator the units of minutes (1) is to be entered in order 8 and a 5 (the complementary 4 is to be entered in order 4 for rounding off purposes, see Fig. 23*a*). As a preliminary, accumulator preparing relay R325 is energized through a circuit traceable from line 200 (Fig. 1*b*), through contacts CB16, *e* contacts of wire R119, wire 224 (Fig. 1*a*), *j* contacts of R106, wire 247 (Fig. 1*s*), common conductor 160 of the sequence switch at level 17, position 3 and relay R325 to ground. This relay will shift its *a* contacts from the position shown in Fig. 1*g*. Through these contacts, all the start magnets 25 of accumulator RH will receive an impulse at the 9 time to commence rotation of the related wheels. This circuit extends from the 9 impulse wire 227, through the *a* contacts of R325 (shifted), *a* contacts of R326 to the start magnets 25 to ground.

In all orders except the fourth and eighth, rotation will continue to enter 9's in such orders in the now familiar manner. In the eighth order, a circuit is completed at the 8 time in the cycle directed to the stop magnet 25 which is traceable as follows: from the 8 impulse wire 227 (Fig. 1*k*), 8 wire 261, a pair of *c* contacts of R393 (shifted), to the 1 wire of group 265 (Fig. 1*j*), the contact segment in the 1 position of the third order of accumulator LH, brush 30, conductor 32, thence through *d* contacts of R392 (shifted), wire 267 (Fig. 1*g*) to the 8 wire of a group 268 and to stop magnet 25 in order 8 (not shown) of the RH accumulator.

In order 4 of the RH accumulator, an impulse is transmitted at the 5 time in the cycle to stop the advance after four steps of movement which is traceable from line 200 (Fig. 1*s*), contacts CB10*a*, common conductor 160 of the sequence switch at level 25, wiper 161 in position 3, wire 269 (Fig. 1*g*), 4 wire 268, thence to stop magnet 25 in order 4 of the RH accumulator (not shown).

At the carry time in the cycle, a carry circuit is completed from the highest to lowest order of the RH accumulator to enter a fugitive 1, so that at the end of the cycle this accumulator stands at the value indicated on the line labeled "5" CB cycle, Fig. 23*a*.

*Table lookup switch setting.*—In Fig. 1*s* are shown three pairs of start and stop magnets 133 and 129 designated T*d*, T*m* and U*d* which control the advance of a number of wipers 112 (Fig. 15) which traverse levels of the table lookup device. The start and stop magnets control starting and stopping of the movement of the wipers in a manner similar to the way in which the start-stop magnets of the accumulators control the advance of the adding wheels.

Each of the wipers 112 has twenty positions and they are normally set in a 0 position. These three start magnets 133 are to be energized in accordance with the complement of 90°. This may be explained by the following table:

89°59′60″—90°
75°41′37″—given angle
14°18′23″—difference

In the foregoing table it is noted that the difference represents the angle whose sine is to be derived from the table lookup device which, as mentioned before, provides for the sine and cosine of angles up to 45°. Through the following circuits and in accordance with the reduced angle, the start magnet T*d* (tens of degrees) will be energized for one step of advance, the magnet U*d* (units of degrees) will be energized for four steps of advance and the magnet T*m* (tens of minutes) will be advanced for one step of advance. These three magnets are related to degrees and tens of minutes of the reduced angle, and their related wipers are to be advanced steps corresponding to values of the digits in this part of the angle.

*Circuit for lookup magnet Td.*—Considering first the start magnet T*d*, an impulse is transmitted at the 1 time in the cycle (see also Fig. 2*b*) which is traceable from the 1 impulse wire 227 (Fig. 1*k*), 1 wire 262, a pair of *d* contacts of R393 (shifted), 7 wire of group 270 (Fig. 1*j*), the 7 segment in order 6 of the LH accumulator on which the brush 30 is now set, common conductor 32, wire 271 (Fig. 1*k*), *a* contacts of R386, R388 and R390 in series, *a* contacts of R392 (shifted), wire 272 (Fig. 1*s*), and the start magnet 129 of pair T*d* to ground. At the 0 time in the cycle a stop impulse is transmitted from line 200, contacts CB26, common conductor 160 at level 27 of the sequence switch, wiper 161 in the 3 position to stop magnets of all three T*d*, T*m* and U*d* magnets.

*Circuit for lookup magnet Ud.*—For energization of start magnet U*d*, a circuit is traceable at the 4 time from the 4 impulse wire 227 (Fig. 1*k*), a pair of *c* contacts of R393 (shifted), to the 5 wire 266 (Fig. 1*j*), the 5 segment in order 5 of the LH accumulator, common conductor 32, *b* contacts of R392 (shifted), wire 273 (Fig. 1*s*), start magnet 129 of pair U*d* to ground.

*Circuit lookup magnet Tm.*—For the start magnet 129 of the pair T*m*, the circuit is also traceable at the 1 time from the 1 wires 227 and 262 (Fig. 1*k*), through a pair of *b* contacts of R393, 4 wire 264 (Fig. 1*j*), the 4 segment in order 4 of the LH accumulator, *c* contacts of R392 (shifted), wire 274 (Fig. 1*s*) to the start magnet 129 of pair T*m* and ground.

At this point the manner in which angles lying in the other octants are selected for control of the table lookup device will be explained. As pointed out hereinabove and in connection with Fig. 2*l*, it will be recalled that the octant selected is determined during the carry portion of cycle 4 and in accordance with whether or not there is a tens carry out of predetermined orders of the LH and FS accumulators.

If the angle lies in the first octant, there will be no carry so that during the fifth cycle circuits will extend from the 1 to 9 impulse wires 227 (Fig. 1*k*), (bearing in mind that it is only the tens of degrees digit that is transferred directly or complementarily from a selected section of the LH or FS accumulator, and that the digits in other denominations are read from the 1 to 5 orders of the LH accumulator), through *d* contacts of R393 (in normal position), wires 270 (Fig. 1*j*), through the setting in order 6 of the LH accumulator, wire 271 (Fig. 1*k*), and through the *a* contacts of R386, R388 and R390, *a* contacts of R392, wire 272 (Fig. 1*s*), to the table lookup magnet T*d*. The digit transferred would accordingly be in true value, since inverting relay R393 was not energized.

If the angle lies in the third octant, the relays R385 and R386 are energized to direct the entry of an impulse from wires 222 (Fig. 1*k*), through *d* contacts of R393 and wires 270 (Fig. 1*j*) as before to order 10 of the LH accumulator, wire 275 (Fig. 1*k*), *a* contacts of R386 (shifted), *a* contacts of R388 and R390, *a* contacts of R392 (shifted) and wire 272 to the magnet T*d* as before. This is a direct transfer of the true value since relay R393 is not energized.

If the angle lies in the fourth octant, the relays R385, R386 and R387 are energized, R387 shifts its *a* contacts (Fig. 1*k*), in the circuit of relay R393 to energize the same. The entering impulses will then be directed from impulse wire 227, through the *d* contacts of R393 (shifted), wire 270 (Fig. 1*j*), the readout in order 10 of the LH accumulator, wire 275 (Fig. 1*k*), and thence through the *a* contacts of R386, R388, R390 and R392 to the T*d* magnet to energize it in accordance with the inverted or 9's complement of the digit set up in order 10 of accumulator LH.

If the angle lies in the fifth octant, relays R385, R386, R387 and R388 are energized. Relay R393 is not energized. The entering impulses will then be directed from impulse wires 227 through the *d* contacts of R393, and wires 270 to the readout in order 3 of the right hand section of the FS accumulator (in which the tens of degrees digit is also set), wire 276 (Fig. 1*k*), *a* contacts of R388 (shifted), *a* contacts of R390 and R392 and wire 272 (Fig. 1*s*) to the magnet T*d* to energize it in accordance with the true value of the digit.

If the angle lies in the sixth octant, relays R385 to R389 and also the inverting relay R393 are energized and entering impulses will be directed through *d* contacts of R393 (shifted), wires 270, readout in order 3 in the right hand section of the FS accumulator, wire 276, *a* contacts of R388 (shifted), to the magnet T*d* as before.

If the angle lies in the seventh octant, relays R385 to R390 are energized and the entering impulses will be directed through the *d* contacts of R393, readout in order 1 in the left hand section of the FS accumulator, wire 277 (Figs. 1*j* and 1*k*), *a* contacts of R390 (shifted), to magnet T*d* as before.

If the angle lies in the eighth octant, relays R385 to R391 and also relay R393 are energized and the entering impulses will be directed through the *d* contacts of R393, readout in order 1 in the left hand section of the FS accumulator, wire 277, *a* contacts of R390 (shifted) to magnet T*d* as before.

Where the angle lies in octant 2, 4, 6 or 8, the entry through the circuits just identified will be inverted, that is, complemented to 90°. The reason for this may be best explained in connection with the diagram in Fig. 21, where it is noted that in the second octant in which the angle of tthe specific problem lies the angle is the direct complement of 90°. In the fourth octant the angle is the direct complement of 180° and the value of the tens of degrees of the angle subtracted from 90° is set up in the tenth order of the LH accumulator, so that to obtain the 180° minus the angle, it is simply necessary to complement the setting in this order to 90° to obtain the desired value. As diagrammatically represented in Fig. 21, the angle of the triangle to be solved in the fourth octant is 180° minus the angle. In the sixth octant, the angle to be selected in the table lookup device is represented by $270°-\theta 6$ and, since the angle of 180° is already set up in the FS accumulator, that is, the tens of degrees portion is set in order 3 of the right hand section of FS, it is simply necessary to complement this to 90° to obtain $270°-\theta 6$. Likewise, where the angle lies in the eighth octant, the angle to be used for controlling the table lookup is $360°-\theta 8$. This is obtained by complementing the value of the angle to 270°, which latter has the tens of degrees digit set up in order 1 of the left hand section of FS.

In connection with octants 1, 3, 5 and 7, it will be noted that for the first octant the angle of the triangle to be solved is the actual measured angle $\theta$ and the tens of degrees digit is read directly from order 6 of LH. In octant 3, the angle used for the table lookup selection is $\theta 3—90°$. Since the tens of degrees digit of this angle is already set up in order 10 of the LH accumulator, it would read out directly. Similarly in the fifth octant, the required angle is $\theta—180°$ for which the tens of degrees digit is set up in order 3 in the right hand section of FS and can be used directly.

The determination of what octants require inversion of the readout is controlled through the set of relays R385 to R391 whose contacts will control the inverting relay R393, so that it will be energized when the angle lies in the second and alternate octants and will remain deenergized when the angle lies in the first and alternate octants.

The specific circuit for energizing this relay has already been traced in connection with the problem selected for illustration and under other conditions will be energized through similarly traceable circuits.

*CB cycle 6*

During this cycle the conversion factor 1667 is entered into the MC accumulator and the FS and LH accumulators are to be reset to 9's as indicated in Fig. 23*a*. For entering the conversion factor, a circuit is first completed to energize relay R335 which is traceable from contacts CB16 (Fig. 1*b*), *e* contacts of R119, wire 224 (Fig. 1*a*), *j* contacts of R106, wire 247 (Fig. 1*s*) to the common conductor 160 at level 21, wiper 161 in the 4 position, to relay R335 and ground.

*Conversion factor circuits.*—Relay R335 closes a group of contacts in Fig. 1*n*. These contacts are designated *a*, *b*, *c* and *d* and are wired so that the *a* contacts receive an impulse at the 1 time in the cycle from the 1 impulse wire 227, the *b* and *c* contacts receive an impulse at the 6 time from the 6 wire, and the *d* contacts receive an impulse at the 7 time from the 7 wire, *a* contacts of R305 (now shifted) in the four lowest orders, thence through *a* contacts of R306 to the start magnets 25 in the MC accumulator and thence to ground. In accordance with the time of completion of the different circuits, the value 1667 will be entered into this accumulator, with the adding wheels being disengaged at the 0 time through the usual mechanical knockout. Relay R305 was energized through the circuit from conductor 160 of the sequence switch at level 16, position 4 and relay R305 to ground. (Fig. 1*s*).

It may be noted that in this accumulator the electrical knockout is not required, so that the stop magnets 25 are not provided in this accumulator. The same is true for the multiplier accumulator MP.

*Reset circuits for FS and LH accumulators.*—For resetting the FS and LH accumulators, each order is reset through a circuit controlled by that order so that tracing of the resetting operation of one will suffice for the remainder. Resetting is effected by adding into each order the 9's complement of the digit standing therein to thereby advance the wheel to 9. For resetting purposes, relays R309, R312 and R319 are energized. Of these R309 is energized through a circuit from line 200, through CB16 (Fig. 1*b*), *e* contacts of R119, wire 224 (Fig. 1*a*), *j* contacts of R106, wire 247 (Fig. 1*s*), sequence switch common 160 at level 20, wiper 161 in position 4 to relay R309. A parallel circuit extends from the common conductor 160 at level 19 and the wiper 161 in position 4, to relay R312. The third circuit extends from the common conductor 160 at level 18, the wiper 161 in position 4 to relay R319.

In the FS and LH accumulators (Figs. 1*u* and 1*j*), the readout segments 31 thereof are connected directly to the set of impulse wires 227 in accordance with the 9's complement of the readout position; for example, in the units order position of the LH accumulator (Fig. 1*j*), the 7 position is wired to the 2 wire 227 which is timed to close at 2 (the 9's complement of 7). Accordingly, at the 2 time in the cycle this impulse will extend to the readout segment in the units order of the LH accumulator, thence through the brush 30 now set thereat, the common conductor 32 in the units order, *a* contacts of R319 (Fig. 1*i*) in the units order (shifted), to the start magnet 25 in this order. Two steps later, at the 0 time the mechanical knockout will be effected to disengage the accumulator clutch in this order, leaving the wheel advanced two steps from 7, that is, at the 9 position. In all other orders similar circuits are completed to advance those wheels to their 9 settings. In the two sections of the FS accumulator, relays R309 and R312 (Fig. 1*t*) shift their *a* contacts to complete the circuits to related start magnets 25 in the same manner as the *a* contacts of R319 for the LH accumulator.

*Multiplying circuit selection.*—During this cycle (see also Fig. 2*c*) certain circuits are established in anticipation of a multiplying operation which is to commence in the following cycle 7, during which the amounts in the MP and MC accumulators are to be multiplied for conversion of seconds to the decimal of tens of minutes. It may be mentioned that the multiplying arrangement includes automatic column shift and column selecting arrangements for reducing the number of multiplying cycles to a minimum.

It may also be stated at this point that multiplying is carried out in accordance with the partial products method wherein digits of the multiplier are effective in successive order, starting with the highest, to obtain left and right hand components of partial products, and these are entered separately into LH and RH accumulators respectively.

For the example under consideration, the highest significant digit of the multiplier is contained in order 4 of the MP accumulator (see Fig. 23*a*), and through the circuits about to be traced the location of this digit is ascertained and multiplying circuits controlled accordingly. In Fig. 1*w* six relays designated R365 to R370 are provided, one for each of the six orders of the MP accumulator, and these will be energized in accordance with whether or not their related orders contain 0. For the example chosen, orders 1, 2, 5 and 6 of accumulator MP are set at 0, so that related relays R370, R369, R366, R365 will be energized through parallel circuits of which the one for the units order is representative and is traceable as follows.

Figure 1W:
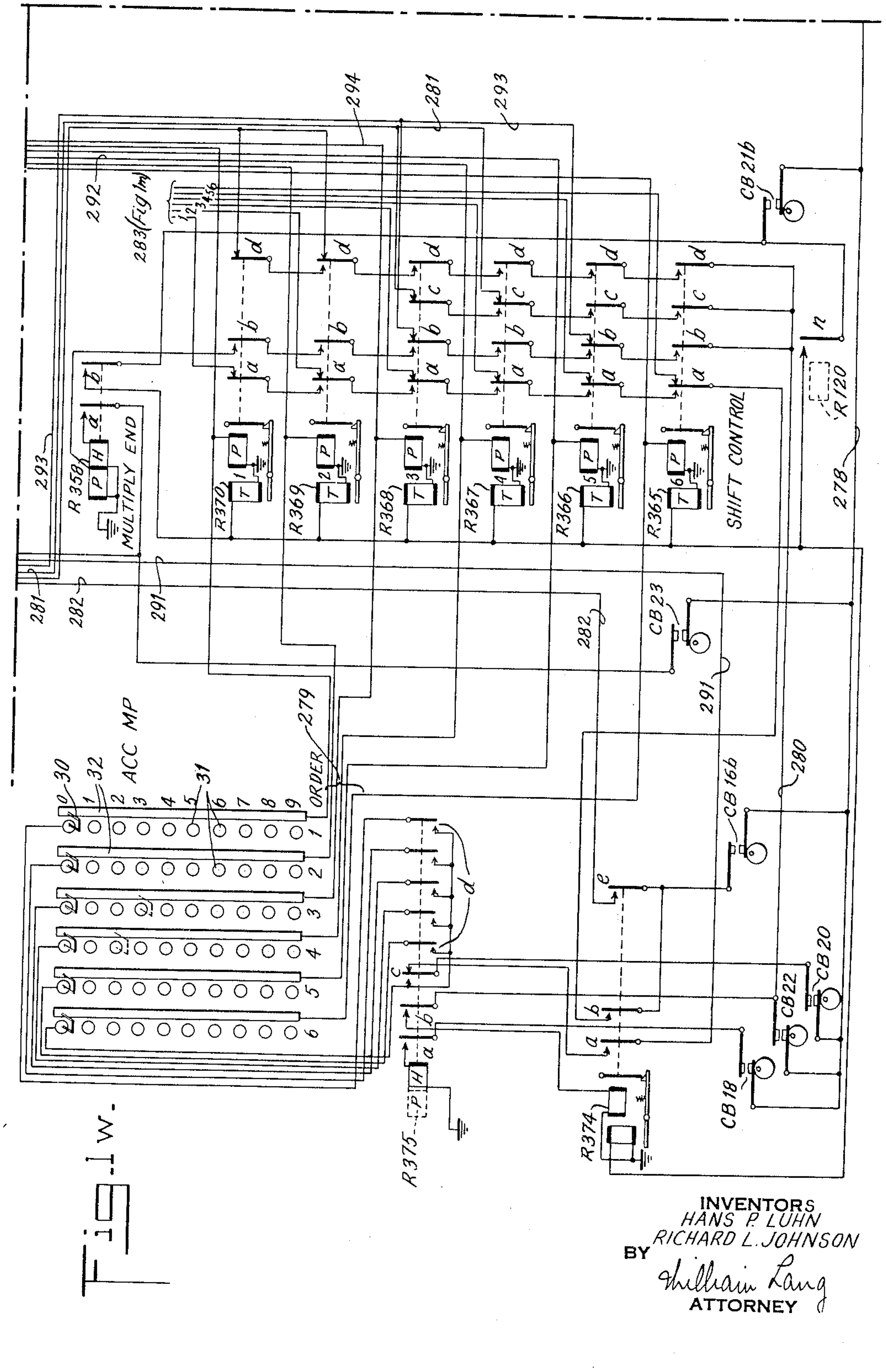
Figure 2C:
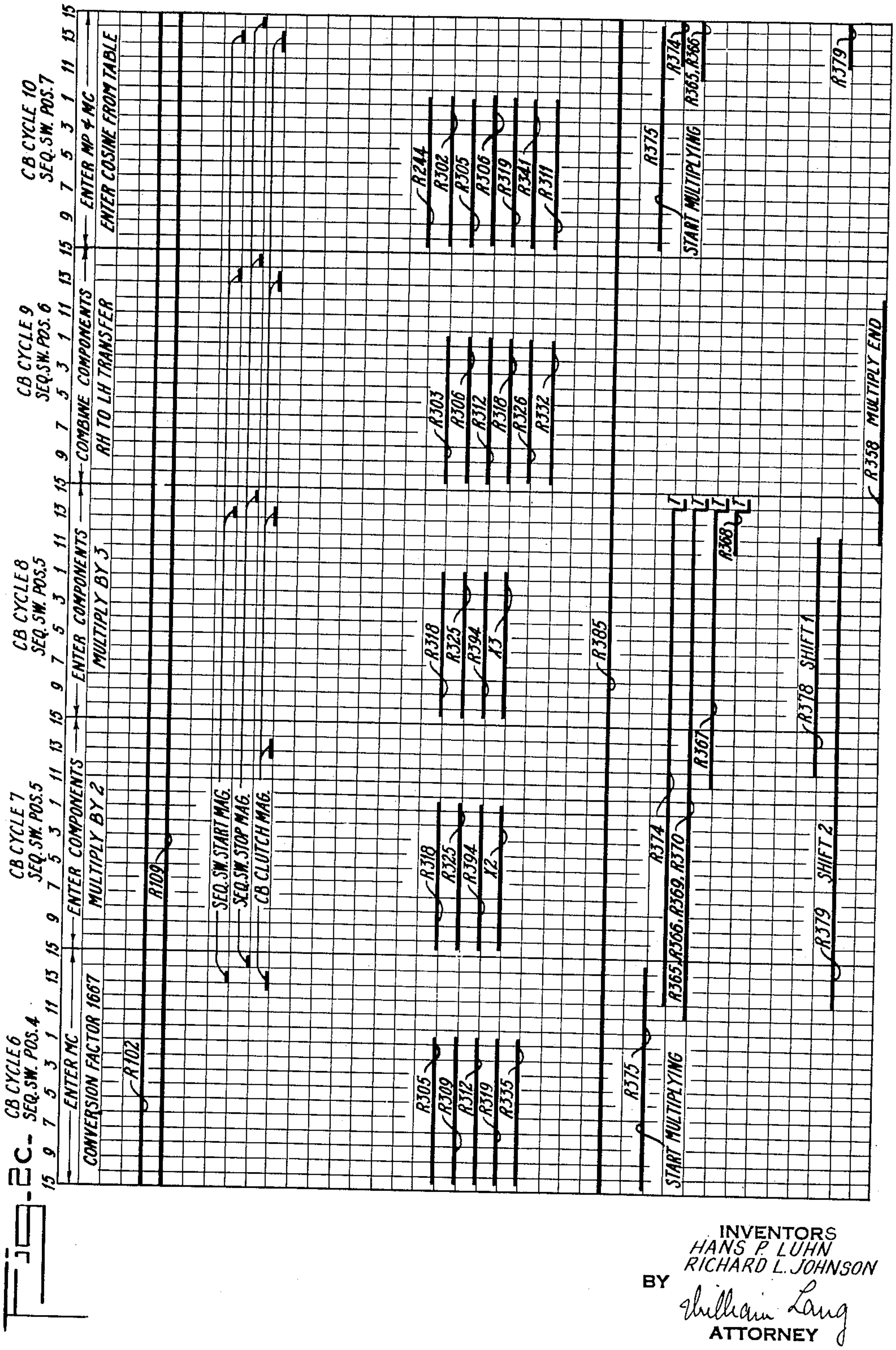

*Zero selection circuits for accumulator MP.*—As a preliminary, relay R375 is energized. This relay is wired in parallel with relay R305, so that it was energized concurrently therewith as indicated on the sequence chart (Fig. 2*c*). The *a* contacts of R375 (Fig. 1*w*) provide a holding circuit extending through contacts CB18 and wire 278 (Fig. 1*n*) to line 200. Later in the cycle, when contacts CB22 (Fig. 1*w*) close, a circuit extends from line 200 and wire 278 through these contacts, *b* contacts of R375 and winding P of relay R374 which is of the latching type. A circuit is now completed from line, through contacts CB20, *c* contacts of R375 (shifted), thence through a group of five contacts of R375 generally labeled "*d*" to the readout segments 31 in the 0 position of one section of the MP readout device (in the highest order the circuit extends directly from the *c* contacts of R375). In those positions in which the multiplier brushes are set at 0, the circuit extends downwardly through the common conductor 32 and a related one of a group of wires generally designated 279 to the related relays R365 to R370 and thence to ground. Thus, for the example chosen, all but the two central relays will be energized and their contacts latched.

Figure 1V:
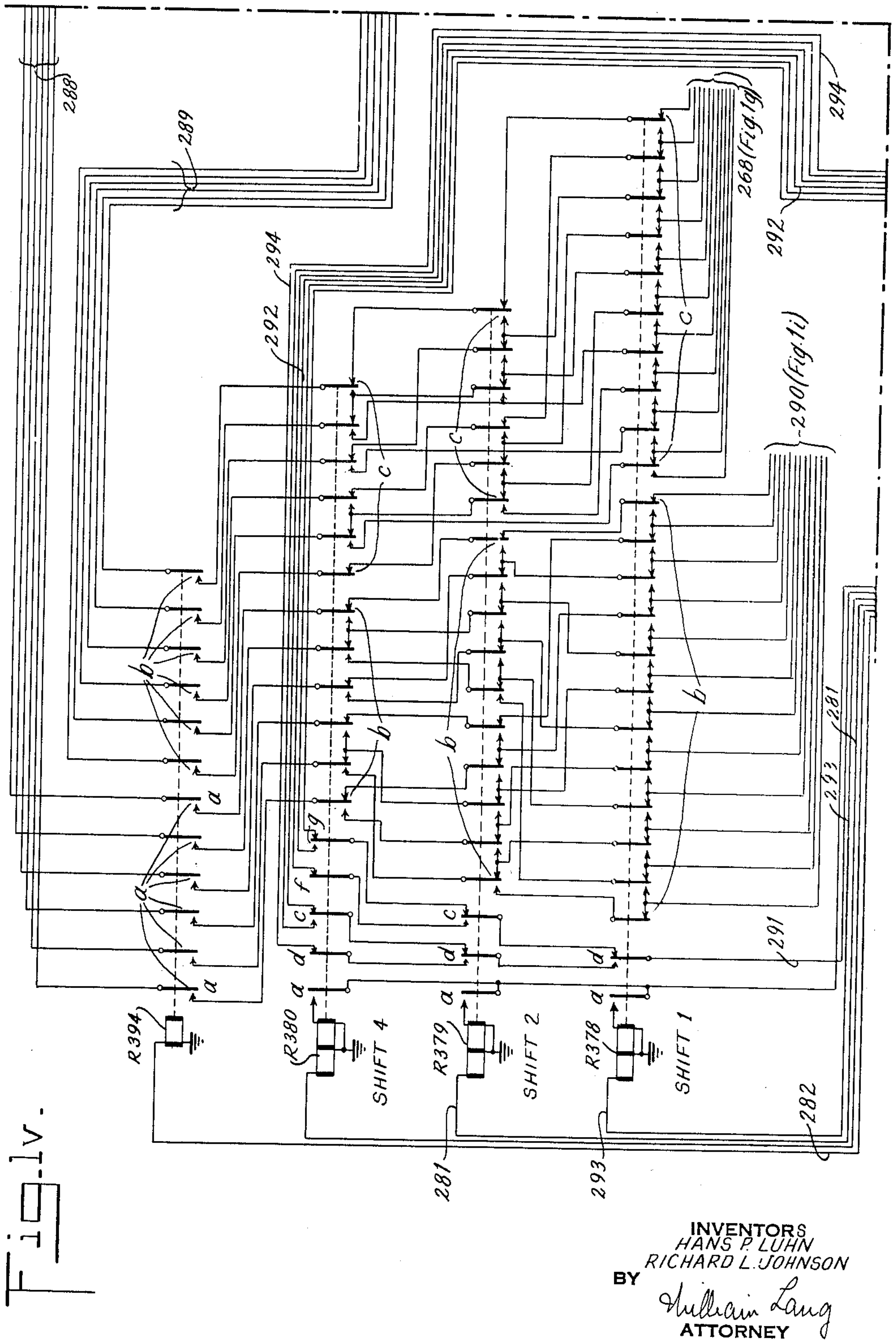

*Column shift circuits.*—In Fig. 1*v* relays R378, R379 and R380 control related sets of contacts which may be designated as column shift contacts for directing the entries of right and left hand components of partial products into the appropriate denominational orders of the LH and RH accumulators. Generally speaking, when none of these relays are energized, the components will be entered in positions farthest to the left, i. e. in the highest orders of the accumulators. With R378 energized, the entry will be made with a one step shift to the right, with R379 energized there will be a shift of two steps to the right and with R380 energized there will be a shift of four steps to the right. This set of three relays is designated with the legend "shift 1," "shift 2" and "shift 4" indicating a binary progression so arranged that the extent of shifting will depend upon the sum of the shift values of the relays. For example, a shift of three places is brought about by energization of both the shift 1 and shift 2 relays, a shift of six places, by the energization of shift 2 and shift 4 and so on.

The relays are initially energized under control of contacts of the set of relays R365 to R370 (Fig. 1*w*) to energize the relays R378 to R380 combinationally in accordance with the number of 0's to the left of the first significant figure in the multiplier.

For the chosen example the number of 0's is two and the shift 2 relay R379 is accordingly energized through a circuit traceable from line 200, wire 278 through contacts CB22, wire 280, *c* contacts of R365 (shifted), *c* contacts of R366 (shifted), wire 281 (Fig. 1*v*), *c* contacts of R367 and relay R379 to ground. The relay closes its *a* contacts to provide a holding circuit through CB23 (Fig. 2*c*).

It may be pointed out at this time that during the next following cycle circuits controlled by shift 2 relay R379 will cause energization of the next relay R367, at the end of which cycle the shift 2 and shift 1 relays will be energized, and in the following cycle these two relays will pick up the next relay R368 to advance the combinational setting one further step and so on, i. e., for each successive cycle the relays R365 to R370 are in effect advanced one position as though representing one more 0 setting and these in turn will advance the shift relays one unit. Where, as for the present example, there are 0's in lower orders for which certain of the group R365 to R370 have already been energized as a result of the initial sensing of the multiplier, a circuit will be completed in series through all the *b* contacts of this set of relays to energize relay R358 designated as the "multiply end" relay.

In the sequence diagram (Fig. 2*c*) the order in which the shift and shift control relays are energized for the chosen problem is set forth.

Near the end of cycle 6, the sequence switch is advanced to bring its wipers to the 5 position and through a circuit traceable from line 200 (Fig. 1*b*), contacts CB25, wire 250, *c* contacts of R120, wire 251 (Fig. 1*s*), *e* contacts of R375 (shifted), *k* contacts of R106, and start magnet 163 of the sequence unit to ground. As before, an impulse from contacts CB21*a* will energize the stop magnet after one step of movement, so that the sequence brushes are now in their 5 position.

*Suspension of sequence switch advance.*—It will be noted that the previous stepping impulses for the sequence switch extended through the *e* contacts of R374 which are now shifted and latched and will remain so until the end of multiplying operations. The *e* contacts of R375 will only be shifted for one cycle, after which they will remain in normal position, so that the sequence switch will not be advanced from this point until the completion of multiplying operations. During the last multiplying cycle, relay R358 will be energized as previously mentioned to shift its *c* contacts whereby a further impulse is directed to the start magnet 163 of the sequence switch.

*CB cycle 7*

During this cycle the components of the partial products obtained by multiplying the conversion factor 1667 by 2 are obtained and entered into the LH and RH accumulators in the form of 9's complement as indicated along the line designated seventh cycle in Fig. 23*a* with the column shift contacts allocating the entries in appropriate orders. The method of forming the partial products and entering them separately in the left hand and right hand component accumulators is well known and the same will accordingly be but briefly explained by tracing the circuits for one of the digits, namely, the multiplier digit 2.

As a preliminary to multiplying, the relays R318 and R325 are energized to condition the LH and RH accumulators to receive the complementary entries. The energizing circuit for these relays extend from line 200 (Fig. 1*s*), contacts CB16*a*, thence in parallel through the *c* and *d* contacts of R374 (shifted) to relays R325 and R318 respectively, and thence to ground. These relays will shift their *a* contacts (Figs. 1*g* and 1*i*, respectively) to direct an impulse at the 9 time from the 9 wire 227 to all the start magnets 25 in the RH and LH accumulators, so that all wheels commence rotating at such time.

Relay R374 also closes a pair of *e* contacts (Fig. 1*w*) to direct a circuit from contacts CB16*b*, through the *e* contacts of R374, wire 282 (Fig. 1*v*) and relay R394 to ground. This relay shifts its *a* and *b* contacts (normally open to prevent back circuit conditions) to connect the column shift contacts to the multiplying relays for completion of circuits therethrough.

*Multiplier digit selection.*—A circuit is now completed to the times 2 multiplying relay designated X2 (Fig. 1*m*) which is traceable from line 200, wire 278 (Fig. 1*w*) to contacts CB16*b*, *b* contacts of R374 (shifted), *a* contacts of R365 to R366 (shifted), *a* contacts of R367, thence through the 4 wire of group 283 (Fig. 1*m*) to common conductor 32 of the MP readout device associated with the 4 order (in which the brush is set at 2), brush 30 and segment 31, thence through the 2 wire of a group 284 to the multiplying relay designated X2.

*Partial product circuits.*—This relay closes a set of contacts, directly below, which will select from the set of digit impulses wires 285 all possible left hand components derived from the multiplication by 2 and direct them to a group of left hand component wires generally designated 286 and also select all possible right hand digits of multiplication by 2 and direct them to a set of RH component wires generally designated 287.

These two sets of component wires extend to the MC readout device which according to the setting of the brushes therein will select from the transmitted impulses those corresponding to multiplication of the multiplicand value by the digit 2 and will transmit these impulses through sets of LH and RH component wires 288 and 289, respectively (Fig. 1*v*), through the *a* and *b* sets of contacts of R394 to the sets of column shift relay contacts controlled by the shift 4, shift 2 and shift 1 relays, thence through groups of wires 290 (Fig. 1*i*) and 268 (Fig. 1*g*) to the stop magnets 25 of the LH and RH accumulators. In the case of the LH accumulator, these circuits extend through the shifted *b* contacts of relay R318. These multiplying circuits are not specifically traced as they are well known. Thus, at the end of cycle 7 the entries as indicated on line labeled "seventh cycle" of Fig. 23*a* will have been made and added to the settings already in the LH and RH accumulators.

After the entering period of the cycle, the circuits are readjusted for multiplying by the next significant multiplier digit 3 during the following cycle. Specifically, relay R367 (Fig. 1*w*) is energized through a circuit which extends from line 200, wire 278, to contacts CB20, *c* contacts of R375, *a* contacts of R374 (shifted), wire 291 (Fig. 1*v*), *d* contacts of R378, *e* contacts of R379 (shifted), *f* contacts of R380, wire 292 (Fig. 1*w*) and relay R367 to ground. This relay will accordingly shift its contacts so that shortly thereafter a circuit will be completed through the *b* contacts of R374, *a* contacts of R365, R366 and R367 (all shifted), *a* contacts of R368, the 3 wire 283 (Fig. 1*m*), to the readout strip in order 3 of the MP readout device, and thence through the 3 wire of the group 284 to the X3 multiplying relay in preparation for multiplying by 3 during the next following cycle.

A circuit is also traceable from contacts CB22 (Fig. 1*w*), *c* contacts of R365, R366 and R367 (all shifted), *c* contacts of R368, wire 281 (Fig. 1*v*), to the relay R379. A parallel circuit also extends from the *b* contacts of R365, R366, R367 (all shifted), to the *b* contacts of R368, wire 293 (Fig. 1*v*), relay R378 and to ground, so that during the next cycle the shift 1 and shift 2 relays will be energized to direct the entry circuits with a one order displacement to the right.

*CB Cycle 8*

At the beginning of this cycle, the conditioning relays R318, R325 and R394 are again energized as indicated in the sequence chart (Fig. 2*c*) through circuits already traced, so that with relay X3 now energized multiplying circuits will be completed through the contacts of the multiplying relays (Fig. 1*m*) and the MC readout device to the column shift relays (Fig. 1*v*), and thence to the stop magnets 25 of the LH and RH accumulators. It will, of course, be recalled that the energization of the conditioning relays R318 and R325 causes the initial 9 impulse to be transmitted to these accumulators to commence rotation of the adding wheels. Accordingly, during the entering period of cycle 8 the values entered will be as indicated along the line designated "eighth cycle" in Fig. 23*a*. These values added to the entries already therein and taking into account tens carries from highest to lowest orders, the amounts now standing in the LH and RH accumulators are as indicated along the line following that labeled "eighth cycle."

In the latter part of the eighth cycle relay R368 is energized through the circuit traceable from contacts CB20 (Fig. 1*w*), *c* contacts of R375, *a* contacts of R374, wire 291, *d* contacts of R378 (shifted), *d* contacts of R379 (shifted), *d* contacts of R380, wire 294 (Fig. 1*w*) to relay R368 and ground. Since the *b* contacts of the relays of the group R365 to R370 are now all shifted, an impulse from contacts CB22, throught wire 280, is now traceable in series through all of these *b* contacts to energize the multiplying end relay R358 which will close its *a* contacts to hold through contacts CB23.

Relay R358 closes its *b* contacts to complete a circuit from line and wire 278, through contacts CB21*b*, *b* contacts of R358, to the trip magnets of the group R365 to R370 and of relay R374.

R358 also shifts its *c* contacts (Fig. 1*s*) so that the next impulse from contacts CB25 extending to wire 251 will be directed through the *c* contacts of R358, *e* contacts of R375, *k* contacts of R106 to the start magnet 163 of the sequence switch unit to advance it to its sixth step or position.

*CB cycle 9*

During this cycle and as indicated along the line labeled "ninth cycle" (Fig. 23*a*), the MC and MP accumulators are reset to 0, the amount in the RH accumulator is transferred to the LH accumulator and reset to 9 and finally the right hand section of the FS accumulator is reset to 0.

*Reset of accumulator MC.*—Considering these operations separately, reset of the MC accumulator is brought about as follows. A circuit is completed from contacts CB16 (Fig. 1*b*), *e* contacts of R119, wire 224 (Fig. 1*a*), *j* contacts of R106, wire 247 (Fig. 1*s*), common conductor 160 of the sequence switch at level 16 and wiper 161 in position 6, to relay R306 and ground. This relay shifts its *a* contacts in Fig. 1*n* so that circuits are completed from the impulse emitting wires 227, wire connections 295 to the segments 31 of the MC readout device in accordance with the tens complementary values. These circuits are directed to the shifted *a* contacts of R306 to start magnets 25 in the corresponding orders of accumulator MC. The effect of adding the tens complement of the digit to such digit will advance it to 0 position. As explained earlier, the MC accumulator is not provided with tens carry devices so that carry units are not involved and the wheels, when mechanically disengaged at the 0 time, will remain in 0 position.

*Reset of accumulator MP.*—For the accumulator MP, the resetting is effected in a similar manner with the exception that, since a tens carry device 22 is provided between orders 3 and 4, it is necessary to suppress the carry between these orders during the resetting operation. This is effected by holding relay R303 energized for a period extending through and beyond the carry period in the cycle (see Fig. 2*c*). The energizing circuit for this relay is traceable from line to wire 247 (Fig. 1*s*) as before and to the common conductor 160 of the sequence switch at level 15, winding P of relay R303 to ground. This relay closes a pair of *b* contacts (Fig. 1*n*) which will hold through contacts CB18*a* which are timed to extend through the tens carry period to the cycle.

*RH to LH transfer.*—For the RH to the LH transfer and concurrent RH reset operations, relays R326, R332 and R318 are energized under control of the sequence switch with the circuit extending from the common conductor 160 at level 17, wiper 161 in the 6 position, to relay R326 and in parallel to relay R332. A further circuit extends from the common conductor 160 at level 118 and the wiper 161 in position 6 to relay R318.

The transfer circuits from the RH accumulator to the LH accumulator extend from the impulse wires 227 (Fig. 1*h*), through a group of wires 296 to the readout segments 31 of the RH readout device. These wires are connected from the impulse wires 227 in a 9's complementary manner, that is, the 0 segments 31 receive an impulse at 9, the 1 segments receive an impulse at 8 and so on. With the brushes 30 of the readout device directing the circuits through the common conductors they extend through the *a* contacts of relay R332 (shifted), group of wires 297 (Fig. 1*i*), wires 255, through the *b* contacts of R318, stop magnets 25 of the LH accumulator to ground.

The start magnets 25 of the LH accumulator in all orders will initially have been energized at the 9 time in the cycle through the *a* contacts of R318, so that the stop impulse will serve to interrupt advance of the wheels after they have moved an extent equal to the value of the transferred amount.

*Reset accumulator RH.*—In addition, the complementary impulses used to transfer from RH to LH accumulator branch from wires 296 (Fig. 1*h*) and conductor 32 through a group of wires designated 298 (Fig. 1*g*) to and through the *a* contacts of relay R326 to energize the start magnets 25 of the RH accumulator, so that the wheel in each order may start its resetting movement concurrently with the completion of a transfer circuit through such order, and each wheel will reach its 9 position at the mechanical knockout point in the cycle, so that all the wheels will be in the 9 position at the end of the entering period of this cycle.

*Reset accumulator FS.*—The resetting of the right hand section of the FS accumulator which is now standing with wires in all orders is brought about by advancing the lowest or number 1 order wheel ten steps. The circuit is traceable from line 200 (Fig. 1*s*) to the common conductor 160 at level 23 through contacts CB5*a* timed to close one point in advance of the 9 time in the cycle, common conductor 160 of the sequence switch at level 23, wiper 161 in the "6" position, wire 299 (Fig. 1*t*) to the start magnet 25 in the units or 1 order of the right hand section of the FS accumulator. As a result, this wheel will advance through its carry position, tripping the tens carry contacts 22 so that in the normal manner during the carry period a 1 will be transferred from the lowest to the next higher order and so on, including a carry from the highest to the lowest order which will leave all wheels standing at 0 at the end of the cycle.

The reset relay R312 is energized during this operation for the purpose of shifting its *a* contacts to prevent possible back circuits. The energizing circuit for this relay R312 is traceable in Fig. 1*s* from line to the common conductor 160 at level 19, the wiper 161 in the 6 position to relay R312 and ground.

At the end of CB cycle 9, the LH accumulator will contain the complement of 8.383 minutes which is the complement of the 8 minutes and 23 seconds rounded to three decimal places (see Fig. 23*a*).

*CB cycle 10*

During this cycle there is a transfer from the LH to the MP accumulator of the amount contained in orders 5 to 10, and this value will be entered in its true form. This value represents the decimal equivalent of the 8′23″ of the problem under consideration. During this cycle also, an entry is made in the right hand section of the FS accumulator representing the cosine of the angle 14°10′ as derived from the table lookup device (Fig. 23*b*). Concurrently, from the same table lookup the value 716 is entered in the MC accumulator which represents the difference between the cosine entered and the cosine of the next higher angle (14°20′) set up in the device.

*Control relay pickup.*—Considering the circuits involved in effecting these entries, transfer to the MP accumulator is brought about as follows with the sequence switch now set in its seventh position. Relay R302 will be energized through the circuit from line to wire 247 as before (Fig. 1*s*), the common conductor 160 in level 15, the wiper 161 in position 7 to relay R302. A parallel circuit from common conductor 160 at level 18 will energize relay R319 and from the conductor 160 in level 19 a circuit extends to relay R341. From level 20, relay R311 is energized; from level 21 a circuit extends to relays R336 and R244 and from the conductor of level 16 a circuit extends to relay R305. These several relays energized with the sequence switch in its 7 position will control the transfer operations involved in this cycle. As previously explained, the energization of relay R305 is accompanied by energization through a parallel circuit of the relay R375 (see Fig. 2*c*) which serves to condition the multiplying circuits for later operation, and this relay will hold through contacts CB18 for the period indicated on the sequence diagram.

*LH to MP transfer.*—In Fig. 1*j* impulses from the wires 227 extend through *b* contacts of relay R241 to the readout device of the LH accumulator wherein the digit representing segments 31 are connected to their 9's complementary impulse lines and the circuit then extends through wiper 30 and conductor 32 (orders 5 to 10), group of wires 300 (Fig. 1*u*), the *a* contacts of R341 (shifted), wires 301, *a* contacts of R302 (shifted), *a* contacts of R303, to start magnets 25 of the MP accumulator which will start rotating at times corresponding to the true value of the digits entered, and as before at the 0 time the mechanical knockout device will function to interrupt rotation leaving the wheels in accumulator MP set in the position indicated in Fig. 23*b* along the line labeled "tenth cycle."

*Reset accumulator MP.*—The impulses transmitted from the LH accumulator are also employed to effect resetting of this accumulator by branching from the readout device (Fig. 1*j*), through wires 302 (Fig. 1*i*), through the *a* contacts of R319 (shifted) to the start magnets 25 in the LH accumulator. Inasmuch as the settings of this accumulator are in accordance with the 9's complement of the true value, the addition thereto of the true value will advance all the wheels to their 9 positions, leaving this accumulator in effect reset to 9's.

*Table lookup circuits.*—It was explained in connection with cycle 5 that the table lookup magnets T*d*, T*m*, U*d* were energized in accordance with the units and tens values of degrees and the tens value of minutes. Referring to Fig. 1*p*, the part of the table lookup device controlled by magnet T*d* is represented in the form of a 20 position switch having five active positions designated 0, 1, 2, 3 and 4, and divided into ten so-called levels so that where, for the example chosen the value 1 is entered in the table lookup device to represent 10°, the wipers 112 associated with the section are set in the 1 position as shown.

The section of the table lookup device controlled by the T*m* magnet comprises five sets of wipers 112 coupled for unitary movement to any one of the six positions designated 0, 1 . . . 5. Each set contains ten levels as designated, and the common conductors 115 in the levels are wired to the individual segments of the tens of degrees section as indicated; i. e. the individual segments 114 of the 0 set of T*d* are connected to the correspondingly numbered common conductors 115 in the 0 or left hand set of T*m* switches through a cable 303. The individual segments 114 of the 1 set of the T*d* switches are connected to the correspondingly numbered common conductors 115 in the next set of T*m* switches, and so on for the other three positions.

As will be noted, there are thus fifty common conductors (grouped in five cables 303) in the T*m* set of switches and there are six steps of the T*m* switch for each set. Each segment 114 of the T*m* set is wired (through cables 304*a* to 304*e*) to a related conductor 115 of the set of switches controlled by the units of degrees magnet U*d*. This, accordingly, calls for three hundred conductors 115 in the U*d* set of switches.

For purposes of simplicity in the circuit diagram, only one section of this set of switches is illustrated on an enlarged scale (Figs. 1*q* and 1*r*) to indicate the nature of the connections for such orders, and it will be understood that similar connections are made for the other twenty-nine sections.

Specifically, and considering the particular problem involved, the individual segments 114 (Fig. 1*p*) of the 1 step of the T*m* (tens of minutes) switch are connected through a cable 304*b* to a set of ten common conductors 115 of the U*d* group which are numbered 71 to 80.

The system of connections is such that the segments 114 in the 0 position of the left hand T*m* set extend through a cable 304*a* to the common conductors 115 similar to one in the set shown in Fig. 1*q*, which may be termed the 1 to 10 set (Fig. 24), for the next (1) step the connections are made through another cable 304*a* to a group of conductors termed the 11 to 20 set, etc.

Figure 24:
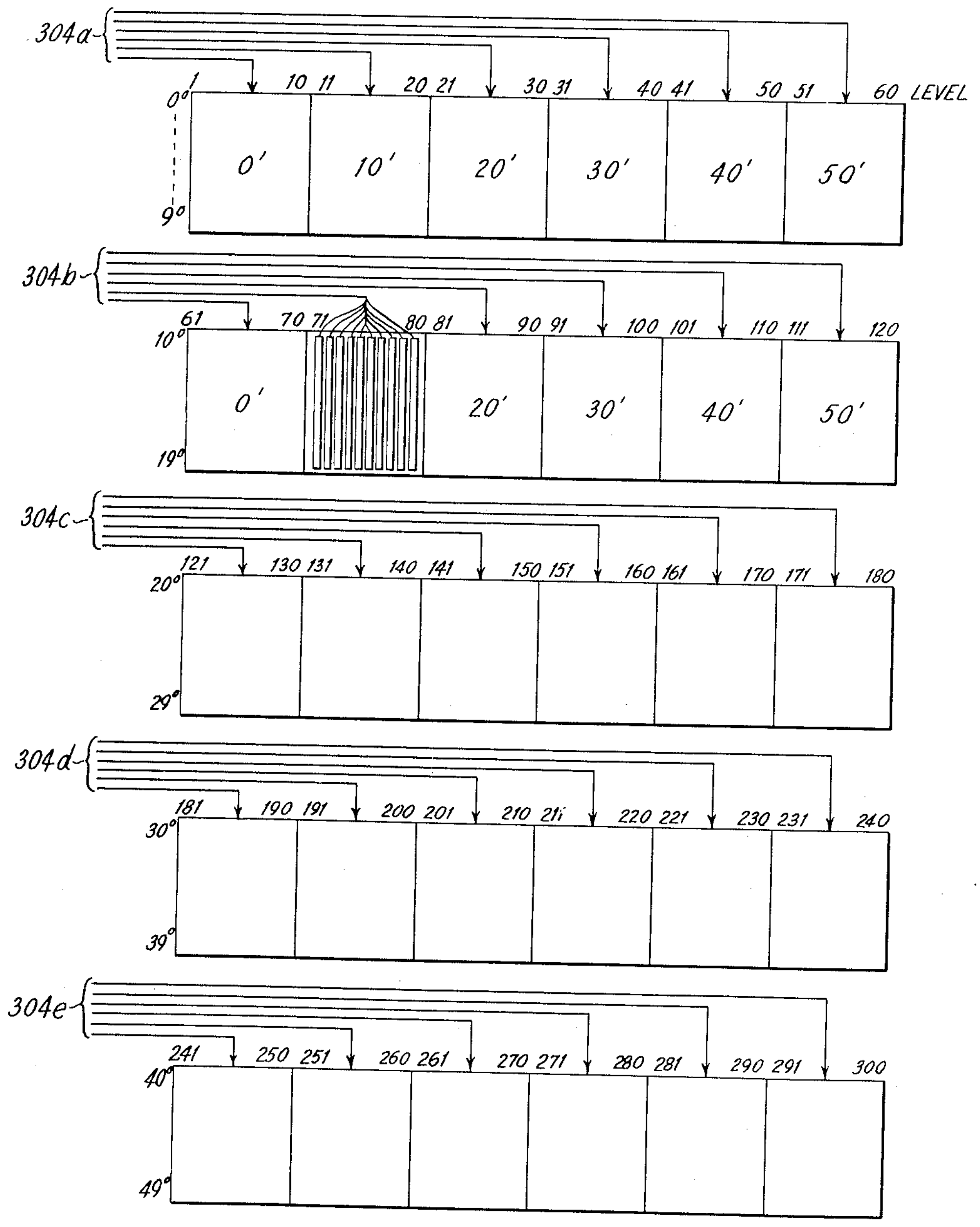

In Fig. 1*p* the destination for the various positions of the T*m* set are indicated as extending through cables 304*a* which are represented in Fig. 24.

For the U*d* set of switches (Figs. 1*q* and 1*r*) chosen for illustrative purposes, the individual segments 114 are directly connected to the digit impulse wires 227*a* as shown and indicated. These connections are made in such a manner that the six left hand levels 71 to 76 in positions 0 to 9 represent the cosines of the angles 10°10′, 11°10′, 12°10′, etc. to 19°10′ and the same levels in positions 10 to 19 represent the sines of these angles. In the four right hand levels 77 to 80 the connections are made in accordance with differences between adjacent sine and cosine values with ten-minute intervals, which are derived from well known tables of sine and cosine values. Wires 227*a* in Fig. 1*p* extend through a set of *a* contacts of relay R244 to the impulse wires 227. These contacts are closed during this cycle as explained. Thus, for the example chosen, where the angle set up is 14°10′ which, as pointed out, will call into action the levels numbered 71 to 80, with the brushes 112 set in the 4 position (Fig. 1*q*) it will be noted that the value 969588 will be effective and also the difference value 716.

The setting of the table lookup switches T*d*, U*d*, T*m* accordingly connects the digit impulse wires 227*a* through the U*d*, T*m* and T*d* sections from which connections extend through wires 305 (Fig. 1*p*) to the right hand section of the FS accumulator from the six left hand common conductors 115 of the T*d* switch and to the MC accumulator, through wires 306 from the four right hand conductors. The former are connected through wires 305, *a* contacts of R366 (shifted), *a* contacts of R337, wires 307 (Fig. 1*t*), *b* contacts of R311 (shifted), to the stop magnets 25 in the right hand section of the FS accumulator. In this accumulator the start magnets 25 will have received an initial starting impulse at the 9 time in each order through the shifted *a* contacts of R311. As a result, the cosine value 969588 of the table is entered in the form of a 9's complement 30411. In Fig. 23*b* on line labeled "tenth cycle" this complement of the cosine value is indicated as 030411.

The difference value 716 is entered through circuits extending through the T*d* readout (Fig. 1*p*), *b* contacts of R336 (shifted), wires 308 (Fig. 1*n*), *a* contacts of R305 (shifted), *a* contacts of R306 to the start magnets 25 of the MC accumulator. In this case, the wheels will be disengaged when they reach the 0 time in the cycle, so that the difference is entered as a true value into the MC accumulator as indicated in Fig. 23*b*.

During this cycle, relay R375 is energized (see Fig. 2*c*) as in cycle 6 to prepare for multiplying and, after the entries in MC and MP have been made, the MP accumulator is tested as before. Since the multiplier is now a four digit number, relays R365 and R366 (Fig. 1*w*) become energized together with the shift 2 relay R379 (Fig. 1*v*) to cause selection of the multiplier digit in order 4 of the MP accumulator.

*CB cycles 11 to 14*

Figure 2D:
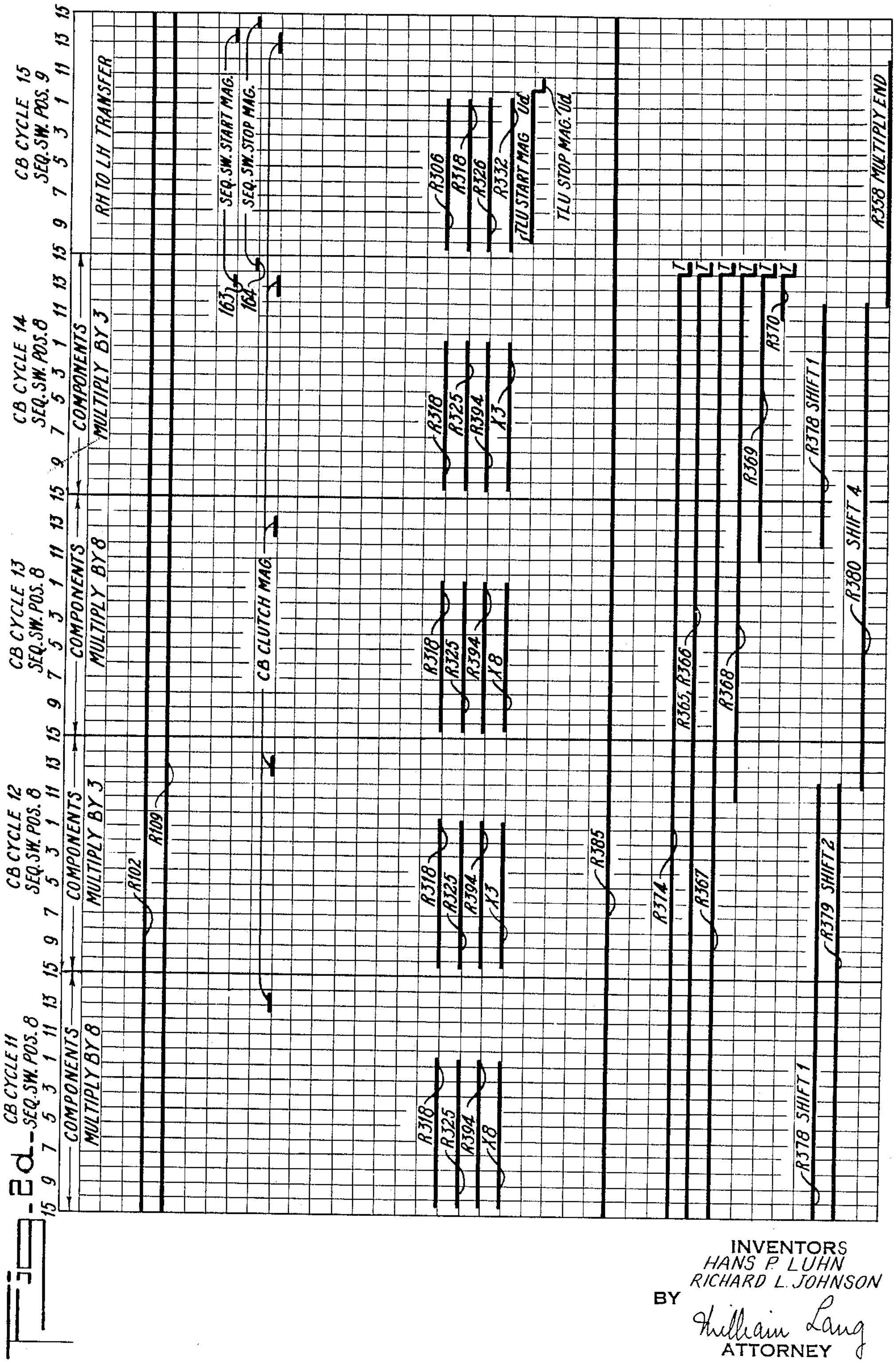
Figure 26E:
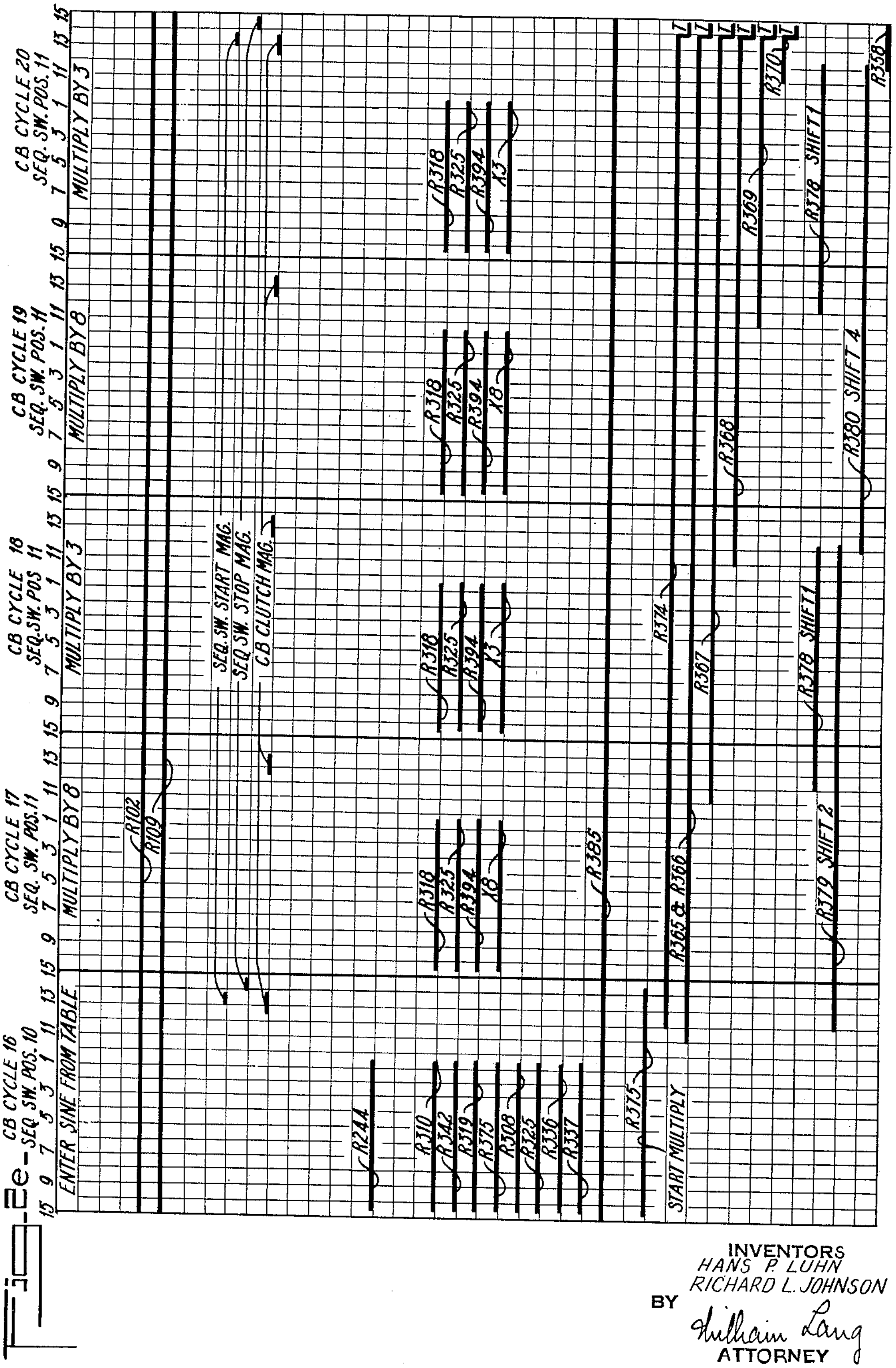
Figure 27:
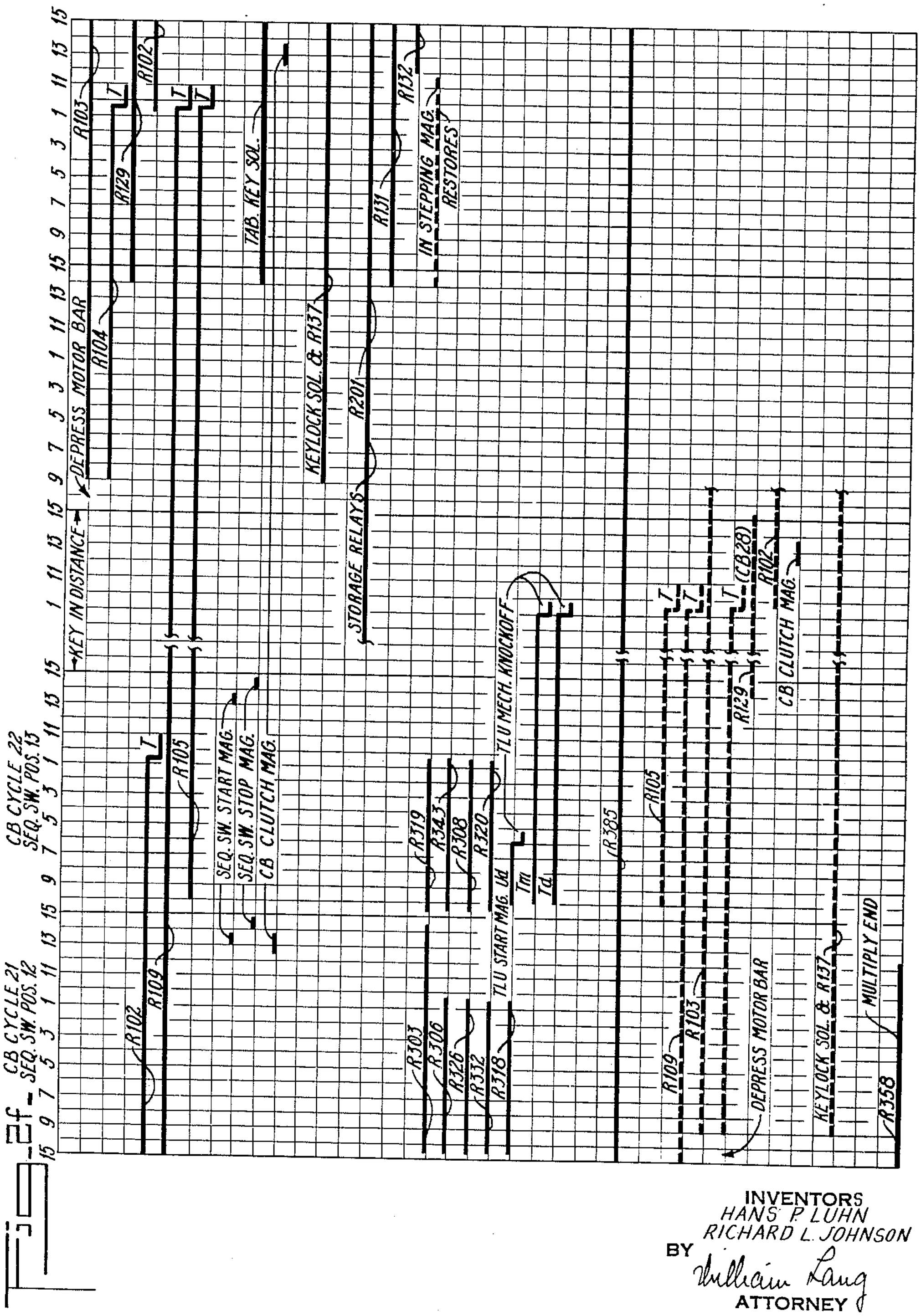
Figure 29:
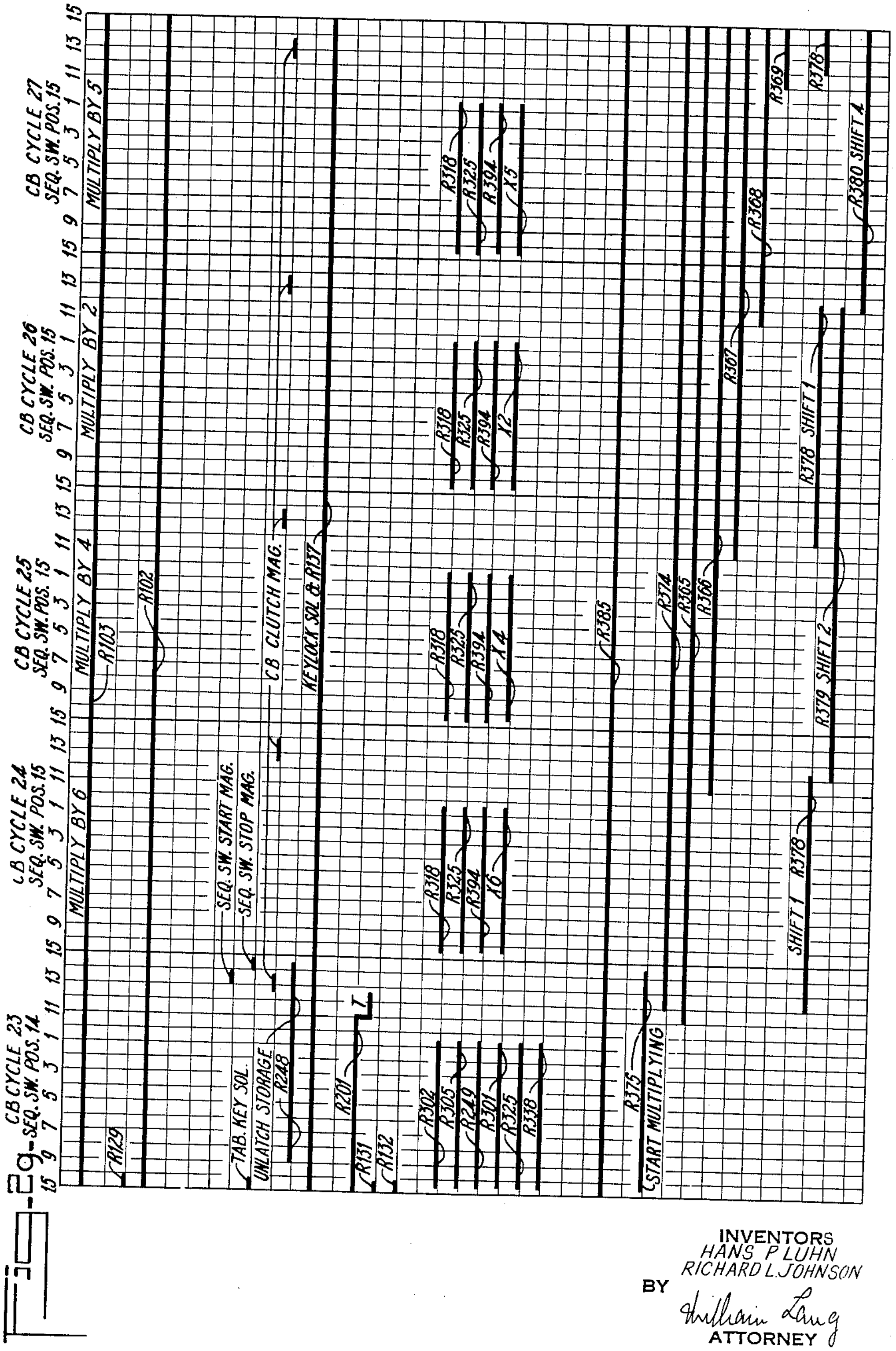

The operations during cycle 11 are similar to those explained for cycle 7, that is, multiplication takes place under control of the highest order significant digit set in the MP accumulator, which in this case is 8, and partial products are formed and entered as complements into the LH and RH accumulators as indicated in Fig. 23*b* under control of the relays indicated as energized in Fig. 2*d*. During the succeeding cycles 12, 13 and 14, sequence switch stepping is suspended and multiplying takes place by the next three succeeding digits of the multiplier, namely, 3, 8 and 3, with the appropriate column shift and complementary entry of the LH and RH components, so that at the end of cycle 14 the LH and RH accumulators contain the values represented on the line following that for cycle 14. The controlling relays are indicated in Fig. 2*d*, from which it is seen that R367, R368, R369 and R370 pick up in succession, so that R358 will become energized near the end of cycle 14 to terminate multiplying operations and unlatch the shift control relays.

*CB cycle 15*

In this cycle there is a transfer from the RH to the LH accumulator and accompanying reset of the RH accumulator to 9 in a manner as explained for cycle 9. During this cycle also, the MC accumulator is reset but the entry in the MP accumulator is retained. Accordingly, the LH accumulator now contains the complement of the product of 8383×716 which, when added to the complement of the cosine standing in the right hand section of accumulator FS, will produce the complement of the cosine of 14°18′23″.

During cycle 15, the U*d* part of the table lookup switch is advanced ten steps or positions from its initial selected position, and in such new position the wiring to the individual segments is in accordance with the sine of the angle and the related difference. This is indicated in Figs. 1*q* and 1*r* where, for example, and as explained the cosine 969588 and difference 716 in the 71 to 80 group of levels initially selected are found in position 4 (Fig. 1*q*) and in position 14 (ten steps higher, Fig. 1*r*) the sine 244743 and corresponding difference 2820 are located. Inspection will show that this is carried out for all other angles, that is, the cosine is found in positions 0 to 9 and the corresponding sines are found in positions 10 to 19, respectively.

The manner in which the U*d* switches are advanced an increment of ten steps is as follows. With the sequence switch in position 9, during cycle 15 a circuit extends from line 200, through contacts CB5*a* timed to close one point before the 9 time in the cycle, the common conductor 160 in level 23, wiper 161 in position 9, to the start magnet 129 of U*d* to commence rotation of the related wipers. At the 0 time in the cycle a circuit extends from line 200, through contacts CB26, through the conductor 160 at level 27, wiper 161 in the 9 position, to the stop magnet 133 of the selector switch to interrupt advance after ten steps.

*CB cycle 16*

During this cycle the sequence switch will be in its 10 position and will prepare circuits for the transfer of a significant part of the value in the LH accumulator to the right hand section in the FS accumulator. As indicated in Fig. 23*b* along the line labeled "sixteenth cycle" the transfer from the LH accumulator is made only from orders 5 to 10 and the transfer is inverted for algebraic summation with the amount standing in the right hand section of the FS accumulator, which it will be recalled is in the form of a complement, so that the net result will be a negative value of the complete cosine.

In Fig. 1*b*, a circuit is completed from line 200, through contacts CB16, the *e* contacts of R119, wire 224 (Fig. 1*a*), *j* contacts of R106, wire 247 (Fig. 1*s*), common conductor 160 at level 15, wiper 161 in the 10 position to relay R310. A parallel circuit from the common conductor 160 at level 19 will also energize relay R342 (see also Fig. 2*e*). With these two relays energized, an inverted transfer is effective from the impulse emitting wires 227, *b* contacts of R241 (Fig. 1*j*), through the segments 31, brushes 30 and conductors 32 of the readout device of the LH accumulator, the 5 to 10 wires 300 (Fig. 1*u*), *a* contacts of R342 (shifted), wire 309 (Fig. 1*t*), *a* contacts of R310 (shifted), *a* contacts of R311, *a* contacts of R312, start magnets 25 of the right hand sections of the FS accumulator to initiate their rotation at times corresponding to the true value of the amount transferred.

With the sequence switch in its tenth position, a circuit is completed from the common conductor in level 16 (Fig. 1*s*), through the brush in the 10 position to energize R305. From the common conductors in levels 21 and 22, parallel circuits will extend to the wipers in position 10 to energize relays R336, R244 and R337. Throught the conductor in level 20 relay R308 is also energized. With these relays energized, circuits are conditioned so that the sine of the angle 14°10′ is now transferred through circuits similar to those traced for the cosine, which extend from the impulse wires 227*a* (Fig. 1*r*) to the individual segments 114 in position 14 of the U*d* switch, thence through wipers 112, common conductors 115 in levels 71—80, cable 304*b* (Figs. 1*q* and 1*p*) to the 1 set of switches in the T*m* section and from there through cable 303 to the individual segments of the 1 position in the T*d* switches.

From here the circuits extend through the six left hand orders, through the *a* contacts of R336 (shifted), *a* contacts of R337 (shifted), wires 311 (Fig. 1*t*), *b* contacts of R308 (shifted), to the stop magnets 25 in the left hand section of the FS accumulator, thereby entering therein the complement of the sine 14°10′. Concurrently, the circuit from the four right hand orders of the T*d* section extend through the *b* contacts of R336 (Fig. 1*p*), wires 308 (Fig. 1*n*), *a* contacts of R305 (shifted), *a* contacts of R306 to the start magnets 25 of the MC accumulator, to enter therein the difference 2820 in true form.

During this cycle also there is a rounding off entry of 5 into the fourth order of the RH accumulator. This entry is made in the form of a 9's complement in the same manner and through substantially the same circuits as explained in connection with the fifth cycle, the difference lying in the fact that the initiating circuits are controlled through the sequence switch wipers standing in position 10, through which the controlling relay R325 is energized.

In the same manner also, as explained for cycle 6, relay R319 is energized to effect resetting of the LH accumulator to nines in all orders.

*CB cycles 17 to 20*

When the sequence switch is now advanced to its eleventh position, a series of multiplying cycles for multiplying by 8383 as before is initiated in the same manner as for cycles 11 to 14, and components of partial products will be entered as indicated in Fig. 23*b* under control of the multiplier 8383 and the multiplicand 2820 so that, after cycle 20, the LH and RH accumulators will contain the sums of their respective partial products in complementary form as indicated on the line following cycle 20 (Fig. 23*b*).

*CB cycle 21*

Figure 23C:
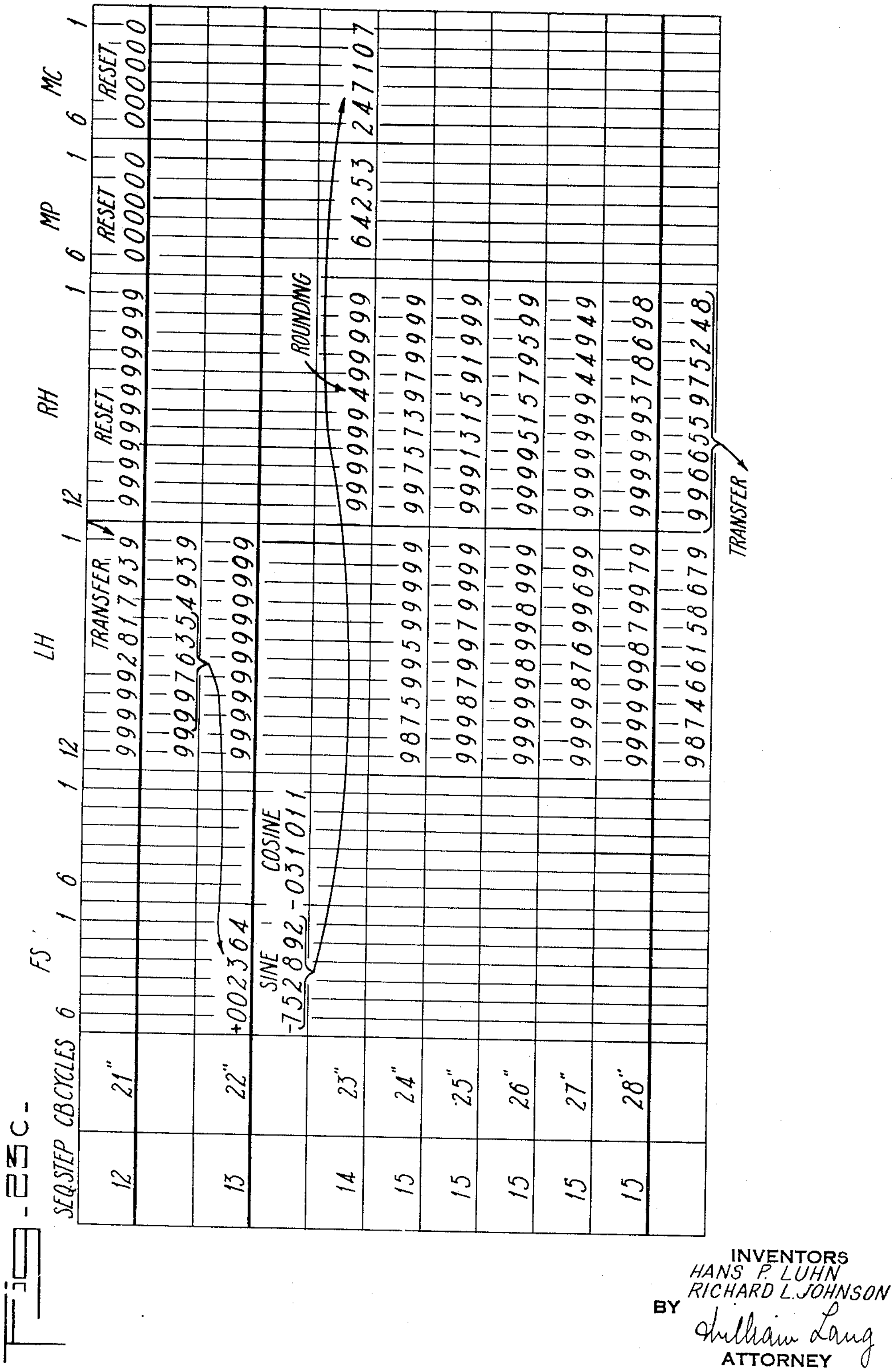

Upon advance of the sequence switch to its 12 position, cycle 21 will ensue and will bring about the transfer of the RH amount to the LH accumulator and re-entry of the amount into the RH accumulator to effect resetting of the same to 9's (see Fig. 23*c*). Also during the cycle, the MP and MC accumulators are reset to zero. The circuits involved are substantially as have already been explained so they will not be repeated at this time. The particular relays involved are set forth in sequence chart (Fig. 2*f*) to facilitate an understanding of the operation.

*CB cycle 22*

During this cycle the sequence switch is in its 13th position and a portion of the product in the LH accumulator is transferred to the left hand section of the FS accumulator for algebraic summation with the previously entered sine. This transfer operation is similar to the one explained for cycle 16. Inspection of the sequence chart (Fig. 2*f*) will show that for this cycle relays R319, R308 and R343 are energized to direct impulses from the emitter lines 227 through the readout of the LH accumulator to the entering magnets 25 of the left hand section of the FS accumulator through familiar circuit paths. The transferred entry is also made back into the LH accumulator to effect resetting to 9. Accordingly, at the end of cycle 22, the MP and MC accumulators will have been reset to 0, the LH and RH accumulators will have been reset to 9's, the right hand section of the FS accumulator will contain the cosine of 14°18′23″ the left hand section of the accumulator will contain the sine of this angle and the X and Y accumulators will contain the initial ordinate values.

During this cycle the table lookup device is reset to 0, i. e., the brushes or wipers in the various levels will be advanced to their 0 position, and for the example chosen the T*d* and T*n* sets of wipers 112 are to be advanced from 1 to the 0 position through nineteen steps, while the U*d* set will advance from the 14 position to 0, a distance of six steps. This is brought about as follows. With the sequence switch in its 13 position, there is a circuit to the common conductor 160 (Fig. 1*s*) in level 21 from contacts CB16 as before, wiper 161 in position 13, to relay R320. Thus, when contacts CB5*a* close, a circuit will be completed from line 200, contacts CB5*a*, wire 312 and through the *a* contacts of R320 to energize the start magnets 129 of the U*d*, T*m* and T*d* switches and the related wipers 112 will begin to advance and continue until there is a mechanical knockout when the brushes arrive at their home position (see Fig. 17).

At the beginning of this cycle, circuits are set up to interrupt the repeat energization of the CB magnet, so that at the end of the cycle operation of the CB contacts will cease. The circuits involved extend from line 200 (Fig. 1*s*) through contacts CB5*a*, common conductor 160 of the sequence switch at level 23, wire 313 (Fig. 1*a*) to relay R105, which will shift and latch its associated contacts. Through the shifted *a* contacts of this relay a circuit is completed from contacts C3, wire 236, *a* contacts of R105 and wire 237 (Fig. 1*b*) to the trip winding T of relay R102, so that the related *a* contacts now open to prevent completion of further circuits to the CB clutch magnet.

At this point in the operation automatic operations are suspended to permit the operator to type the distance 64253 on the record (see Fig. 20). It should be noted that the machine is arranged so that this value of the distance may be typed during the occurrence of the foregoing calculating operations and, if such typing is completed prior to the end of cycle 22, the machine will proceed automatically with further computations. For purposes of the present explanation, it will be assumed that the operator delayed the typing of the distance until the aforedescribed calculations and operations were completed, and the manner in which such typing is effected will now be explained.

The typewriter carriage will be in a position to receive typing one space to the left of the 6 in the distance field. The keys of the auxiliary board are then operated in the order 0, 6, 4, 2, 5, 3. With the 0 key causing a space operation in the same manner as explained in connection with the entry of the initial Y and X coordinates, the significant digit entry will be made in the storage relays R201 in orders 9 to 4 inclusive through familiar circuits which involve the connections through the several levels of the I*n* stepping switch.

It will be recalled that, as each key is operated, the entry is first made into the storage relays and then through the contacts thereof a circuit is completed to the appropriate typewriter key solenoid, so that by observation the operator can verfy the entry made in the storage device. When the last digit has been keyed, the carriage will have advanced one space to the right of the typing entry, in which position it will close the contacts TAB2. The I*n* stepping switch will at that time have its brushes 108 in their 7 position.

The motor bar 82 is now operated to close its contacts 208 (Fig. 1*a*) and completes a circuit from line 200, contacts C4*a*, contacts 208, TAB2, wire 314 (Figs. 1*b* and 1*c*), segment 109 in the I*n* stepping switch, level 7, brush 108 and common conductor 110, wire 212 (Figs. 1*b* and 1*d*), *a* contacts of R109 (shifted), wire 315 to the pickup windings P of relays R103 and R104.

This circuit also branches at the *a* contacts of R109 (Fig. 1*a*), through the *b* contacts of R109 (shifted), wire 218 (Fig. 1*b*) to energize the relay R137, whose *c* contacts will then as before energize the keylock solenoid.

Near the end of the cycle (see Fig. 2*f*), when contacts C9 close, the relay R129 is energized through a circuit traceable from line 200, contacts C9 (Fig. 1*a*), wire 316, *f* contacts of R105 (shifted), *a* contacts of R104 (shifted), wire 214 (Fig. 1*b*), *m* contacts of R120, wire 215, *a* contacts of R100, and winding P of relay R129. This is the start relay which, as before, will hold through its *a* contacts and the *c* contacts of R100 and contacts CB28.

As before, relay R102 will be energized through the *c* contacts of R129 (when contacts C3 close in the following cycle) and latched so that the CB clutch magnet may be energized through the *a* contacts thereof.

Concurrently with the energization of R129, relay R131 is also energized through a circuit traceable from line 200, contacts CB28*a* (which are normally closed with the CB contacts at rest, Fig. 1*b*), *a* contacts of R129 (shifted), wire 317, *i* contacts of R120, wire 222 (Fig. 1*a*), *e* contacts of R103 (shifted, *c* contacts of R104 (shifted), wire 223 (Figs. 1*b* and 1*c*), pickup winding P of relay R131 to ground.

This, as explained for the very first cycle, will initiate stepping of the In stepping switch from its 7 ahead to its initial 1 position as before, where relay R132 will be energized as before, and as indicated in Fig. 2f.

Relays R104 and R105 are now unlatched through a circuit traceable from line 200, contacts C3 (Fig. 1a), wire 216 (Fig. 1b), c contacts of R129 (shifted), wire 217 (Fig. 1a), and wire 241 to the T windings of R104 and R105 to ground. This circuit branches from wire 241 through the h contacts of R103 (shifted) and wire 318 to the T winding of R109 to unlatch this relay.

In the foregoing, it was assumed that keying of the distance would be deferred until the computing mechanism had come to rest. However, the operator may perform the keying while computing is in progress. This will effect energization of certain relays whose duration of operation is indicated in dotted lines at the bottom of Fig. 2f. Thus, it is indicated that the motor bar may be depressed some time, for example, as at the beginning of CB cycle 21, after the distance has been keyed in. At this time, however, it is to be noted that relay R105 is not energized so that the effect of the motor bar depression will be to pick up relays R103 and R104 as before.

From the earlier explanation it will be recalled that relay R129 cannot be energized until R103, R104 and R105 are all energized. Accordingly, under the present assumption relay R129 will not be picked up. In the following cycle 22, relay R105 is energized as before due to the completion of the computing operations, so that near the end of CB cycle 22 conditions are present for the completion of circuits through R129, and it will be energized as indicated. This is the so-called start relay which will initiate subsequent operations, so that at the end of cycle 22 the next following cycle will correspond to the machine cycle represented in the right hand section of Fig. 2f, that is, the machine cycle just preceding CB cycle 23, and the operations explained in connection with such cycle will not take place.

Briefly, then, the keying in of the distance may take place during cycles occurring at any time after the previous entry of the azimuth value has been made, that is, any time after cycle 4 (Fig. 2b). Upon completion of this keying the motor bar may be depressed to pick up relays R103 and R104, and further events will await the next energization of R105 which will not occur until CB cycle 22.

*CB cycle 23*

The contacts controlled by the CB clutch magnet will now effect a cycle of operations designated on the sequence chart (Fig. 2g) as CB cycle 23. During this cycle the distance is transferred from the key storage device to the MP accumulator and concurrently the appropriate function, i. e., the sine, is transferred from the FS accumulator to the MC accumulator and inverted. Selection of whether the sine or cosine is to be transferred is determined by the group of sign controlled relays R385 to R391 (Fig. 1k) which ascertain in what octant the angle lies and accordingly determine whether the sine or cosine is utilized in determining the Y ordinate, which is to be computed first.

Referring to Fig. 2b, it will be recalled that for the angle under consideration relay R385 was energized in CB cycle 4 to indicate that the angle lay in the second octant, and from Fig. 21 it will be seen that the Y ordinate will result from multiplying the sine of the angle times the distance.

With relay R385 in energized condition, the circuit is completed from the sequence switch (whose wipers 161, Fig. 1s, are now in position 14) which is traceable from line 200 to the common conductor at level 22, as before, wiper 161 in position 14, connection 319 (Fig. 1k) to the b contacts of R391, thence in series through the b contacts of R389, R387, to b contacts of R385 (shifted), relay R338, to ground.

As indicated on the sequence diagram (Fig. 2g) and through familiar circuits traceable through wipers 161 of the sequence switch in position 14, relays R302, R305, R249, R301, R325 and R375 will also be energized.

*Transfer sine to accumulator MC.*—Through the contacts of these relays a transfer is made through the left hand section of the FS accumulator to the MP accumulator, for which the circuit for the lowest order digit is specifically traceable as follows. It will be noted that the sine stands in the FS accumulator (Fig. 23c) in the form of a complement and the transfer will be inverted to enter the true value into the MC accumulator. At the 7 time in the cycle a circuit is traceable from the 7 wire 227 (Fig. 1j), b contacts of R241, 2 wire 320 (Fig. 1u), the individual segments 31 in the 2 position of the left hand section of the FS readout device, the brush 30 in the 1 order, common conductor 32 to the right hand a contacts of R338 (shifted), wire 321 (Fig. 1n), right hand a contacts of R305 (shifted), right hand a contacts of R306 to the start magnet 25 in the units order of the MC accumulator. Similar circuits will enter the higher order digits into this accumulator.

*Transfer distance to accumulator MP.*—Concurrently, the entry of the distance is made into the MP accumulator, and the circuits for the units order entry is traceable as follows. At the 3 time in the cycle the circuit extends from the 3 wire 227 (Fig. 1d), 3 wire 228, a contacts of R249 (shifted), 3 wire 204, b contacts of the 1 magnet R201 in order 4 (shifted), a contacts of the 2 magnet R201 (shifted), a contacts of the 4 magnet R201 and a contacts of the 7 magnet R201, 6 wire 203 (Figs. 1e and 1f), 4 wire 229, left hand wire 322 (Fig. 1n), a contacts of R301 (shifted) farthest to the right (shifted), right hand a contacts of R302 (shifted), a contacts of R303 to the start magnet 25 in the units order of the MP accumulator. Similar parallel circuits are traceable at different times in the cycle through the remaining orders to enter the complete distance.

*Rounding circuit.*—In the RH accumulator, there is again a rounding entry of 5 made in the 6 order of the accumulator. This entry had been made in a previous cycle (16) in the 4 order and the shift at this time is effected as follows. This shifted entry is under control of the sequence switch which through a wiper 161 at level 25 in position 14 (Fig. 1s) completes a circuit at the 5 time in the cycle through wire 323 (Fig. 1g) to the stop magnet 25 in the sixth order of the RH accumulator. It may be pointed out that as before, the start magnets 25 are all given an impulse at the 9 time to commence their rotation so this 5 impulse will advance this wheel four steps.

*CB cycles 24 to 28*

Under control of the sequence switch, the relay R375 is again energized to signal the beginning of multiplying operations, and in the manner already explained the cycle control and column shift relays will be energized in accordance with the multiplier readout setting in the MP accumulator. The particular relays so energized are indicated in the sequence diagram (Fig. 2g) and under their control the subsequent multiplying cycles 24 to 28 will take place, during which partial products will be entered into the LH and RH accumulators in the now familiar manner with the particular values being entered as set forth in Fig. 23c.

*CB cycle 29*

During this cycle there is the usual transfer of the sum of the RH components to the LH accumulator to obtain therein the complete product in the form of a complement with the transferring circuits branching back from the RH accumulator to effect resetting thereof to 9's. Also during this cycle with the sequence switch in its 16 position, the MC accumulator is reset to zero by transferring the entry therein back into its start magnets in the form of a tens complement for the separate digits.

The circuits involved are similar to that traced in connection with the ninth cycle.

The computing mechanism will now come to a halt and typing of the computed Y value will be effected into the latitude field of the traverse sheet (Fig. 20) from the sixth highest order positions of the LH accumulator with inversion of the complementary value standing therein.

Interruption of computing is effected through the sequence switch which, in the manner explained in the connection with the 13 position, will cause energization of relay R105 whose function is to interrupt the circuit to the CB clutch magnet. Near the end of the cycle (see Fig. 2*h*), the sequence switch start magnet is energized to advance the switch to its 17 position.

*Typing of the computed latitude*

With the sequence switch now advanced to its 17 position, relay R243 is energized through the circuit from line 200, contacts CB28 (Fig. 1*s*), conductor 160 at level 29, wiper 161 in position 17, and relay R243 to ground. A circuit is now completed when contacts C9 close (Fig. 1*a*) traceable through these contacts, *c* contacts of R103 (shifted), *b* contacts of R104, *c* contacts of R105 (shifted), wire 325 (Figs. 1*b* and 1*c*), *a* contacts of R135 and relay R133 to ground. R133 closes its *a* contacts setting up a holding circuit through the *a* contacts R134, *b* contacts of R132, *b* contacts of R141 and wire 202 to line 200. The closure of the *d* contacts R133 energizes relay R241 through wire 202, and this relay will remain energized until R133 is deenergized.

A circuit is now completed through the *b* contacts of R133, traceable from line 200 (Fig. 1*b*) through escapement contacts 69, wire 201 (Fig. 1*c*), *b* contacts of R130, *b* contacts of R133, stepping magnet Out to ground to prepare the Out stepping switch wipers for advance to their 2 position when the magnet is deenergized.

*Sign typing circuit.*—The first circuit now to be completed will cause the printing of the plus sign (see Fig. 20) in the latitude column, and this is brought about through the following circuit: from line 200 (Fig. 1*c*) to *c* contacts of R133 (through wire 202), *b* contacts of the Out stepping magnet, wire 326 (Fig. 1*h*), *a* contacts of R243 (now shifted), common conductor 110 of the Out stepping switch in level 1, its wiper 108 in the 1 position, thence through wire 327 (Fig. 1*s*) to the common conductor 160 of the sequence switch at level 28, wiper 161 at position 17, wire 328 (Fig. 1*k*), *d* contacts of R390, *d* contacts of R386, wire 329 (Fig. 1*d*), solenoid 53 related to the symbol +, and ground. This will operate the type bar to print such symbol. It may be recalled that the group of relays R385 to R391 (Fig. 1*k*), which have been energized in accordance with the octant in which the angle under consideration lies, determines whether this initial circuit extends through the plus solenoid 53 or the minus solenoid 53.

Briefly, if the angle lies in the first, second, seventh or eighth octant, the sign of the latitude is plus, and if it lies in the other octants the sign is negative as evidenced from inspection of Fig. 21 with the circuit extending through which 330 (Figs. 1*k* and 1*d*) to the minus solenoid 53.

In typing the latitude only, the six highest positions of the LH accumulator are read out as this carries the computation to the desired degree of accuracy. Coincident with the typing of the plus symbol, the escapement contacts 69 open to deenergize the Out stepping magnet, permitting its wipers 108 to advance to their 2 position, and thereafter the Out magnet will be reenergized in the same manner as explained when initial typing operations were performed, that is, reclosure of contacts 69 will reenergize the Out magnet.

Accordingly, upon reclosure of the *b* contacts of the Out magnet, a circuit is completed therethrough from line 200 (Fig. 1*c*), wire 202, through the *c* contacts of R133, *b* contacts of the Out magnet, wire 326 (Fig. 1*h*), *a* contacts of R243 (shifted), Out stepping switch at level 1, wiper 108 now in position 2, upper wire of group 331 (Fig. 1*u*), bottom wire 300 (Fig. 1*j*) to the readout conductor 32 of the LH accumulator in the highest order to the readout brush 30 set at "9," 9 wire 320, lowermost *b* contacts of R241 (shifted), wire 332 (Fig. 1*d*), *b* contacts of R250 in their normal position and space solenoid 53 to ground, thereby effecting a space operation as before accompanied by the momentary deenergization of the Out stepping magnet, so that its brushes advance to their 3 position in which a circuit similar to that traced now extends through the 3 wiper 108 (Fig. 1*h*) of the Out stepping switch in level 1, to the readout device of the LH accumulator in the next to the highest order (Fig. 1*j*), wherein the brush 30 is set at 8, so that the circuit extends through the brush 8, wire 320, *b* contacts of R241 (shifted), 1 wire of group 333 (Fig. 1*d*) to the 1 solenoid 53 and to ground, causing typing of the first digit of the latitude 15877.

The remaining typing circuits will extend through similar paths with the Out stepping switch advancing to successively complete the several circuits through level 1 (Fig. 1*h*). Following the typing of the last digit, the Out stepping switch advances to its 8 position, and circuits are now completed to rapidly advance the switch to its initial or home position.

It may be mentioned at this point that, when the Out stepping switch advances to its 2 position, a circuit was completed therethrough from line 200 (Fig. 1*c*) to the common conductor 110 at level 8, wiper 108 in the 2 position and wire 334 to relay R135, which will open its *a* contacts to prevent a later energization of relay R133 so that, when after the completion of typing the holding circuit for R133 is broken, the pickup circuit cannot be completed until R135 is again deenergized.

It will be noted in Fig. 1*c* that the circuit arrangement is such that this relay R135 will be energized when the Out stepping switch has its wiper at level 8 in any position subsequent to the 1 position.

Now with the stepping switch brushes in their 8 position, the circuit is completed and traceable from line 200 (Fig. 1*h*), wire 335, common conductor 110 at level 7, wiper 108 in the 8 position, *c* contacts of R243 (shifted), wire 336 (Fig. 1*c*) and relay R134 to ground. This relay opens its *a* contacts to interrupt the holding circuit of relay R133 so that no further circuits extend through the *c* contacts of R133 and *b* contacts of the Out magnet. The opening of the *d* contacts of R133 will also deenergize R241.

The typing of the last digit of the latitude was accompanied by escapement to the next position wherein contacts TAB3 close. Now with the Out stepping switch in its 8 position, a circuit is traceable from line 200 (Fig. 1*a*), contacts C2, wire 221 (Fig. 1*b* and back to Fig. 1*a*), *b* contacts of R105 (shifted), wire 337 (Fig. 1*b*), *b* contacts of R137 (shifted), wire 338 (Fig. 1*a*), *d* contacts of R107, wire 339, *b* contacts of R103 (shifted), wire 340, contacts TAB3, wire 244 (Fig. 1*b*), wire 245 (Fig. 1*c*), the segment 109 in the 8 position of the Out stepping switch in level 6, wiper 108, common conductor 110, wire 212 (Figs. 1*b* and 1*a*), *a* contacts of R109, wire 213, *g* contacts of R105 (shifted), wire 214 (Fig. 1*b*), *m* contacts of R120, wire 215, *a* contacts of R100, and relay R129 to ground. This is the so-called Start relay which will initiate the next series of computing operations. As before, the closure of the *b* contacts of R129 will cause energization of the TAB solenoid 53 to advance the carriage to the position in which the algebraic symbol for departure will be typed later.

A circuit is now completed from line 200, through contacts CB28*a*, *a* contacts of R129 (shifted), wire 317, *i* contacts of R120, wire 222 (Fig. 1*a*), *f* contacts of R103 (shifted), *c* contacts of R104, wire 341 (Figs. 1*b* and 1*c*), and relay R130 to ground. A holding circuit extends through the *a* contacts of this relay and the *a* contacts of R141 maintain it energized until R141 is energized.

The Out stepping magnet is now repeatedly energized through a circuit from line 200 (Fig. 1*c*), through common conductor 110 at level 8, the wiper 108 in position 8, wire 342, *b* contacts of R130 (now closed), *a* contacts of the Out magnet and thence through the magnet to ground. The energization of the Out magnet will step the switch and momentarily opens its *b* contacts, so that with the switch now in the 9 position the circuit will be repeated and continued through successive positions until the switch is back in its 1 position, where it will remain until further typing operations are called for.

Figure 2H:
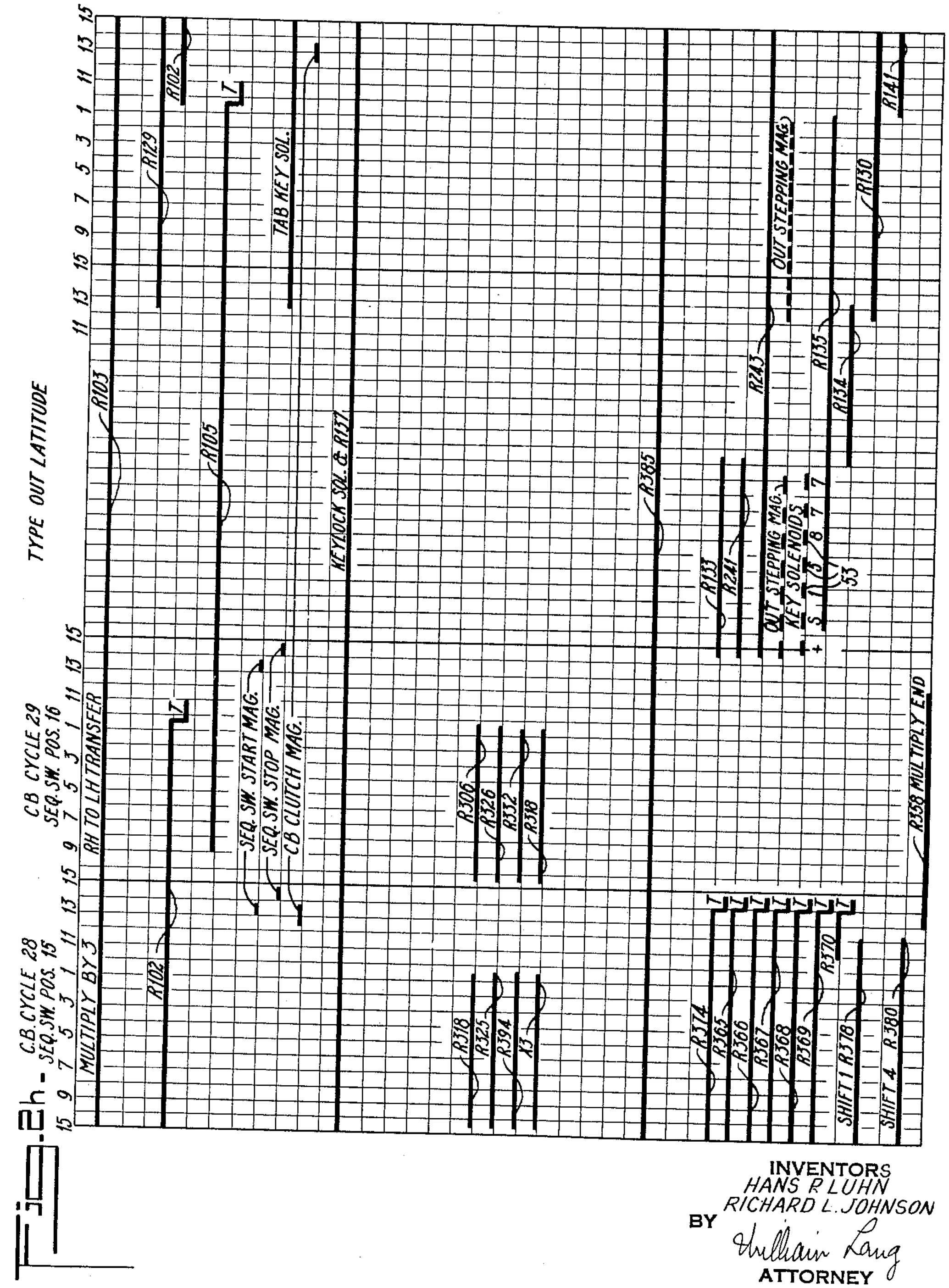

When it returns to the 1 position, there is a circuit extending from the common conductor 110 in level 8 to the wiper 108 in the 1 position, wire 343, *c* contacts of R130, and relay R141 to ground, opening the holding circuit for R130 (see also Fig. 2*h*). As noted also in this diagram, the trip winding of R105 is energized, R102 is energized and the CB clutch magnet is also energized through circuits similar to ones previously traced.

*CB cycle 30*

During this cycle, the entry in the six highest positions of the LH accumulator (complement 984122) are transferred to the Y accumulator for algebraic summation with the initial entry therein (complement 899999). With this transfer the magnets 25 in the Y accumulator all receive a start impulse at the 9 time in the cycle and will be energized under control of the setting in the LH accumulator, and tracing a specific circuit for one order will suffice to explain the operation.

*Transfer LH to Y.*—In preparation for the transfer, relays R344 and R323 are energized. Under control of the sequence switch with its wipers 161 set at 17, the energizing circuits are traceable from the common conductor in level 19 (Fig. 1*s*), wiper 108 in position 17, directly to relay R344. A further circuit extends from the common conductor in level 20, wiper 161, wire 344 (Fig. 1*k*), *c* contacts of R390 (normal), *c* contacts of R386 to relay R323 to determine if, in accordance with the setting of the sign control relays R385 to R391, the value in the LH accumulator is to be in effect added to the initial Y value. The initial start impulse is sent to all orders of the accumulator Y (Fig. 1*g*), through the circuit from the 9 impulse wire 227, wire 226, *a* contacts of R323 (shifted), *a* contacts of R324, to all the start magnets 25 to commence their rotation at the 9 time in the cycle.

Tracing the stop circuit, at the 7 time in the cycle for a specific order, that is, order 7 of the LH accumulator, in which the setting is 2, this circuit extends from 7 wire 227 (Fig. 1*j*), *b* contacts of R241, 7 wire 320, brush 30 set at 2 in order 7, 7 wire 300 (Fig. 1*u*), right hand *c* contacts of R344 (shifted), wire of group 345 (Fig. 1*g*), *b* contacts of R323 in the units order (shifted), to the corresponding stop magnet 25 to ground to stop the adding wheel in this order after two steps of advance. The remainder of the number is transferred through similar parallel circuits.

*Reset LH.*—At the same time that the transfer from the LH accumulator to the Y accumulators occurs, the former will be reset to 9's in the usual manner and as a preliminary relay R319 is energized through the sequence switch which at level 18 (Fig. 1*s*) will complete a circuit from the common conductor 160 and the wiper 108 set in position 17 directly to relay R319. This relay will close its *a* contacts in Fig. 1*i* to direct the reset circuits from the readout of the LH accumulator back to its start magnets 25 in the same manner as explained in connection with cycle 22.

During this cycle also, a half entry is effected in the RH accumulator by entering a 5 in order 6 in the same manner as explained in connection with cycle 23, through initial energization of R325 to energize the start magnets 25 at the 9 time, the difference being that, whereas in the former cycle the control circuits were picked up by the stepping switch (level 25) at step 14 (Fig. 1*s*) and directed through wire 323 (Fig. 1*g*) to the stop magnet 25 in column 6 of accumulator RH, and at the present time these circuits are effected with the sequence switch in its 17 position.

*Transfer FS to MC.*—Also during this cycle the cosine value standing in the right hand section of the FS accumulator is transferred to the MC accumulator, wherein it is entered in its true form as 968988. This requires the preparatory energization of R305 and R339. The circuit for energizing R305 and R375 in parallel therewith (Fig. 1*s*) is the same as already traced in connection with cycle 23. The circuit for energizing relay R339 extends from the sequence switch in level 22, wiper 161 in position 17, wire 347 (Fig. 1*k*), *c* contacts of R391, *c* contacts of R389 and R387, *c* contacts of R385 (shifted), to relay R339. With these two relays energized, the entering circuit for transferring from the right hand section of the FS accumulator to the MC accumulator is traceable in the units order, for example, as follows. In this order an 8 is to be entered under control of the setting of 1 in the FS accumulator and the circut extends at the 8 time in the cycle from the 8 impulse wire 227 (Fig. 1*j*), *b* contacts of R241, 1 wire 320 (Fig. 1*u*), to the readout brush 30 in the units order of the right hand section of accumulator FS, a pair of *a* contacts of R339 (shifted) in the units order, 1 wire 321 (Fig. 1*n*), *a* contacts of R305 (shifted), *a* contacts of R306 to the start magnet 25 in the units order of the MC accumulator to enter an 8 therein in the now familiar manner.

As before, the relay R375 is energized concurrently with R305 and as explained this relay controls the multiplying operations which will now take place.

*CB cycles 31 to 35*

Figure 2J:
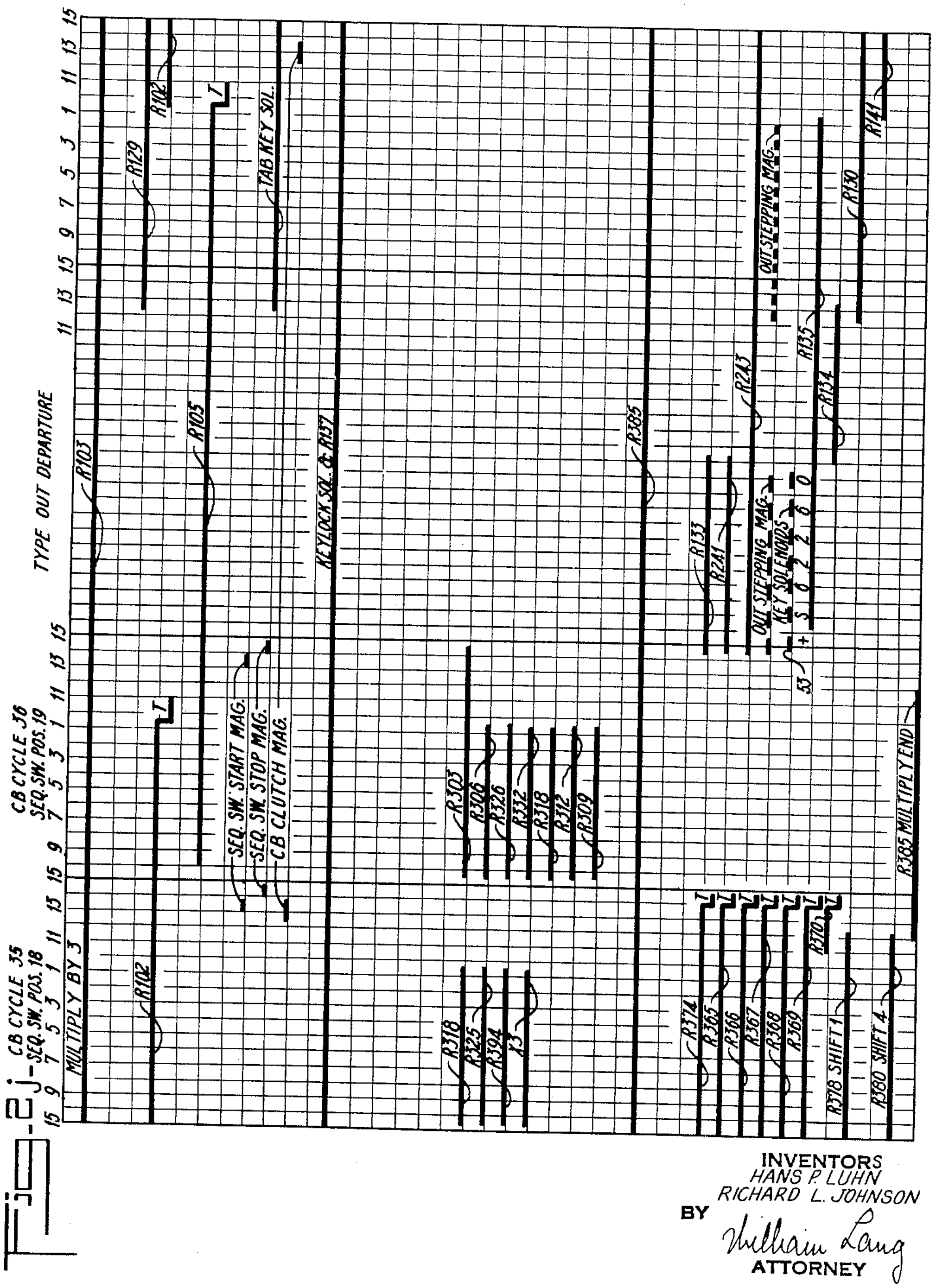
Figure 2K:
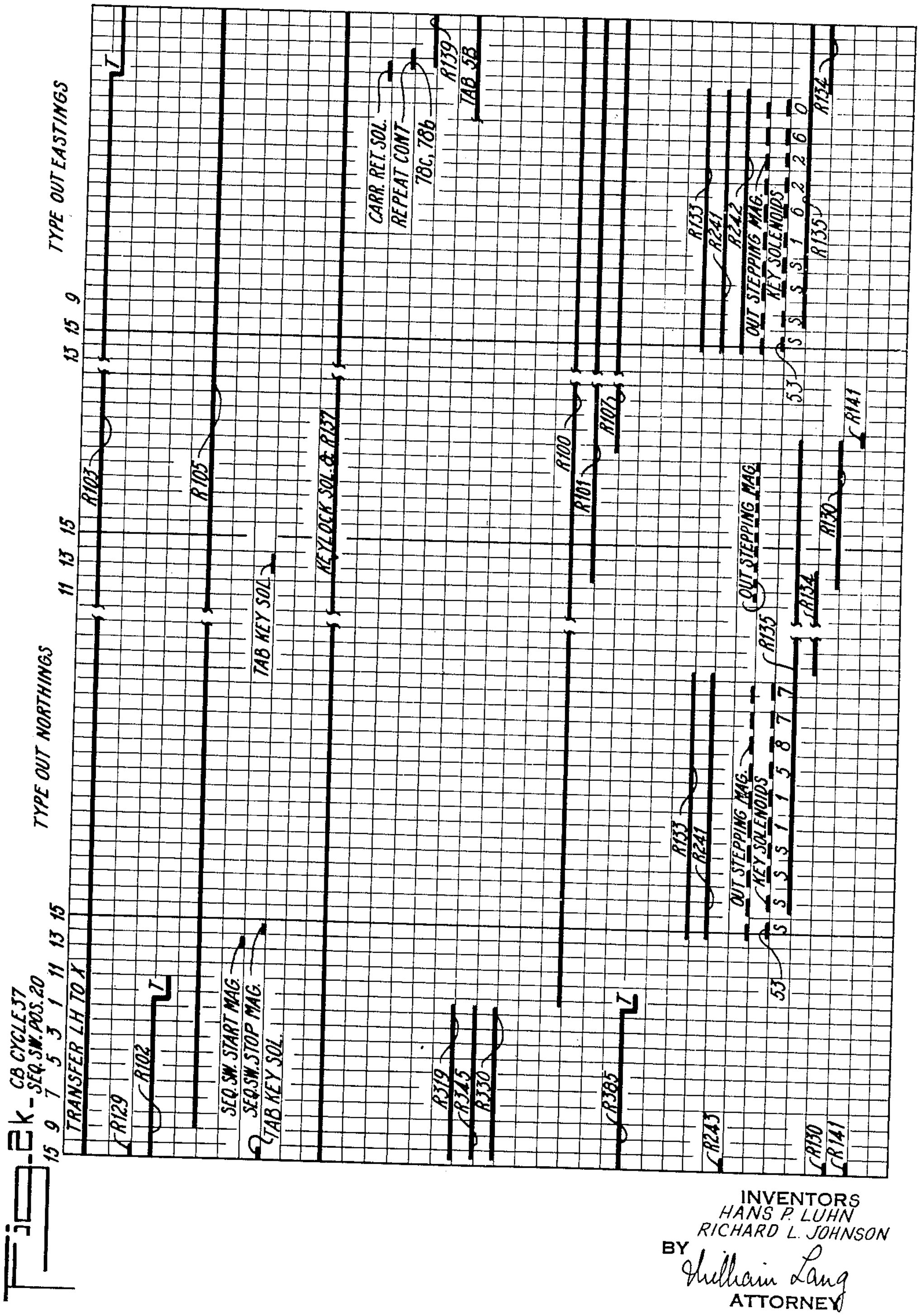
Figure 23D:
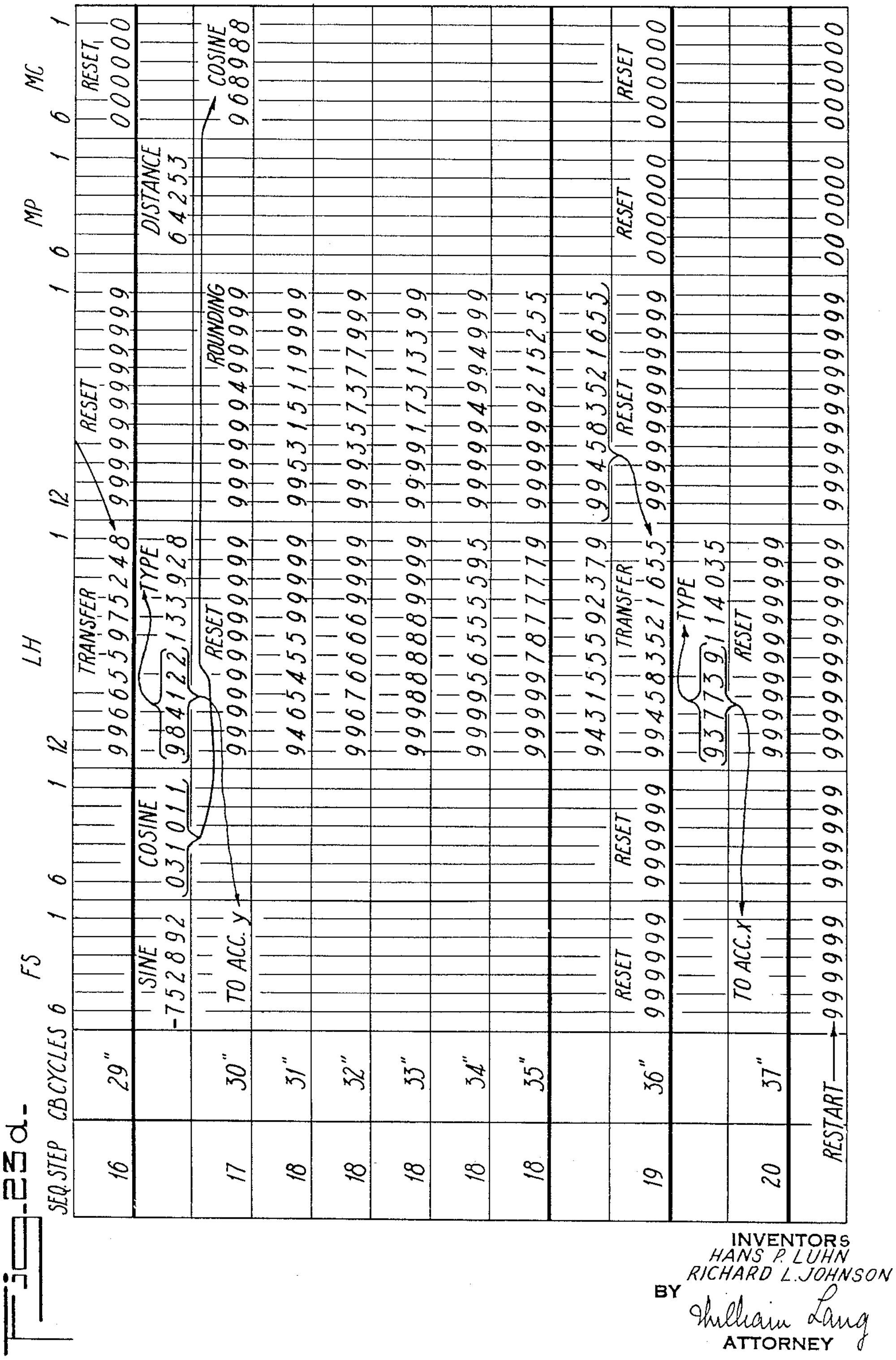

The operation during these cycles follows in the same manner as explained for the operations occurring during cycles 24—28, i. e., the values in the MP and MC accumulators are multiplied to obtain the several LH and RH components and enter them in their respective accumulators as indicated in Fig. 23*d*. The several relays involved are represented in Figs. 2*i* and 2*j*.

*CB cycle 36*

For this cycle the sequence switch will have advanced to its 19 position, and the transfer from the RH to the LH accumulator occurs as indicated and in the same manner as explained for cycle 29 with accompanying reset of the RH accumulator to 9's. Inspection of the sequence stepping switch connections will show that the controlling relays R318, R326 and R332 for effecting this transfer will be energized with the switch in position 19 (see also Fig. 2*j*).

In addition, the MC accumulator was reset to 9's in the same manner as for cycle 29 through energization of R306, and in addition thereto the MP accumulator is also reset through circuits as explained in connection with cycle 21 through energization of R303. The FS accumulator is reset to 9's through circuits as explained in connection with cycle 6, through energization of relays R309 and R312. Through level 23, the relay R105 is also energized and through its *a* contacts the trip winding of R102 is energized as indicated in Fig. 2*j*.

*Typing of the departure value*

The sequence switch is now advanced to position 20, and the complement of the amount standing in the six highest orders of the LH accumulator is to be typed with appropriate sign in a manner similar to operations effected with sequence switch standing in its 17 position. The sign printing circuit in this case is traceable from the common conductor of the sequence switch in level 28 (Fig. 1*s*), wiper 161 in position 20, wire 348 (Fig. 1*k*), *d* contacts of R388, wire 329 (Fig. 1*d*) to the plus solenoid 53, through circuit connections the same as already traced in connection with previous energization of this plus sign printing solenoid. Through now familiar circuits the true departure value 62260 will be typed in positions indicated on the traverse sheet (Fig. 20) with the successive operations occurring as indicated in Fig. 2*j*. The carriage will then automatically tabulate over the next two columns and various circuits will be brought into operation, as explained in connection with typing of the latitude, to bring the various relays into operation as indicated in the sequence chart at the beginning of the next cycle 37 (Fig. 1*k*).

*CB cycle 37*

In this cycle there is a transfer from the LH accumulator to the X accumulator. For this operation relays R330 and R345 will be energized through the wipers of the sequence switch in position 20 to prepare the transfer circuits through which the amount in the LH accumulator will be transferred over to the X accumulator, as indicated on the line labeled "cycle 37" in Fig. 23*d*. Concurrently with the transfer the LH accumulator is reset to 9's in the now familiar manner under control of relay R319.

During this cycle, relay R105 is again energized through the sequence switch setting (Fig. 1*s*) in its level 23 and wire 313 to Fig. 1*d* to interrupt further energization of the CB clutch magnet by causing energization of the trip winding of R102 and thereby interrupt further CB cycles.

A relay R100 is energized at this time through a circuit from the common conductor 160 of the sequence switch in level 26 (Fig. 1*s*) traceable from line 200, contacts CB26, conductor in level 26, wiper 161 in position 20, wire 350 (Fig. 1*b*) and relay R100 to ground. This latch type relay will accordingly shift and latch its contacts. A further circuit extends from contacts CB26, through the conductor in level 27, wire 351 (Fig. 1*k*) to the trip magnets T of the group R385 to R391 to effect resetting of this group of sign control magnets.

In cycle 37, after the LH to X accumulator transfer has taken place, the sequence switch is advanced one step to its 1 or home position in the normal manner. At this point in the operation, relay R133 is energized as explained in connection with the operations immediately following cycle 30 and in connection with the typing out of the latitude. In the same manner also relay 241 is energized.

The first typing out circuit extending through the highest order (10) in Y accumulator (Fig. 1*g*) now standing at 9999884122 (complement of 115877) will operate only the space solenoid 53, since the digit standing in this order is a 9 and, as previously explained, the true value of 0 is not typed but controls energization of the space magnet until the first true significant digit is read. This circuit is traceable as follows: from line 200 (Fig. 1*c*), wire 202, *c* contacts of R133 (shifted), *b* contacts of magnet Out (shifted), wire 326 (Fig. 1*h*), *a* contacts of R243, *a* contacts of R242, common conductor 110 of the Out stepping switch at level 2, wiper 108 now standing in the 1 position, common conductor 32 in the readout device of accumulator Y in the highest order (10) in which the brush is set at 9, lowermost *a* contacts of R241 (shifted), wire 352 (Fig. 1*d*), *b* contacts of R250 to the space solenoid 53 and ground.

As an incident to this operation, the carriage is spaced, the Out stepping switch advances to its next position (9) where the circuit is repeated through the next lower order of the Y accumulator for three more space operations, and thereafter the significant digit solenoids 115877 are energized in succession through the *a* contacts of R241 and group of wires 353 (Figs. 1*h* and 1*d*) to type the value in the coordinate field.

After the typing of the units digit 7, the typewriter carriage will be in position to close the contacts TAB1 which will energize relay R101, traceable from line 200 (Fig. 1*a*), contacts C2, wire 221 (Figs. 1*b* and 1*a*), *b* contacts of R105 (shifted), wire 337 (Fig. 1*b*), *c* contacts of R137 (shifted), wire 338 (Fig. 1*a*), *d* contacts of R107, wire 339, *b* contacts of R103 (shifted), wire 340, contacts TAB1, wire 210, *d* contacts of R103 (shifted), wire 317 (Fig. 1*b*), *d* contacts of R100 (shifted), relay R101 to ground, to shift and latch the contacts of this relay.

A circuit is now completed to energize relay R130 which is traceable through the same path as for relay R101 up to wire 317 (Fig. 1*b*) to *i* contacts of R120, wire 222 (Fig. 1*a*), *f* contacts of R103 (shifted), *c* contacts of R104, wire 341 (Figs. 1*b* and 1*c*) to ground.

This relay, as before, controls the circuits for causing the Out stepping switch to advance the same to its 1 or home position. When it reaches this 1 position, a circuit extends from line 200 (Fig. 1*c*), through the common conductor 110 at level 8 to the wiper 108 in the 1 position, wire 343, *c* contacts of R130, relay R141 with the circuit branching also through wire 354 (Fig. 1*b*), the *b* contacts of R101 (shifted), wire 355 (Fig. 1*a*), to relay R107 and ground.

The function of relay R107 is to shift the readout circuits for controlling the typewriter from accumulator Y to accumulator X, and this is brought about in the following manner. Before the typing takes place and before R107 is energized, the carriage is automatically tabulated to the first printing position of the Eastings field (Fig. 20), which circuit is as follows: from line 200 (Fig. 1*a*), contacts C2, wire 221 (Figs. 1*b* and 1*a*), *b* contacts of R105 (shifted) wire 337 (Fig. 1*b*), *c* contacts of R137 (shifted), wire 338 (Fig. 1*a*), *d* contacts of R107, wire 339, *b* contacts of R103 (shifted), wire 340, contacts TAB1 now closed, wire 210, *d* contacts of R103 (shifted), wire 317 (Fig. 1*b*), *c* contacts of R100 (shifted), to the tabulating solenoid TAB and ground. This will cause the carriage to advance to the first typing position in the Eastings field.

Relays R133 and R241 are energized as before. In addition, a circuit is completed from line 200 (Fig. 1*c*), wire 202, through the *d* contacts of R133 (now closed), wire 355 (Fig. 1*a*), *a* contacts of R107 (shifted), to energize relay R242. This relay shifts its *a* contacts in Fig. 1*h*, so the first typing circuit is now traceable from line 200, and wire 202 (Fig. 1*c*), through the *c* contacts of R133, *b* contacts of Out stepping magnet, wire 326 (Fig. 1*h*), *a* contacts of R243, *a* contacts of R242 (shifted), to the common conductor 110 in the Out stepping switch, level 3. This switch is now in its 1 position, so that the circuit continues through the wiper 108 to the highest order conductor 32 of the accumulator X readout device which is set at 9. The circuit continues through lowermost *a* contracts of R241, wire 352 (Fig. 1*d*), and the *b* contacts R250 and thence to the space solenoid 53 to effect a spacing operation of the typewriter in accordance with prior explanation. Through similar circuits further successive spacing takes place with the circuit extending through the *b* contacts of R250 in their normal position until the first significant digit is typed, when relay R250 will be energized to shift the circuits from the space solenoids to the 0 printing solenoid in cases where a 9 setting occurs in the readout device. For the present example, this 0 printing occurs in the units order position as noted in Fig. 20.

After this last digit has been automatically typed, the carriage will step to its next position and at this time the Out stepping switch will be in its 11 position. An automatic carriage return operation now takes place through a circuit traceable from the plus side of line (Fig. 1*h*), wire 335, common conductor 110 of the Out stepping switch at level 7, wiper 108 in position 11, *b* contacts of R243, wire 356 (Fig. 1*h*), and relay R134, with the circuit branching along wire 356, *b* contacts of R100

(shifted), wire 357 (Fig. 1*a*), *c* contacts of R107, wire 358 (Fig. 1*b*) (shifted), *b* contacts of R139 (normal), wire 359 (Fig. 1*a*) and carriage return solenoid 53 to ground. The energization of this solenoid will in the well known manner effect a carriage return operation which is accompanied by the usual line space action at the end of the return stroke.

As noted in Fig. 20, the typing is effected with the spacing between the lines containing the initial X and Y entries double spaced from the next following line. For the form employed, it is desired that the entry of the second angle and the north and south readings take place with a quadruple space interval which is obtained by effecting an additional line space operation. This is brought about by initiating a second carriage return operation which, as is usual in this type of machine, will effect simply a spacing operation if the carriage is already in its returned position.

Referring to Fig. 1*a*, the contacts TAB5A and TAB5B are shifted from the position shown when the carriage is in its home or returned position. Also in this Fig. 1*a*, the contacts 78*a* and 78*b* close under control of the devices shown in Fig. 6 during the carriage return operation. Before the initial carriage return, a circuit is completed therethrough from line 200 (Fig. 1*a*), through contacts TAB5B, *e* contacts of R106, wire 360, contacts 78*a*, wire 361 (Fig. 1*b*), and relay R139. This latter effects shifting of its *b* contacts to prevent further circuits through the Out stepping switch in level 7. The *a* contacts of R139 close to establish a holding circuit through *a* contacts of R140.

The second carriage return circuit is now traceable from line through the escapement contacts 69 (Fig. 1*b*), wire 363 (Fig. 1*a*), contacts TAB5A (closed when the carriage reaches its home position), wire 362 (Fig. 1*b*), *b* contacts of R139 (shifted), and wire 359 to the carriage return solenoid and to ground as before. This will, as stated, effect the additional line space operation.

Relay R140 is now energized (see Fig. 2*m*) from line 200 (Fig. 1*b*), through escapement contacts 69, wire 363 (Fig. 1*a*), TAB5A, 78*b* (closed mechanically as an incident to the second carriage return operation), wire 364 (Fig. 1*b*) to relay R140. This relay will hold through its *b* contacts, the closed *c* contacts of R139, and wire 202 to line. The relay R140 also opens its *a* contacts in the holding circuit of R139, so the latter becomes deenergized and in turn opens its *a* contacts to drop out R140, whereby both of these relays will become deenergized.

The Out stepping switch is restored to its 1 position as follows under control of a circuit from line 200 and wire 202 (Fig. 1*b*), through the *c* contacts of R140 (shifted), wire 341 (Fig. 1*c*), relay R130 to ground. As before, the energization of relay R130 brings about the succession of impulses to the Out stepping magnet as it is advanced from position 11 through position 20 and back to its 1 or home position.

To complete the sequence of operations, it is now necessary (see Fig. 2*m*) to release relays R103, R100, R137, which latter in turn deenergizes the keylock solenoid so that further key entries may be made. The unlatching circuit for R103 is traceable from line 200 (Fig. 1*h*), wire 335, through the common conductor 110 in Out stepping switch in level 7, wiper 108 in position 11, *b* contacts of R243, wire 356 (Figs. 1*c* and 1*b*), *b* contacts of R100 (shifted), wire 357 (Fig. 1*a*), *c* contacts of R107 (shifted), wire 358 and wire 365 to trip magnet of R103 and ground.

The circuit for the trip magnet of R100 extends from line 200 (Fig. 1*b*), through escapement contacts 69, wire 363 (Fig. 1*a*), TAB5A, 78*b*, wire 364 (Fig. 1*b*), and wire 365 to the trip magnet of R100. The particular sequence in which the several magnets are energized and deenergized is indicated in the sequence diagram (Fig. 2*m*) to which reference may be made.

Relay R137, it will be recalled, is held through the *a* contacts of R138 and the *a* contacts of R140 so that, when the latter is energized, this holding circuit will be broken. The incidental opening of the *c* contacts of R137 will break the holding circuit through the keylock solenoid.

The operator will now type in the new station designtions 3B—3C as indicated in Fig. 20 and will tabulate the carriage to the first column of the azimuth field. The new angle 163°40′09″ is typed as before followed by operation of the motor bar to close the contacts 208, 209. At this point in the operation, the relays R101 and R107 are still energized and the operation of the motor bar will effect deenergization thereof by, as indicated in Fig. 2*m*, completion of a circuit to their tripping magnets.

The trip circuit for R101 is traceable from line 200, contacts C4*a* (Fig. 1*a*), motor bar contacts 208, contacts TAB3 (now closed), wire 244 (Fig. 1*b*), winding T of R101 and ground. In Fig. 1*a*, the circuit from TAB3 extends along wire 244 directly to T winding of R107 and R106 in parallel.

Figure 2M:
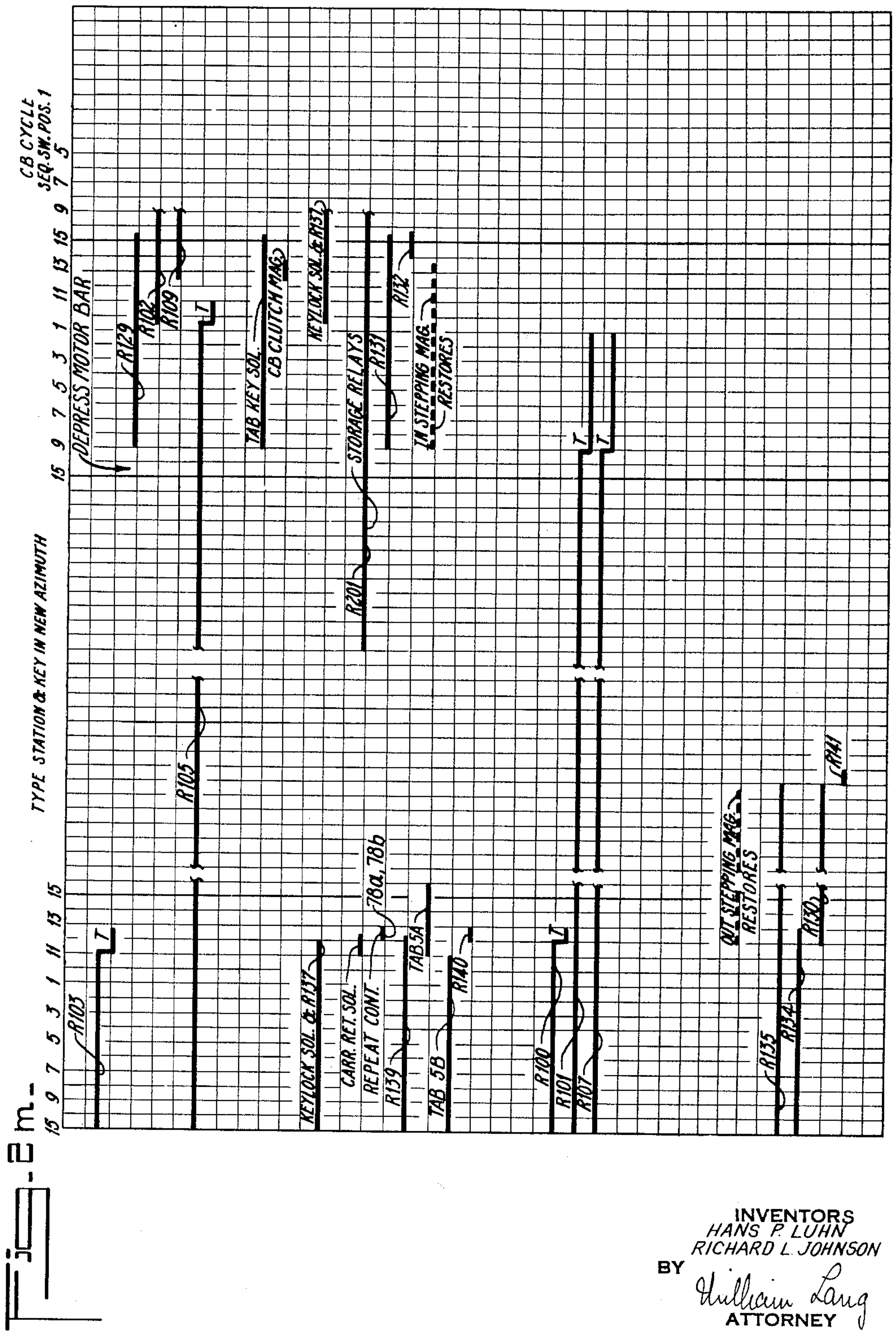

In the operation following the keying in of the new angle, relays will be energized as indicated in Fig. 2*m* which correspond to relays previously energized as indicated in Fig. 2*b* in the machine cycle following entry of the first angle.

From this point on, operations repeat as for the first sequence of operations, varying to the extent of taking into account the algebraic signs of the latitute and departure which, as indicated in Fig. 20, are negative and positive, respectively, so that the former is subtracted from the Y value and the latter is added to the X value.

*Key circuits*

Provision is made whereby the machine may be stopped during either a typing out period or during a computing period, in such manner that the problem can be continued from that point by operation of the motor bar.

In Fig. 1*a*, closure of stop key contacts 370, 371 will complete a circuit when contacts C3 close, which is traceable from line 200, contacts C3, contacts 370, wire 372 to winding P of the latch type relay R110. A parallel circuit extends from contacts 370 down through wire 373 (Figs. 1*b* and 1*c*) to relays R138 and R132, which will be energized for the duration of closure of contacts C3. Relay R132 opens its *a* contacts (Fig. 1*c*) to open the holding circuit of R131 which in turn opens its contacts to prevent homing of the In stepping switch. Relay R138 will open its *a* contacts to break the holding circuits of R139 and R137 which in turn release the keylock solenoid (Fig. 1*b*). Relay R110 shifts its *b* contacts (Fig. 1*a*) to open the circuit to wire 217 to prevent a further energization of R137.

Relay R132 also opens its *b* contacts (Fig. 1*c*) to break the holding circuit to R133, which in turn opens its *d* contacts to deenergize R241 whose *b* contacts (Fig. 1*j*) disconnect the type out circuits from the key solenoids 53. The consequent opening of the *c* contacts of R133 through which the type out impulse is transmitted will prevent the transmission of the type out impulses to the different stepping switch levels. This will effect the suspension of typing out operations if such are in progress when the stop key is operating. The opening of the *b* contacts of R133 will also interrupt the circuit to the Out stepping magnet, so that the related switch is not advanced and will remain in the position it occupies when the stop key is operated.

If the stop key is operated during the performance of a computing operation, a circuit is completed to the trip winding T of R102. This circuit is traceable from line 200 (Fig. 1*a*), contacts C3, stop key contacts 370, 371, wire 237 (Fig. 1*b*) and the T winding of R102 to ground. This relay will open its *a* contacts through which the CB clutch magnet is energized and thus prevent further tripping of this magnet. Therefore, it will interrupt further operations of the CB contacts.

To resume operations, the motor bar is operated and, if typing out were in progress previous to stoppage, a circuit is traceable from line 200 (Fig. 1*a*), through contacts C4*a*, motor bar contacts 209, *a* contacts of R110 (shifted), wire 375, *d* contacts of R105 (shifted), wire 376 (Figs. 1*b* and 1*c*), and P winding of R133 which will hold as before and reestablish the type out circuits through which the operations will pick up from where they had left off and continue as explained.

If the interruption had occurred during a calculating operation, the circuit will extend from contacts C4*a*, through the motor bar contacts 209, *a* contacts of R110 (shifted), wire 375, *d* contacts of R105 (which would be in their normal position due to the calculating condition), wires 241, 217 (Fig. 1*b*), thence to the pickup winding P of R102 and to ground, reestablishing a circuit to the CB clutch magnet with resulting resumption of computing operations.

*Clear key circuits*

To insure that the various instrumentalities are in proper position and condition prior to starting a sequence of operations, the Clear key is provided and, when operated, will initiate the following operations through its contacts 377.

*Clearing the sequence unit.*—This unit (Fig. 1*s*) may be in any of its twenty positions and is to be advanced to its home or 1 position. Depression of the Clear key will complete a circuit from line 200 (Fig. 1*b*), through contacts C4, contacts 377, wire 378 and relay R119 to ground. A holding circuit through its *a* contacts and the normally closed contacts CB24 will hold the relay R119 energized until a subsequent CB cycle. With the *d* contacts of the relay now closed, a circuit is traceable from line 200, through contacts C5, *d* contacts of R120 (normal), *d* contacts of R119 (shifted), wire 379 (Fig. 1*s*), the start magnet 163 of the sequence unit to ground. The sequence unit (Fig. 1*s*) when thus started will continue to its home or 1 position where it is mechanically uncoupled as previously explained. At the end of the cycle in which the homing of the sequence switch was initiated, contacts C6 (Fig. 1*b*) close to complete a circuit from line 200, through these contacts and the *b* contacts of R119, to the pickup winding P of R120 and to ground. This relay in turn will close its *a* contacts to hold through C7. From the time chart (Fig. 14) it will be seen there is an overlap between the timing of contacts C6 and C7 whereby R120 will now remain continuously energized until R119 is tripped during the first ensuing CB cycle through the opening of contacts CB24.

Now, upon the reclosure of contacts C4 a circuit is traceable from line 200 (Fig. 1*b*), through these contacts, wire 380, the *g* contacts of R120 (shifted), wire 381 (Fig. 1*d*), and the pickup winding of R248, which as previously explained will result in tripping of all the relay storage contacts through energization of the trip windings of the group of relays which are generally designated R201 (Figs. 1*d* and 1*e*). In this manner the relay storage unit is cleared. Later, when contacts C5 (Fig. 1*b*) again close, a circuit extends therefrom to the *d* contacts of R120 (shifted) and wires 245 and 244 (Fig. 1*a*) to the trip windings of relays R101, R106 and R107 to restore the contacts of these relays to their normal positions. Depending upon prior operation of the machine, one or more or none of these relays might be in energized condition, and the circuit just traced assures that all are reset at this time.

Following this, closure of contacts C2 (Fig. 1*a*) completes a circuit from line 200, through contacts C2, wire 221 (Fig. 1*b*), *b* contacts of R120 (shifted), *c* contacts of R119 (shifted), wire 382, CB clutch magnet to line. As a result, the CB contacts will now go through a cycle of operations. Of these, contacts CB16 close early in the cycle to complete a circuit from line 200 to a group of contacts of the relay R119 designated *e* to *m* from which a group of parallel circuits extends to various magnets. Specifically, the *e* contacts are connected through wire 383 (Fig. 1*n*) to the MP reset relay R303. The *f* contacts are connected through wire 384 (Fig. 1*n*) to the MC reset relay R306. The *g* contacts are connected through the wire 385 (Fig. 1*t*), to the storage reset relay R309 and the *h* contacts through wire 386 (Fig. 1*t*) to the storage reset relay R312. The *i* contacts are connected through wire 387 (Fig. 1*i*) to the LH reset relay R319, the *j* contacts are connected through wire 388 (Fig. 1*g*) to the RH reset relay R326, the *k* contacts are connected through wire 389 (Fig. 1*g*) to the storage reset relay R324 and the *m* contacts are connected to the storage reset relay R331 through a wire 390 (Fig. 1*z*).

Accordingly, the several reset relays just enumerated will be concurrently energized to effect appropriate restoration of the related devices.

*Table lookup restoration.*—In parallel with the above circuits, there is a further circuit through the *p* contacts of R119 (shifted) (Fig. 1*b*), and wire 391 (Fig. 1*s*) to table lookup reset relay R320 which in the previously explained manner will effect advance of the stepping switches from whatever position they may happen to occupy to their initial or home position designated 1.

When contacts CB5 (Fig. 1*a*) close shortly after the beginning of the cycle, a circuit is completed from line 200, through contacts CB5, wire 235 (Fig. 1*b*), *n* contacts of R119 (shifted) and wire 392 (Fig. 1*a*) to the pickup winding of R105 which will shift its contacts. These latter will remain in shifted position until some point in a subsequent operation of the machine. It will be recalled that at the outset it was mentioned as a preliminary to the handling of the problem that this relay R105 was in an initially energized condition and as indicated in connection with Fig. 2*a*.

Upon closure of contacts CB27 (Fig. 1*c*), a circuit extends therethrough to wire 393 (Fig. 1*b*) and to the *i* contacts of R120 (shifted), wire 222 (Fig. 1*a*) to *f* contacts of R103. Assuming these contacts to be in shifted position, a circuit will extend therethrough to the *c* contacts of R104 (assumed to be in shifted position) wire 223 (Figs. 1*b* and 1*c*) to the In homing relay R131. This, as before, will initiate a restoration of the In stepping switch which will automatically return to its 1 position and stop there.

Under these assumed conditions of R103 and R104, a circuit also extends in parallel from contacts CB27 and wire 393, through the *k* contacts of R120 (Fig. 1*b*), wires 358 and 365 (Fig. 1*a*) to the T winding of R103. With relay R103 tripped and its *f* contacts back in normal position, the previously traced circuit of the relay R131 will extend directly through these *f* contacts without going through the *c* contacts of R104. A circuit also extends through contacts CB27 and the *k* contacts of R210, wire 358 (Fig. 1*b*), thence through the *b* contacts of R139, wire 359 (Fig. 1*a*) to energize the carriage return solenoid 53 which will, as before, effect a return operation of the typewriter carriage and which, as before, will bring about energization of the relays R139 and R140 and a second energization of the carriage return solenoid to effect the second paper space operation.

The resulting closure of the *c* contacts of R140 will complete the circuit through wire 341 (Fig. 1*c*) to the Out homing relay R130, through circuits as already traced, and this will bring about the automatic advance of this stepping switch to its home position where it will remain.

Upon closure of contacts CB26*a* (Fig. 1*b*) a circuit extends from line 200, through these contacts to the *f* contacts of R120 and wire 394 (Fig. 1*k*), to the trip windings T of the group of sign control relays R385 to R391.

Upon closure of contacts CB25, there is now a circuit extending therefrom through wire 250 to the *c* contacts of R120 (shifted), wire 395 (Fig. 1*a*), *h* contacts of R103 (normal), and wire 318 to the trip winding T of relay R109. Finally, when contacts CB21*b* (Fig. 1*w*) close, there is a circuit traceable therefrom through wire 238 to the *n* contacts of R120 to the trip windings T of the group of relays R365 to R370 and also to the trip winding T of R374.

Accordingly, upon operation of the clear key, the sequence unit is reset during the machine cycle following such operation, and at the end of this cycle a single cycle of operation of the CB cams is initiated during which the various other instrumentalities that may be set up are restored with the exception that relay R105 is picked up as a prerequisite to the initiation of a series of operations of the machine. Near the end of this CB cycle, the contacts CB24 open the holding circuit to relay R119, so that further operations are interrupted.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, a set of digit representing keys, contacts operated thereby, a set of digit printing control magnets, a plurality of ordered sets of storage relays, each set having readin magnets and readout contacts set thereby, a stepping switch advanceable through a plurality of successive positions to connect the key contacts with a different set of readin magnets and concurrently connect the digit printing control magnets with the related set of readout contacts for each successive position of the switch, means including said switch for completing circuits through the readin magnets and readout contacts of one ordered set of storage relays in succession, and means controlled by the printing control magnets in response to energization through the contacts of said one set for causing advance of said switch to its next position.

2. The invention set forth in claim 1 in which means is provided in each set of relays for holding the contacts thereof in set position after circuits are completed therethrough, and means for concurrently releasing the holding means of all sets of relays.

3. In combination, a set of ordered storage relays, settable amount representing contacts for each order, means for selectively setting the contacts to represent a digit in each order of the relays, a set of digit representing magnets, circuit connections between the contacts and said magnets, means for sending an electrical impulse to the contacts in each order in succession, said impulse being transmitted through the contacts and related connections to energize the magnets in accordance with the successive digits set on the sets of contacts, means for sending a series of timed impulses to said sets of contacts concurrently, a differentially operable entry receiving device, a set of ordered controlling magnets therefor, control devices for disconnecting said set of digit representing magnets from said contacts and connecting the contacts to the timed impulse sending means, further control devices for connecting the contacts to said controlling magnets, whereby said timed impulses will be transmitted through all sets of contacts concurrently to concurrently enter the digits into said entry receiving device.

4. In a machine of the class described, a denominationally ordered entry receiving device settable to represent a multidenominational amount, a single readout device for each order, a set of magnets, one for each digit, a second denominationally ordered entry receiving device having a readin magnet for each order, means for successively connecting said readout devices to the set of magnets and completing circuits therethrough to read out said amount digit by digit, means for connecting said readout devices concurrently to said readin magnets and completing circuits therethrough to read out the digits of said amount concurrently, and means for selectively rendering said last two named means effective.

5. In a machine of the class described, a denominationally ordered entry receiving device settable to represent a multidenominational amount, a single readout device for each order, a typewriter having printing magnets, an accumulator having entering magnets, means for successively connecting said readout devices to the typewriter magnets and completing circuits therethrough to print said amount digit by digit, means for connecting said readout devices concurrently to said accumulator entering magnets and completing circuits therethrough to enter the digits of said amount concurrently, and means for selectively rendering said last two named means effective.

6. In a machine of the class described, an accumulator settable to represent a multidenominational amount, a single readout device for each order, a recording mechanism having recording magnets, a second accumulator having entering magnets, means for successively connecting said readout devices to the recording magnets and completing circuits therethrough to record said amount digit by digit, means for connecting said readout devices concurrently to said accumulator entering magnets and completing circuits therethrough to enter the digits of said amount concurrently, and means for selectively rendering said last two named means effective.

7. In a machine of the class described, an accumulator having entering magnets and settable to represent a multidenominational amount, a single readout device for each order, a recording mechanism having recording magnets, means for successively connecting said readout devices to the recording magnets and completing circuits therethrough to record said amount digit by digit, means for connecting said readout device concurrently to the entering magnets of the accumulator and completing circuits therethrough to reenter the digits of said amount into the accumulator concurrently, and means for rendering said last two named means effective in succession.

8. In a machine of the class described, an entry receiving device having a plurality of denominationally ordered entry receiving elements, each element having a wiper settable thereby to represent the digit entered therein, a single set of conducting strips, one for each order, a single set of digital segments for each order, the aforesaid element, wipers, conducting strips and segments constituting a single readout; in combination with sets of multi-contact relays, a source of impulses for concurrent readout operations, a source of current for order-by-order readout operations, and means for selectively controlling said multi-contact relays, whereby said common single readout may be utilized for concurrent readout operations or order-by-order readout operations.

References Cited in the file of this patent

UNITED STATES PATENTS

| | | |
|---|---|---|
| 1,932,220 | Kottmann | Oct. 24, 1933 |
| 2,262,235 | Hofgaard | Nov. 11, 1941 |
| 2,344,885 | Kozma et al. | Mar. 21, 1944 |
| 2,364,758 | Roggenstein | Dec. 12, 1944 |
| 2,403,005 | Lake et al. | July 2, 1946 |
| 2,493,709 | Wittenmyer | Jan. 3, 1950 |
| 2,528,394 | Sharpless et al. | Oct. 31, 1950 |
| 2,551,093 | Bryce et al. | May 1, 1951 |
| 2,588,923 | Hatton | Mar. 11, 1952 |